United States Patent
Yang et al.

(10) Patent No.: US 10,536,250 B2
(45) Date of Patent: Jan. 14, 2020

(54) METHOD AND DEVICE FOR PERFORMING MEASUREMENT BASED ON DISCOVERY SIGNALS

(71) Applicant: LG ELECTRONICS INC., Seoul (KR)

(72) Inventors: Yoonoh Yang, Seoul (KR); Sangwook Lee, Seoul (KR); Suhwan Lim, Seoul (KR); Manyoung Jung, Seoul (KR); Jinyup Hwang, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 0 days.

(21) Appl. No.: 15/509,424

(22) PCT Filed: Sep. 24, 2015

(86) PCT No.: PCT/KR2015/010084
§ 371 (c)(1),
(2) Date: Mar. 7, 2017

(87) PCT Pub. No.: WO2016/052924
PCT Pub. Date: Apr. 7, 2016

(65) Prior Publication Data
US 2017/0279585 A1  Sep. 28, 2017

Related U.S. Application Data

(60) Provisional application No. 62/056,628, filed on Sep. 29, 2014, provisional application No. 62/056,627, filed on Sep. 29, 2014.

(51) Int. Cl.
*H04L 5/00* (2006.01)
*H04J 11/00* (2006.01)
(Continued)

(52) U.S. Cl.
CPC ........ *H04L 5/0053* (2013.01); *H04J 11/0093* (2013.01); *H04L 5/005* (2013.01);
(Continued)

(58) Field of Classification Search
None
See application file for complete search history.

(56) References Cited

U.S. PATENT DOCUMENTS

| 2012/0082105 A1 | 4/2012 | Hwang et al. |
| 2013/0109301 A1 | 5/2013 | Hakola et al. |

(Continued)

FOREIGN PATENT DOCUMENTS

| JP | 2014030131 | 2/2014 |
| KR | 1020140095994 | 8/2014 |

(Continued)

OTHER PUBLICATIONS

3rd Generation Partnership Project (3GPP), "Technical Specification Group Radio Access Network; Evolved Universal Terrestrial Radio Access (E-UTRA); Physical Channels and Modulation (Release 10)," 3GPP TS 36.211 V10.4.0, Dec. 2011, 101 pages.

(Continued)

*Primary Examiner* — Gregory B Sefcheck
*Assistant Examiner* — Srinivasa R Reddivalam
(74) *Attorney, Agent, or Firm* — Lee Hong Degerman Kang Waimey

(57) ABSTRACT

One disclosure of the present specification provides a method for performing measurement based on discovery signals. The method may comprise the steps of: receiving, from cells, discovery signals based on cell-specific reference signals (CRSs); and performing measurement based on the CRS-based discovery signals for a predetermined measurement period. If a measurement bandwidth is six resource blocks (RBs), the predetermined measurement period can be (Continued)

determined by 5*the measurement occasion periodicity of the discovery signals. If the measurement bandwidth is 25 resource blocks (RBs), the predetermined measurement period can be determined by 3*the measurement occasion periodicity of the discovery signals. Also, the discovery signals can be received for a discovery signal occasion duration defined by N consecutive subframes.

16 Claims, 38 Drawing Sheets

(51) Int. Cl.
*H04W 56/00* (2009.01)
*H04W 76/28* (2018.01)
*H04W 48/16* (2009.01)

(52) U.S. Cl.
CPC ........ *H04W 56/001* (2013.01); *H04J 11/0073* (2013.01); *H04J 11/0076* (2013.01); *H04L 5/001* (2013.01); *H04W 48/16* (2013.01); *H04W 76/28* (2018.02)

(56) References Cited

U.S. PATENT DOCUMENTS

| | | | |
|---|---|---|---|
| 2013/0183963 A1 | 7/2013 | Turtinen et al. | |
| 2013/0188510 A1* | 7/2013 | Siomina | H04W 24/10 370/252 |
| 2014/0003262 A1* | 1/2014 | He | H04W 28/08 370/252 |
| 2015/0230112 A1* | 8/2015 | Siomina | G01S 5/0205 370/252 |
| 2015/0264592 A1* | 9/2015 | Novlan | H04L 27/2601 370/252 |
| 2016/0050637 A1* | 2/2016 | Behravan | H04W 56/001 370/350 |
| 2016/0262100 A1* | 9/2016 | Larsson | H04W 52/0229 |

FOREIGN PATENT DOCUMENTS

| | | |
|---|---|---|
| WO | 2014048493 | 4/2014 |
| WO | 2014058221 | 4/2014 |

OTHER PUBLICATIONS

3rd Generation Partnership Project (3GPP), "Technical Specification Group Radio Access Network; Evolved Universal Terrestrial Radio Access (E-UTRA); Physical Channels and Modulation (Release 10)," Section 6.10.5 of 3GPP TS 36.211 V10.1.0, Mar. 2011, 7 pages.

3rd Generation Partnership Project (3GPP), "Technical Specification Group Radio Access Network; Evolved Universal Terrestrial Radio Access (E-UTRA); Physical Channels and Modulation (Release 10)," Section 6.11 of 3GPP TS 36.211 V10.2.0, Jun. 2011, 7 pages.

PCT International Application No. PCT/KR2015/010084, Written Opinion of the International Searching Authority dated Jan. 12, 2016, 4 pages.

PCT International Application No. PCT/KR2015/010084, International Search Report dated Jan. 12, 2016, 3 pages.

Ericsson, "On Measurement Performance of Small Cell Discovery", 3GPP TSG RAN WG1 Meeting #73, R1-132150, May 2013, 5 pages.

Huawei, "Potential enhancements for small cell discovery", 3GPP TSG RAN WG1 Meeting #74, R1-132892, Aug. 2013, 9 pages.

NTT Docomo, "Small Cell Discovery for Efficient Small Cell on/off Operation", 3GPP TSG RAN WG1 Meeting #74, R1-133457, Aug. 2013, 10 pages.

Korean Intellectual Property Office Application No. 10-2017-7004030, Office Action dated Sep. 5, 2018, 5 pages.

NTT Docomo, "Performance evaluation on DRS-based cell/TP identification and RSRP measurement", 3GPP TSG RAN WG1 Meeting #77, R1-142258, May 2014, 7 pages.

Huawei, et al., "Reference signals for enhanced cell discovery", 3GPP TSG RAN WG1 Meeting #76bis, R1-141124, Apr. 2014, 6 pages.

Samsung, "Detailed design of discovery signal", 3GPP TSG RAN WG1 Meeting #78, R1-143067, Aug. 2014, 6 pages.

Huawei, et al., "Discussion on further clarifications on small cell on/off and discovery signal", 3GPP TSG RAN WG1 Meeting #78, R1-142974, Aug. 2014, 7 pages.

* cited by examiner

METHOD AND DEVICE FOR PERFORMING MEASUREMENT BASED ON DISCOVERY SIGNALS

CROSS-REFERENCE TO RELATED APPLICATIONS

This application is the National Stage filing under 35 U.S.C. 371 of International Application No. PCT/KR2015/010084, filed on Sep. 24, 2015, which claims the benefit of U.S. Provisional Application No. 62/056,627, filed on Sep. 29, 2014 and 62/056,628, filed on Sep. 29, 2014, the contents of which are all hereby incorporated by reference herein in their entirety.

BACKGROUND OF THE INVENTION

Field of the Invention
The present invention relates to mobile communication.
Related Art
3rd generation partnership project (3GPP) long term evolution (LTE) evolved from a universal mobile telecommunications system (UMTS) is introduced as the 3GPP release 8. The 3GPP LTE uses orthogonal frequency division multiple access (OFDMA) in a downlink, and uses single carrier-frequency division multiple access (SC-FDMA) in an uplink. The 3GPP LTE employs multiple input multiple output (MIMO) having up to four antennas. In recent years, there is an ongoing discussion on 3GPP LTE-advanced (LTE-A) evolved from the 3GPP LTE.

As disclosed in 3GPP TS 36.211 V10.4.0 (2011-12) "Evolved Universal Terrestrial Radio Access (E-UTRA); Physical Channels and Modulation (Release 10)", a physical channel of LTE may be classified into a downlink channel, i.e., a PDSCH (Physical Downlink Shared Channel) and a PDCCH (Physical Downlink Control Channel), and an uplink channel, i.e., a PUSCH (Physical Uplink Shared Channel) and a PUCCH (Physical Uplink Control Channel).

Meanwhile, in a next-generation mobile communication system, it is expected that a small cell having a small cell coverage radius is added within a coverage of a macro cell.

However, if small cells are densely distributed within the coverage of a macro cell, it may be difficult for a UE to quickly detect the small cells.

To solve the problem above, a small cell may transmit a new discovery signal (DS) in addition to existing PSS/SSS.

Meanwhile, it has not been studied yet as to the total number of measurement required to achieve desired measurement accuracy when the UE attempts to perform measurement based on the discovery signal.

SUMMARY OF THE INVENTION

Accordingly, an object of the present invention is to solve the above-mentioned problems.

To achieve the foregoing aspect, there is provided a method for performing measurements based on a discovery signal. The method may comprise: receiving, from a cell, a cell-specific reference signal (CRS) based discovery signal; and performing measurements based on the CRS based discovery signal during a predetermined measurement period. Here, if a measurement bandwidth corresponds to 6 resource blocks (RBs), the predetermined measurement period is determined to be equal to 5*an occasion periodicity for measuring the discovery signal. And, if the measurement bandwidth corresponds to 6 RBs, the predetermined measurement period may be determined to be equal to 3*the occasion periodicity for measuring the discovery signal. Also, the discovery signal may be received during an occasion duration defined as N consecutive subframes.

The occasion periodicity for measuring the discovery signal may correspond to one of 40 ms, 80 ms, and 160 ms.

A value of the N may be equal to or more than one.

In the performing of the measurement, a discontinuous reception (DRX) may not be used.

The discovery signal may include one or more of a primary synchronization signal (PSS), a secondary synchronization signal (SSS), a cell-specific reference Signal (CRS) and a channel state information reference signal (CSI-RS).

To achieve the foregoing aspect, there is provided a terminal for performing measurements based on a discovery signal. The terminal may comprise: a radio frequency (RF) unit configured to receive, from a cell, a cell-specific reference signal (CRS) based discovery signal; and a processor configured to perform measurements based on the CRS based discovery signal during a predetermined measurement period. Here, if a measurement bandwidth corresponds to 6 resource blocks (RBs), the predetermined measurement period is determined to be equal to 5*an occasion periodicity for measuring the discovery signal. And, if the measurement bandwidth corresponds to 6 RBs, the predetermined measurement period may be determined to be equal to 3*the occasion periodicity for measuring the discovery signal. Also, the discovery signal may be received during an occasion duration defined as N consecutive subframes.

According to the disclosure of the present invention, the problem of the conventional technology described above may be solved.

DESCRIPTION OF EXEMPLARY EMBODIMENTS

Figure 1:
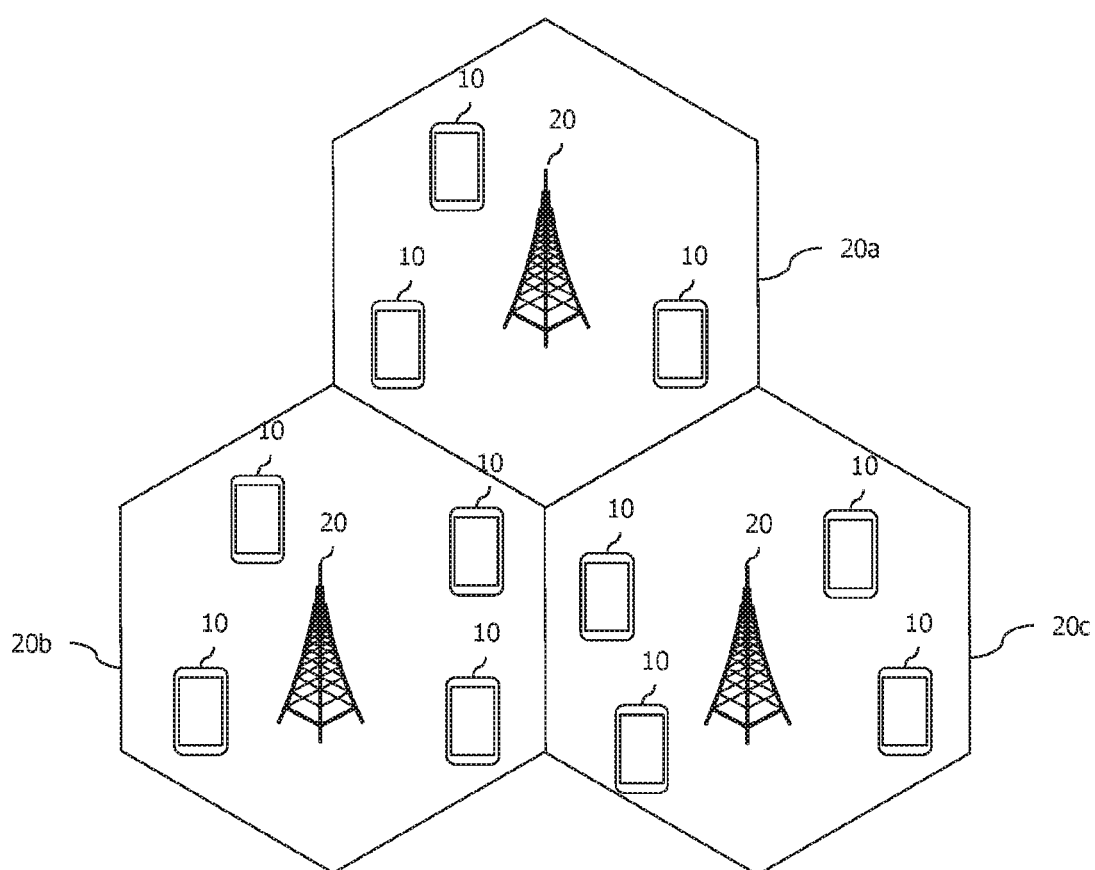
FIG. 1 is a wireless communication system.

Hereinafter, based on 3rd Generation Partnership Project (3GPP) long term evolution (LTE) or 3GPP LTE-advanced (LTE-A), the present invention will be applied. This is just an example, and the present invention may be applied to various wireless communication systems. Hereinafter, LTE includes LTE and/or LTE-A.

The technical terms used herein are used to merely describe specific embodiments and should not be construed as limiting the present invention. Further, the technical terms used herein should be, unless defined otherwise, interpreted as having meanings generally understood by those skilled in the art but not too broadly or too narrowly. Further, the technical terms used herein, which are determined not to exactly represent the spirit of the invention, should be replaced by or understood by such technical terms as being able to be exactly understood by those skilled in the art. Further, the general terms used herein should be interpreted in the context as defined in the dictionary, but not in an excessively narrowed manner.

The expression of the singular number in the present invention includes the meaning of the plural number unless the meaning of the singular number is definitely different from that of the plural number in the context. In the following description, the term 'include' or 'have' may represent the existence of a feature, a number, a step, an operation, a component, a part or the combination thereof described in the present invention, and may not exclude the existence or addition of another feature, another number, another step, another operation, another component, another part or the combination thereof.

The terms 'first' and 'second' are used for the purpose of explanation about various components, and the components are not limited to the terms 'first' and 'second'. The terms 'first' and 'second' are only used to distinguish one component from another component. For example, a first component may be named as a second component without deviating from the scope of the present invention.

It will be understood that when an element or layer is referred to as being "connected to" or "coupled to" another element or layer, it can be directly connected or coupled to the other element or layer or intervening elements or layers may be present. In contrast, when an element is referred to as being "directly connected to" or "directly coupled to" another element or layer, there are no intervening elements or layers present.

Hereinafter, exemplary embodiments of the present invention will be described in greater detail with reference to the accompanying drawings. In describing the present invention, for ease of understanding, the same reference numerals are used to denote the same components throughout the drawings, and repetitive description on the same components will be omitted. Detailed description on well-known arts which are determined to make the gist of the invention unclear will be omitted. The accompanying drawings are provided to merely make the spirit of the invention readily understood, but not should be intended to be limiting of the invention. It should be understood that the spirit of the invention may be expanded to its modifications, replacements or equivalents in addition to what is shown in the drawings.

As used herein, 'base station' generally refers to a fixed station that communicates with a wireless device and may be denoted by other terms such as eNB (evolved-NodeB), BTS (base transceiver system), or access point.

As used herein, 'user equipment (UE)' may be stationary or mobile, and may be denoted by other terms such as device, wireless device, terminal, MS (mobile station), UT (user terminal), SS (subscriber station), MT (mobile terminal) and etc.

FIG. 1 illustrates a wireless communication system.

As seen with reference to FIG. 1, the wireless communication system includes at least one base station (BS) 20. Each base station 20 provides a communication service to specific geographical areas (generally, referred to as cells) 20a, 20b, and 20c. The cell can be further divided into a plurality of areas (sectors).

The UE generally belongs to one cell and the cell to which the UE belong is referred to as a serving cell. A base station that provides the communication service to the serving cell is referred to as a serving BS. Since the wireless communication system is a cellular system, another cell that neighbors to the serving cell is present. Another cell which neighbors to the serving cell is referred to a neighbor cell. A base station that provides the communication service to the neighbor cell is referred to as a neighbor BS. The serving cell and the neighbor cell are relatively decided based on the UE.

Hereinafter, a downlink means communication from the base station 20 to the UE1 10 and an uplink means communication from the UE 10 to the base station 20. In the downlink, a transmitter may be a part of the base station 20 and a receiver may be a part of the UE 10. In the uplink, the transmitter may be a part of the UE 10 and the receiver may be a part of the base station 20.

Meanwhile, the wireless communication system may be generally divided into a frequency division duplex (FDD) type and a time division duplex (TDD) type. According to the FDD type, uplink transmission and downlink transmission are achieved while occupying different frequency bands. According to the TDD type, the uplink transmission and the downlink transmission are achieved at different time while occupying the same frequency band. A channel response of the TDD type is substantially reciprocal. This means that a downlink channel response and an uplink channel response are approximately the same as each other in a given frequency area. Accordingly, in the TDD based wireless communication system, the downlink channel response may be acquired from the uplink channel response. In the TDD type, since an entire frequency band is time-divided in the uplink transmission and the downlink transmission, the downlink transmission by the base station and the uplink transmission by the terminal may not be performed simultaneously. In the TDD system in which the uplink transmission and the downlink transmission are divided by the unit of a sub-frame, the uplink transmission and the downlink transmission are performed in different sub-frames.

Hereinafter, the LTE system will be described in detail.

Figure 2:
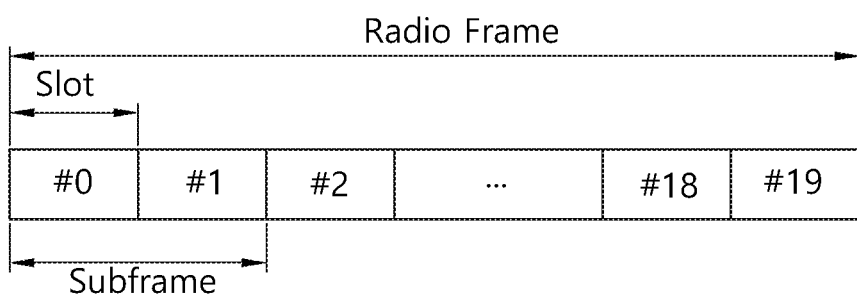
FIG. 2 illustrates a structure of a radio frame according to FDD in 3GPP LTE.

FIG. 2 shows a downlink radio frame structure according to FDD of 3rd generation partnership project (3GPP) long term evolution (LTE).

The radio frame of FIG. 2 may be found in the section 5 of 3GPP TS 36.211 V10.4.0 (2011-12) "Evolved Universal Terrestrial Radio Access (E-UTRA); Physical Channels and Modulation (Release 10)".

The radio frame includes 10 sub-frames indexed 0 to 9. One sub-frame includes two consecutive slots. Accordingly, the radio frame includes 20 slots. The time taken for one sub-frame to be transmitted is denoted TTI (transmission time interval). For example, the length of one sub-frame may be 1 ms, and the length of one slot may be 0.5 ms.

The structure of the radio frame is for exemplary purposes only, and thus the number of sub-frames included in the radio frame or the number of slots included in the sub-frame may change variously.

Meanwhile, one slot may include a plurality of orthogonal frequency division multiplexing (OFDM) symbols. The number of OFDM symbols included in one slot may vary depending on a cyclic prefix (CP). One slot includes 7 OFDM symbols in case of a normal CP, and one slot includes 6 OFDM symbols in case of an extended CP. Herein, since the 3GPP LTE uses orthogonal frequency division multiple access (OFDMA) in a downlink (DL), the OFDM symbol is only for expressing one symbol period in a time domain, and there is no limitation in a multiple access scheme or terminologies. For example, the OFDM symbol may also be referred to as another terminology such as a single carrier frequency division multiple access (SC-FDMA) symbol, a symbol period, etc.

Figure 3:
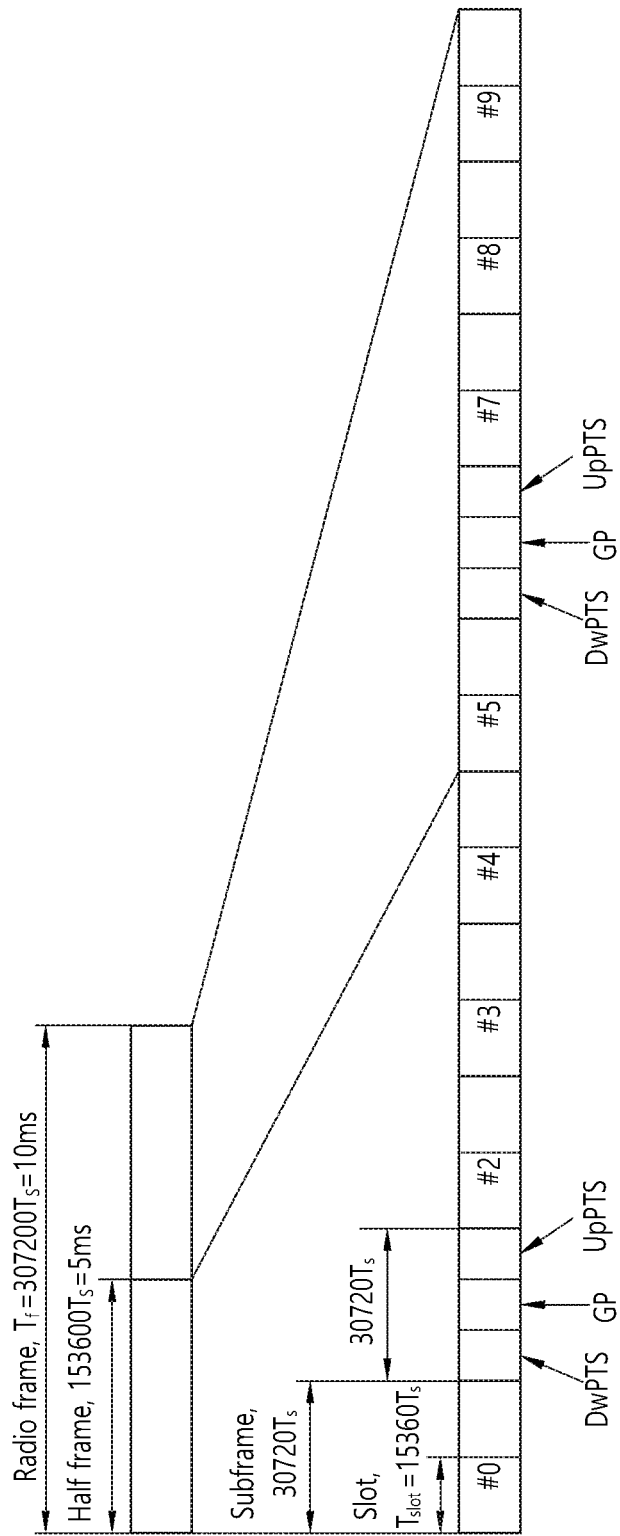
FIG. 3 illustrates a structure of a downlink radio frame according to TDD in the 3GPP LTE.

FIG. 3 illustrates the architecture of a downlink radio frame according to TDD in 3GPP LTE.

For this, 3GPP TS 36.211 V10.4.0 (2011-23) "Evolved Universal Terrestrial Radio Access (E-UTRA); Physical Channels and Modulation (Release 8)", Ch. 4 may be referenced, and this is for TDD (time division duplex).

Sub-frames having index #1 and index #6 are denoted special sub-frames, and include a DwPTS (Downlink Pilot Time Slot: DwPTS), a GP (Guard Period) and an UpPTS (Uplink Pilot Time Slot). The DwPTS is used for initial cell search, synchronization, or channel estimation in a terminal. The UpPTS is used for channel estimation in the base station and for establishing uplink transmission sync of the terminal. The GP is a period for removing interference that arises on uplink due to a multi-path delay of a downlink signal between uplink and downlink.

In TDD, a DL (downlink) sub-frame and a UL (Uplink) co-exist in one radio frame. Table 1 shows an example of configuration of a radio frame.

TABLE 1

| UL-DL configuration | Switch-point periodicity | Subframe index | | | | | | | | | |
|---|---|---|---|---|---|---|---|---|---|---|---|
| | | 0 | 1 | 2 | 3 | 4 | 5 | 6 | 7 | 8 | 9 |
| 0 | 5 ms | D | S | U | U | U | D | S | U | U | U |
| 1 | 5 ms | D | S | U | U | D | D | S | U | U | D |
| 2 | 5 ms | D | S | U | D | D | D | S | U | D | D |
| 3 | 10 ms | D | S | U | U | U | D | D | D | D | D |
| 4 | 10 ms | D | S | U | U | D | D | D | D | D | D |
| 5 | 10 ms | D | S | U | D | D | D | D | D | D | D |
| 6 | 5 ms | D | S | U | U | U | D | S | U | U | D |

'D' denotes a DL sub-frame, 'U' a UL sub-frame, and 'S' a special sub-frame. When receiving a UL-DL configuration from the base station, the terminal may be aware of whether a sub-frame is a DL sub-frame or a UL sub-frame according to the configuration of the radio frame.

TABLE 2

| Special subframe configuration | Normal CP in downlink | | | Extended CP in downlink | | |
|---|---|---|---|---|---|---|
| | | UpPTS | | | UpPTS | |
| | DwPTS | Normal CP in uplink | Extended CP in uplink | DwPTS | Normal CP in uplink | Extended CP in uplink |
| 0 | 6592 * Ts | 2192 * Ts | 2560 * Ts | 7680 * Ts | 2192 * Ts | 2560 * Ts |
| 1 | 19760 * Ts | | | 20480 * Ts | | |
| 2 | 21952 * Ts | | | 23040 * Ts | | |
| 3 | 24144 * Ts | | | 25600 * Ts | | |
| 4 | 26336 * Ts | | | 7680 * Ts | | |
| 5 | 6592 * Ts | 4384 * Ts | 5120 * ts | 20480 * Ts | 4384 * Ts | 5120 * ts |
| 6 | 19760 * Ts | | | 23040 * Ts | | |
| 7 | 21952 * Ts | | | — | | |
| 8 | 24144 * Ts | | | — | | |

Figure 4:
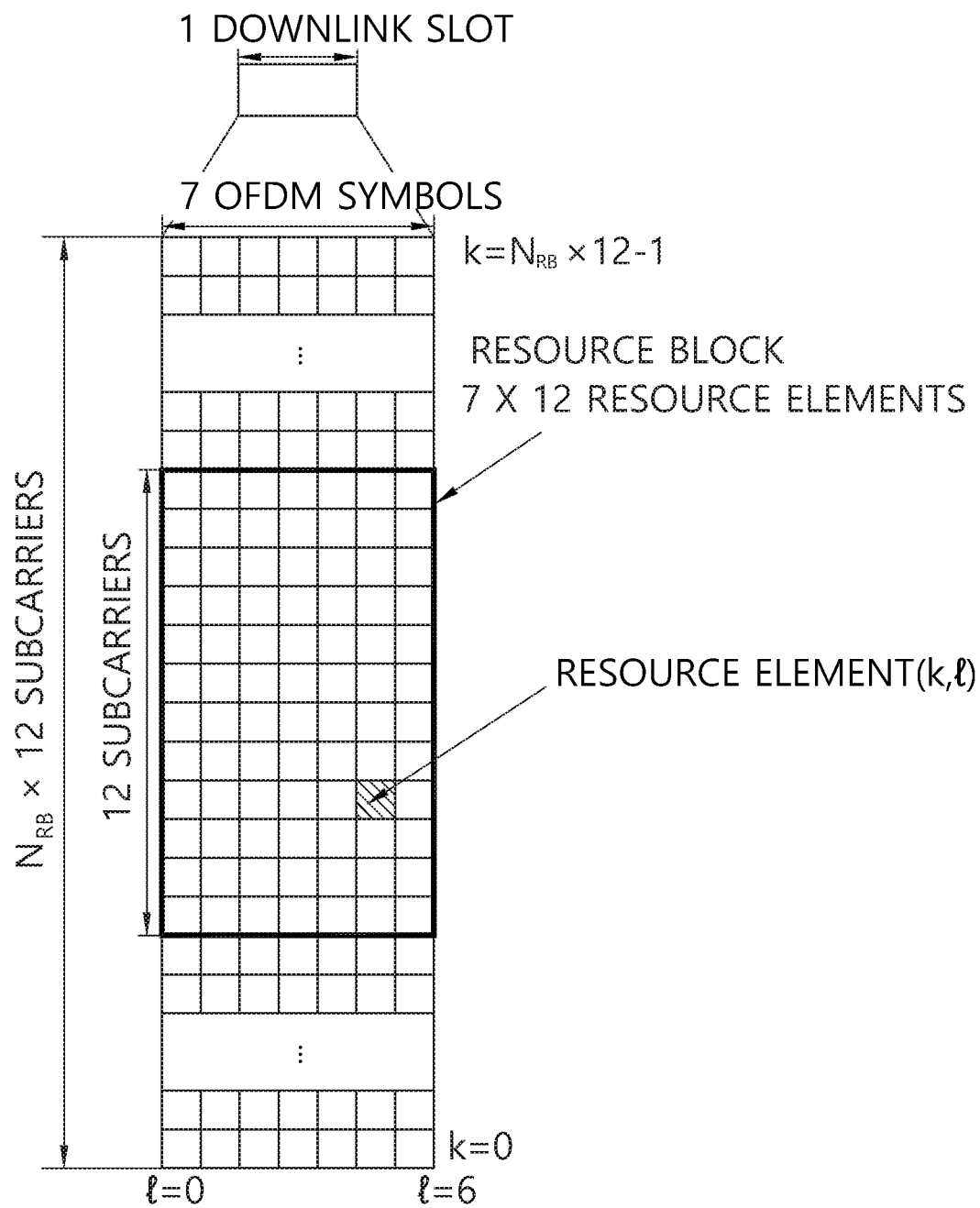
FIG. 4 is an exemplary diagram illustrating a resource grid for one uplink or downlink slot in the 3GPP LTE.

FIG. 4 illustrates an example resource grid for one uplink or downlink slot in 3GPP LTE.

Referring to FIG. 4, the uplink slot includes a plurality of OFDM (orthogonal frequency division multiplexing) symbols in the time domain and NRB resource blocks (RBs) in the frequency domain. For example, in the LTE system, the number of resource blocks (RBs), i.e., NRB, may be one from 6 to 110.

The resource block is a unit of resource allocation and includes a plurality of sub-carriers in the frequency domain. For example, if one slot includes seven OFDM symbols in the time domain and the resource block includes 12 sub-carriers in the frequency domain, one resource block may include 7×12 resource elements (REs).

Meanwhile, the number of sub-carriers in one OFDM symbol may be one of 128, 256, 512, 1024, 1536, and 2048.

In 3GPP LTE, the resource grid for one uplink slot shown in FIG. 4 may also apply to the resource grid for the downlink slot.

Figure 5:
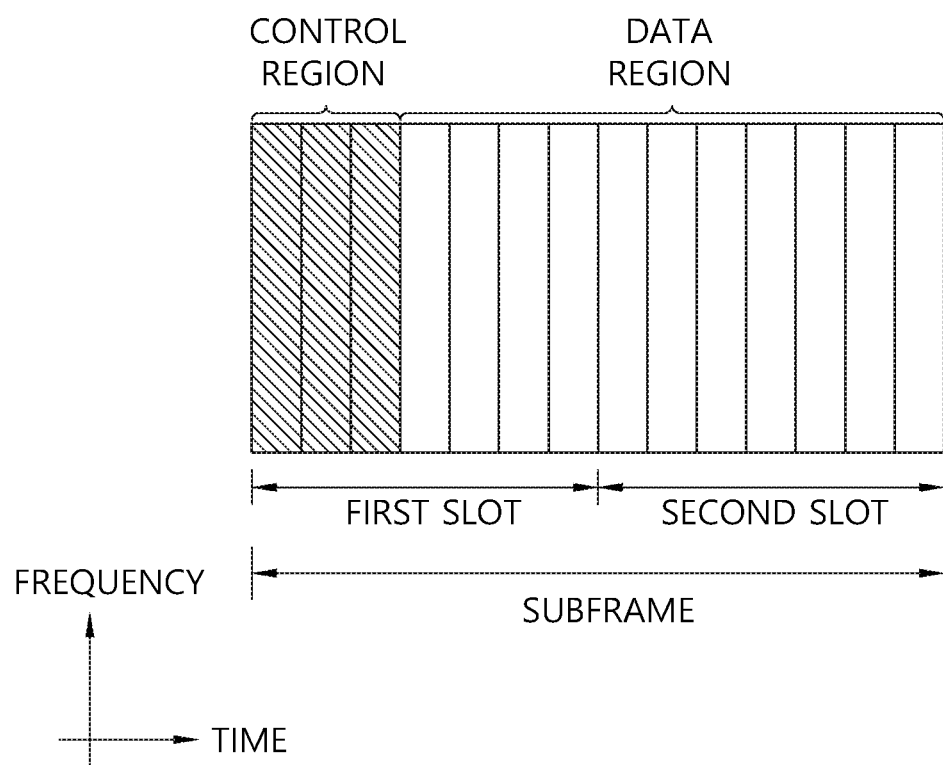
FIG. 5 illustrates a structure of a downlink subframe.

FIG. 5 illustrates the architecture of a downlink sub-frame.

In FIG. 5, assuming the normal CP, one slot includes seven OFDM symbols, by way of example.

The DL (downlink) sub-frame is split into a control region and a data region in the time domain. The control region includes up to first three OFDM symbols in the first slot of the sub-frame. However, the number of OFDM symbols included in the control region may be changed. A PDCCH (physical downlink control channel) and other control channels are assigned to the control region, and a PDSCH is assigned to the data region.

The physical channels in 3GPP LTE may be classified into data channels such as PDSCH (physical downlink shared channel) and PUSCH (physical uplink shared channel) and control channels such as PDCCH (physical downlink control channel), PCFICH (physical control format indicator channel), PHICH (physical hybrid-ARQ indicator channel) and PUCCH (physical uplink control channel).

Figure 6:
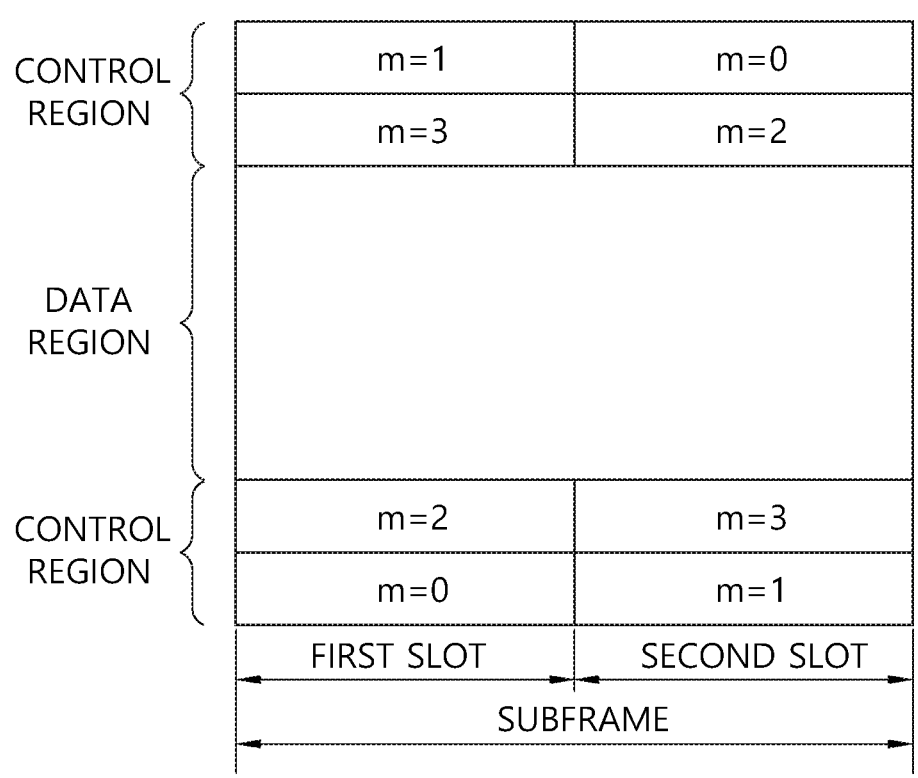
FIG. 6 illustrates the architecture of an uplink sub-frame in 3GPP LTE.

FIG. 6 illustrates the architecture of an uplink sub-frame in 3GPP LTE.

Referring to FIG. 6, the uplink sub-frame may be separated into a control region and a data region in the frequency domain. The control region is assigned a PUCCH (physical uplink control channel) for transmission of uplink control information. The data region is assigned a PUSCH (physical uplink shared channel) for transmission of data (in some cases, control information may also be transmitted).

The PUCCH for one terminal is assigned in resource block (RB) pair in the sub-frame. The resource blocks in the resource block pair take up different sub-carriers in each of the first and second slots. The frequency occupied by the resource blocks in the resource block pair assigned to the PUCCH is varied with respect to a slot boundary. This is referred to as the RB pair assigned to the PUCCH having been frequency-hopped at the slot boundary.

The terminal may obtain a frequency diversity gain by transmitting uplink control information through different sub-carriers over time. m is a location index that indicates a logical frequency domain location of a resource block pair assigned to the PUCCH in the sub-frame.

The uplink control information transmitted on the PUCCH includes an HARQ (hybrid automatic repeat request), an ACK (acknowledgement)/NACK (non-acknowledgement), a CQI (channel quality indicator) indicating a downlink channel state, and an SR (scheduling request) that is an uplink radio resource allocation request.

The PUSCH is mapped with a UL-SCH that is a transport channel. The uplink data transmitted on the PUSCH may be a transport block that is a data block for the UL-SCH transmitted for the TTI. The transport block may be user information. Or, the uplink data may be multiplexed data. The multiplexed data may be data obtained by multiplexing the transport block for the UL-SCH and control information. For example, the control information multiplexed with the data may include a CQI, a PMI (precoding matrix indicator), an HARQ, and an RI (rank indicator). Or, the uplink data may consist only of control information.

<Carrier Aggregation (CA)>

A carrier aggregation system is described hereinafter.

A carrier aggregation system aggregates a plurality of component carriers (CCs). A conventional definition of a cell is changed according to carrier aggregation. According to carrier aggregation, a cell may denote a combination of a downlink component carrier and an uplink component carrier or a downlink component carrier alone.

Further, in carrier aggregation, cells may be divided into a primary cell, a secondary cell, and a serving cell. A primary cell denotes a cell operating at a primary frequency, in which a UE performs an initial connection establishment procedure or a connection reestablishment procedure with a BS or which is designated as a primary cell in a handover procedure. A secondary cell denotes a cell operating at a secondary frequency, which is configured once RRC connection is established and is used to provide an additional radio resource.

As described above, the carrier aggregation system may support a plurality of component carriers (CCs), that is, a plurality of serving cells, unlike a single carrier system.

The carrier aggregation system may support cross-carrier scheduling. Cross-carrier scheduling is a scheduling method for performing resource allocation for a PDSCH transmitted through a different component carrier through a PDCCH transmitted through a specific component carrier and/or resource allocation for a PUSCH transmitted through a component carrier different from a component carrier basically linked with the specific component carrier.

<Synchronization Signal>

In LTE/LTE-A systems, synchronization with a cell is obtained through a synchronization signal (SS) in a cell search process.

The synchronization signal is described in detail below with reference to FIG. 7.

Figure 7:
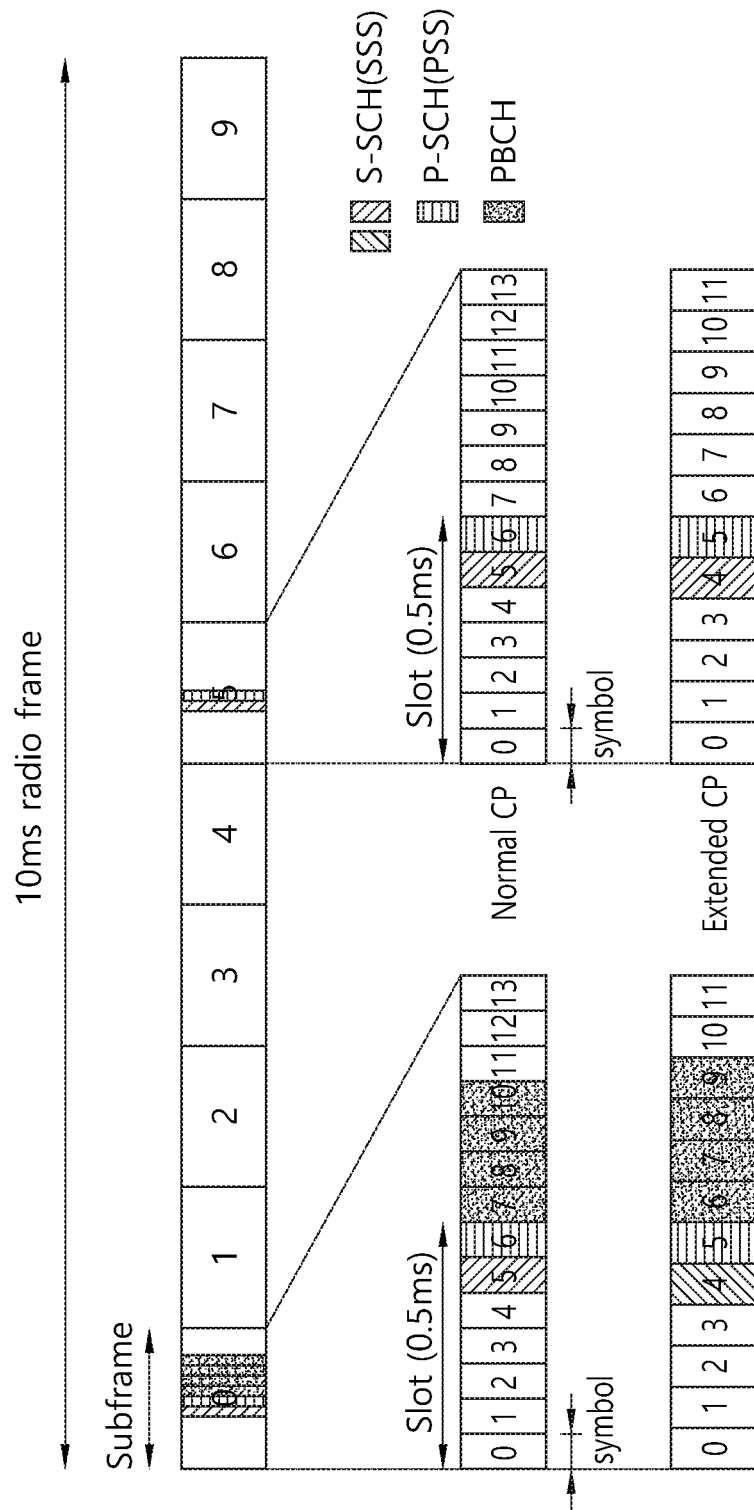
FIG. 7 illustrates a frame structure for the transmission of a synchronization signal in an FDD frame.

FIG. 7 illustrates a frame structure for the transmission of a synchronization signal in an FDD frame.

A slot number and a subframe number starts with 0. UE may perform time and frequency synchronization based on a synchronization signal received from an eNodeB. In 3GPP LTE-A, a synchronization signal is used for cell search and may be divided into a primary synchronization signal (PSS) and a secondary synchronization signal (SSS). In 3GPP LTE-A, for a synchronization signal, reference may be made to Paragraph 6.11 of 3GPP TS V10.2.0 (2011-06).

A PSS is used to obtain 01-DM symbol synchronization or slot synchronization and associated with a physical-layer cell identity (PCI). Furthermore, an SSS is used to obtain frame synchronization. Furthermore, an SSS is used to detect a CP length and to obtain a physical layer cell group ID.

A synchronization signal may be transmitted in a sub-frame No. 0 and a subframe No. 5 several time by taking into consideration 4.6 ms, that is, the length of a GSM (global system for mobile communication) frame in order to facilitate inter-RAT (radio access technology) measurement. The boundary of the frame may be detected through an SSS. More specifically, in an FDD system, a PSS is transmitted in the last OFDM symbol of a slot No. 1 or a slot No. 10, and an SSS is transmitted in an OFDM symbol right before a PSS.

A synchronization signal may send any one of a total of 504 physical cell IDs through a combination of three PSSs and 168 SSSs. A PBCH (physical broadcast channel) is transmitted in the first 4 OFDM symbols of the first slot. A synchronization signal and PBCH are transmitted within center 6 Rbs within a system bandwidth so that UE can detect or demodulate the synchronization signal regardless of a transmission bandwidth. A physical channel in which a PSS is transmitted is called a P-SCH, and a physical channel in which an SSS is transmitted is called an S-SCH.

Figure 8:
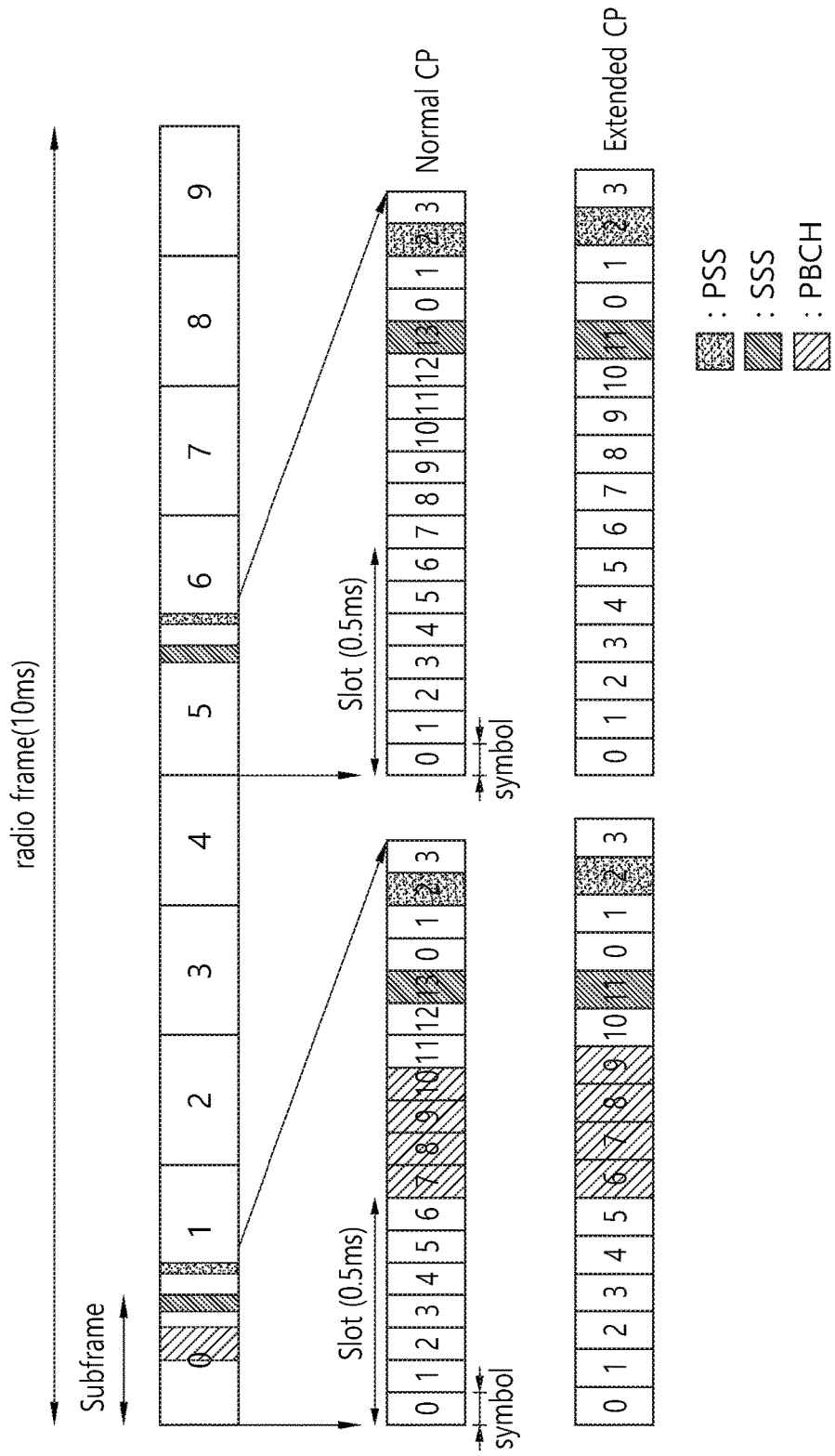
FIG. 8 illustrates an example of a frame structure for sending a synchronization signal in a TDD frame.

FIG. 8 illustrates an example of a frame structure for sending a synchronization signal in a TDD frame.

In a TDD frame, a PSS is transmitted in the third OFDM symbols of a third slot and thirteenth slot. An SSS is transmitted prior to three OFDM symbols in OFDM symbols in which a PSS is transmitted. A PBCH is transmitted in the first 4 OFDM symbols of a second slot in the first subframe.

<Reference Signal>

A RS is described below.

In general, transmission information, for example, data is easily distored and changed while it is transmitted through a radio channel. Accordingly, a reference signal is required in order to demodulate such a transmission information without an error.

The reference signal is a signal known to both a transmitter and a receiver and is transmitted along with transmission information. Since transmission information transmitted by a transmitter experiences a corresponding channel for each transmission antenna or layer, a reference signal may be allocated to each transmission antenna or layer. A reference signal for each transmission antenna or layer may be identified using resources, such as a frequency and code. A reference signal may be used for two purposes, that is, the demodulation and channel estimation of transmission information.

A downlink reference signal may be divided into a cell-specific reference signal (CRS), an MBSFN (multimedia broadcast and multicast single frequency network) reference signal, a UE-specific reference signal (UE-specific RS, URS), a positioning reference signal (positioning RS, PRS), and a CSI reference signal (CSI-RS). The CRS is a reference signal transmitted to all UEs within a cell and also called a common reference signal. The CRS may be used for the channel measurement of CQI feedback and the channel estimation of PDSCH. The MBSFN reference signal may be transmitted in a subframe allocated for MBSFN transmission. The URS is a reference signal received by a specific UE or specific UE group within a cell and may be called a demodulation reference signal (DM-RS). The DM-RS is chiefly used for a specific UE or specific UE group to perform data demodulation. The PRS may be used to estimate the location of UE. The CSI-RS is used for the channel estimation of the PDSCH of LTE-A UE. The CSI-RSs are deployed relatively sparsely in a frequency domain or time domain and may be punctured in the data region of a common subframe or MBSFN subframe.

Figure 9:
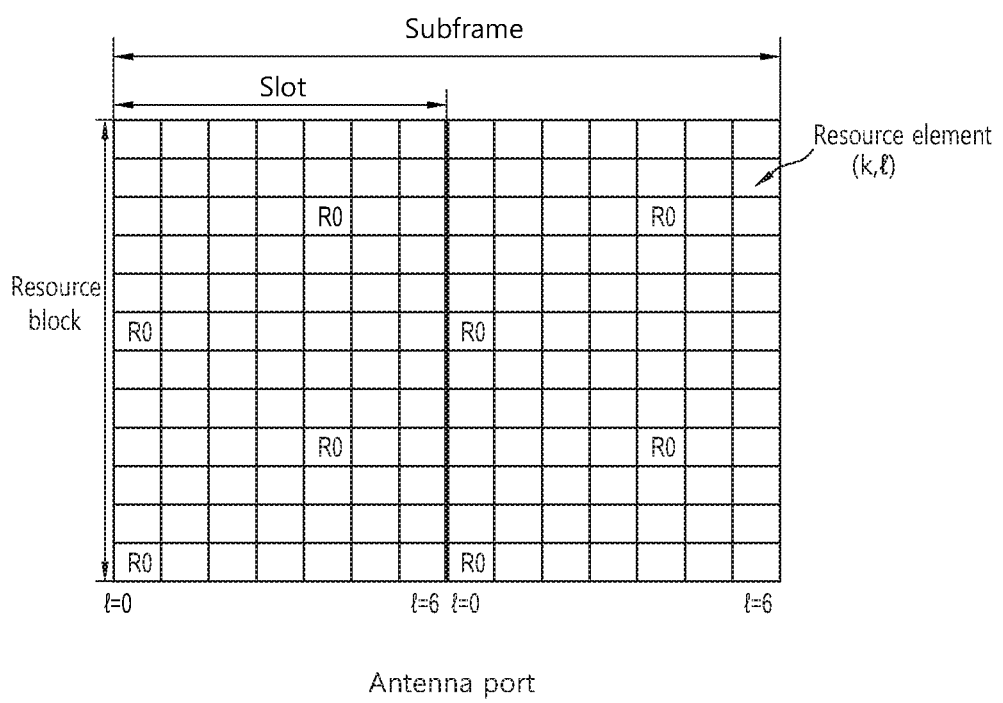
FIG. 9 illustrates one example of a pattern according to which a CRS is mapped to an RB in case a base station uses one antenna port.

FIG. 9 illustrates one example of a pattern according to which a CRS is mapped to an RB in case a base station uses one antenna port.

Referring to FIG. 9, R0 represents an RE to which a CRS transmitted by an antenna with a port number 0 of the base station is mapped.

A CRS is transmitted from all of downlink subframes within a cell supporting PDSCH transmission. A CRS may be transmitted through antenna port 0 to 3.

A resource element (RE) allocated to the CRS of one antenna port may not be used for transmission through another antenna port and has to be set to zero. Also, the CRS is transmitted only in the non-MBSFN area in an MBSFN (Multicast-Broadcast Single Frequency Network) subframe.

Figure 10:
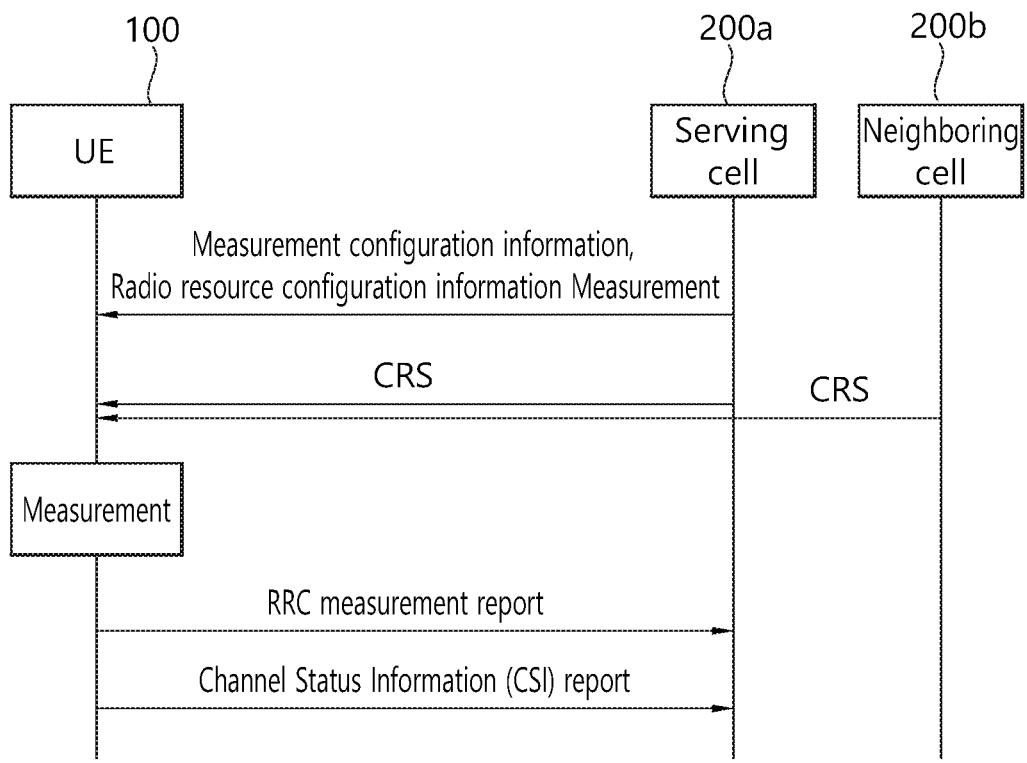
FIG. 10 illustrates measurement and a measurement report procedure.

FIG. 10 illustrates measurement and a measurement report procedure.

In a mobile communication system, mobility support of the UE 100 is essential. Therefore, the UE 100 continuously measure the quality of a serving cell currently providing a service and the quality of its neighboring cells. The UE 100 duly reports the measurement result to the network, and the network provides the UE with optimal mobility through handover. Such measurement is often called RRM (Radio Resource Management).

Meanwhile, the UE 100 monitors downlink quality of the primary cell (Pcell) by using the CRS, which is called RLM (Radio Link Monitoring). To perform RLM, the UE 100 estimates downlink quality and compares the estimated downlink quality with Qout and Qin, for example. The threshold value Qout is defined as the level at which downlink data may not be received reliably, which corresponds to 10% error of PDCCH transmission if the PCFICH error is taken into account. The threshold value Qin is defined as the level considerably reliable for downlink data compared with the Qout, which corresponds to 2% error of PDCCH transmission if the PCFICH error is taken into account.

As can be seen with reference to FIG. 10, if the serving cell 200a and neighboring cells 200b transmit CRSs (Cell-specific Reference Signals) respectively to the UE 100, the UE 100 performs measurement through the CRS and transmits the RRC measurement report message including the measurement result to the serving cell 200a.

At this time, the UE 100 may perform measurement by using the following three methods.

1) RSRP (Reference Signal Received Power): RSRP represents the average received power of all REs carrying the CRS transmitted across the whole frequency band. At this time, instead of using the CRS, the average received power of all REs carrying a CRI RS may be measured.

2) RSSI (Received Signal Strength Indicator): RSSI represents received power measured across the whole frequency band. RSSI includes all of a signal, interference, and thermal noise.

3) RSRQ (Reference Symbol Received Quality): RSRQ represents CQI and may be determined by RSRP/RSSI according to measurement bandwidth or sub-band. In other words, RSRQ represents SINR (Signal-to-noise Interference Ratio). Since RSRP does not provide sufficient mobility information, RSRP or RSRQ may be used instead during handover or cell reselection process.

RSRQ may be obtained by RSSI/RSSP.

Meanwhile, to perform the measurement above, the UE 100 receives measurement configuration (in what follows, it is also called 'measconfig') information element (IE) from the serving cell 100a. A message which includes the measconfig IE is denoted as a measurement configuration message. At this time, the measconfig IE may be received through an RRC connection re-establishment message. If the measurement result satisfies a report condition within measurement configuration information, the UE reports the measurement result to the base station. A message which includes the measurement result is called a measurement report message.

The measconfig IE may include measurement object information. The measurement object information is the information about an object for which the UE performs measurement. The measurement object includes at least one of an intra-frequency measurement object which is a measurement object within a cell, inter-frequency measurement object which is a measurement object between cells, and inter-RAT measurement object which is a measurement object of inter-RAT measurement. For example, an intra-frequency measurement object indicates a neighboring cell having the same frequency band with the serving cell, inter-frequency measurement object indicates a neighboring cell having a different frequency band from the serving cell, and inter-RAT measurement object may indicate a neighboring cell using a different RAT from that of the serving cell More specifically, the measconfig IE includes information elements (IEs) as shown in the table below.

TABLE 3

```
MeasConfig ::=
    -- Measurement objects
        measObjectToRemoveList
        measObjectToAddModList
    -- Other parameters
        measGapConfig
```

The measurement object IE may include measObjectToRemoveList which contains a list of measObjects to be removed and measObjectToAddModList containing a list to be added or modified.

Meanwhile, the measGapConfig is used to set up or release a measurement gap (MG).

The measurement gap (MG) is an interval in which identification of a cell on a different inter-frequency from that of the serving cell and RSRP measurement are performed.

Meanwhile, the UE 100 receives radio resource configuration IE as shown in the figure.

The radio resource configuration dedicated IE is used for establishing/modifying/releasing a radio bearer or modifying the MAC structure. The radio resource configuration IE includes subframe pattern information. The subframe pattern information is the information about a measurement resource restriction pattern on the time domain for measuring RSRP and RSRQ of the serving cell (for example, the primary cell).

Figure 11:
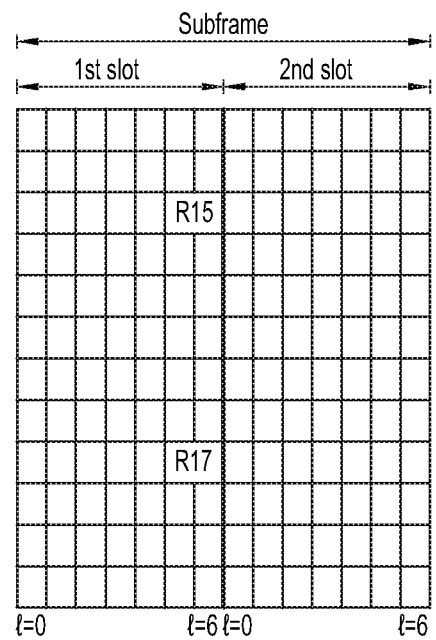
FIG. 11 illustrates one example of an RB to which a CSI-RS is mapped among reference signals.
Figure 11:
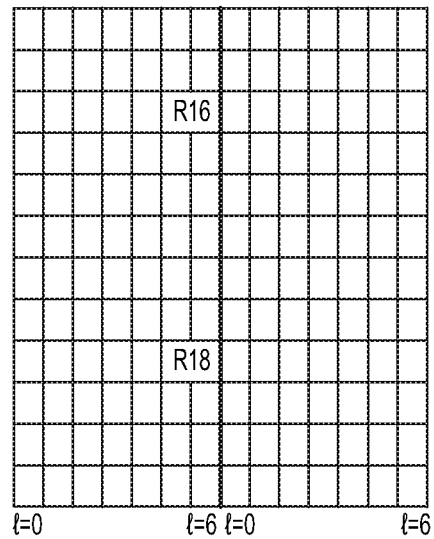
Figure 11:
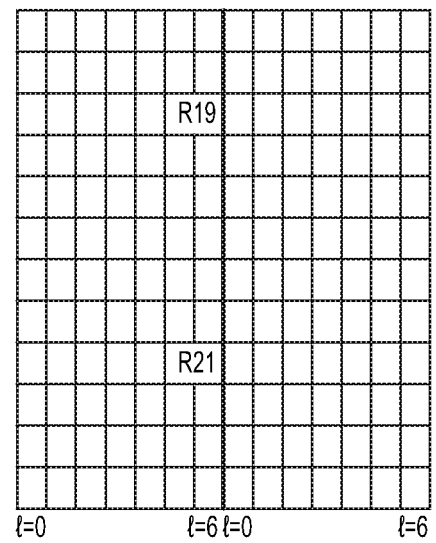
Figure 11:
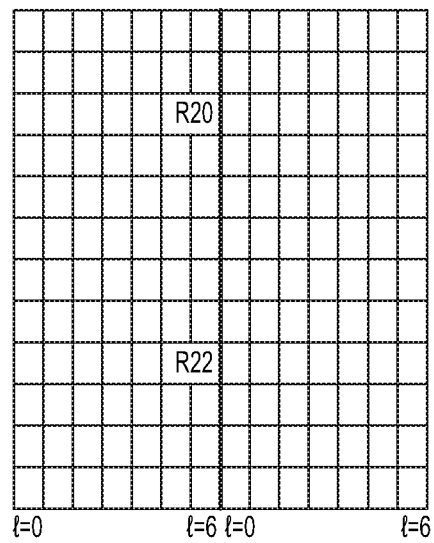

FIG. 11 illustrates one example of an RB to which a CSI-RS is mapped among reference signals.

The LTE-A terminal uses the CSI-RS for channel estimation of the PDSCH and channel measurement for generating channel information. The CSI-RS is disposed sparsely in the frequency or time domain and may be punctured in a normal subframe or in the data area of the MBSFN subframe. In case the CSI-RS is required for the estimation of CSI, the UE may report CQI, PMI, and RI.

A CSI-RS is transmitted though one, two, four, or eight antenna ports. The antenna port used for this case is p=15; p=15, 16; p=15, . . . , 18; and p=15, . . . , 22, respectively. In other words, a CSI-RS may be transmitted through one, two, four, or eight antenna ports. A CSI-RS may be defined only for the subcarrier interval of $\Delta f$=15 kHz. The clause 6.10.5 of the 3GPP (3rd Generation Partnership Project) TS 36.211 V10.1.0 (2011-03) "Technical Specification Group Radio Access Network; Evolved Universal Terrestrial Radio Access (E-UTRA); Physical channels and modulation (Release 8)" may be referenced for the CSI-RS.

To transmit a CSI-RS, a maximum of 32 different configurations may be proposed to reduce inter-cell interference (ICI) in a multi-cell environment including a heterogeneous network (HetNet) environment. The CSI-RS configuration differs according to the number of antenna ports within a cell and CP; and neighboring cells may have configurations as different as possible from each other. Also, depending on frame structure, the CSI-RS configuration may be divided into the case where it is applied to both of the FDD and TDD frames and the case where it is applied only to the TDD frame. A plurality of CSI-RS configuration may be used within one cell. For a UE which assumes non-zero power CSI-RS, 0 or 1 CSI-RS configuration may be used while 0 or several CSI-RS configurations may be used for a UE which assumes zero power CSI-RS.

The table below shows a structure of CSI-RS in a normal CP.

TABLE 4

| | CSI-RS configuration index | The number of CSI-RSs | | | | | |
|---|---|---|---|---|---|---|---|
| | | 1 or 2 | | 4 | | 8 | |
| | | (k', l') | $n_s$ mod 2 | (k', l') | $n_s$ mod 2 | (k', l') | $n_s$ mod 2 |
| TDD and FDD frame | 0 | (9, 5) | 0 | (9, 5) | 0 | (9, 5) | 0 |
| | 1 | (11, 2) | 1 | (11, 2) | 1 | (11, 2) | 1 |
| | 2 | (9, 2) | 1 | (9, 2) | 1 | (9, 2) | 1 |
| | 3 | (7, 2) | 1 | (7, 2) | 1 | (7, 2) | 1 |
| | 4 | (9, 5) | 1 | (9, 5) | 1 | (9, 5) | 1 |
| | 5 | (8, 5) | 0 | (8, 5) | 0 | | |
| | 6 | (10, 2) | 1 | (10, 2) | 1 | | |
| | 7 | (8, 2) | 1 | (8, 2) | 1 | | |
| | 8 | (6, 2) | 1 | (6, 2) | 1 | | |
| | 9 | (8, 5) | 1 | (8, 5) | 1 | | |
| | 10 | (3, 5) | 0 | | | | |
| | 11 | (2, 5) | 0 | | | | |
| | 12 | (5, 2) | 1 | | | | |
| | 13 | (4, 2) | 1 | | | | |
| | 14 | (3, 2) | 1 | | | | |
| | 15 | (2, 2) | 1 | | | | |
| | 16 | (1, 2) | 1 | | | | |
| | 17 | (0, 2) | 1 | | | | |
| | 18 | (3, 5) | 1 | | | | |
| | 19 | (2, 5) | 1 | | | | |
| TDD frame | 20 | (11, 1) | 1 | (11, 1) | 1 | (11, 1) | 1 |
| | 21 | (9, 1) | 1 | (9, 1) | 1 | (9, 1) | 1 |
| | 22 | (7, 1) | 1 | (7, 1) | 1 | (7, 1) | 1 |
| | 23 | (10, 1) | 1 | (10, 1) | 1 | | |
| | 24 | (8, 1) | 1 | (8, 1) | 1 | | |
| | 25 | (6, 1) | 1 | (6, 1) | 1 | | |

TABLE 4-continued

| CSI-RS configuration index | The number of CSI-RSs | | | | | |
|---|---|---|---|---|---|---|
| | 1 or 2 | | 4 | | 8 | |
| | (k', l') | $n_s$ mod 2 | (k', l') | $n_s$ mod 2 | (k', l') | $n_s$ mod 2 |
| 26 | (5, 1) | 1 | | | | |
| 27 | (4, 1) | 1 | | | | |
| 28 | (3, 1) | 1 | | | | |
| 29 | (2, 1) | 1 | | | | |
| 30 | (1, 1) | 1 | | | | |
| 31 | (0, 1) | 1 | | | | |

The table below shows a structure of CSI-RS in an extended CP.

TABLE 5

| | CSI-RS configuration index | The number of CSI-RSs | | | | | |
|---|---|---|---|---|---|---|---|
| | | 1 or 2 | | 4 | | 8 | |
| | | (k', l') | $n_s$ mod 2 | (k', l') | $n_s$ mod 2 | (k', l') | $n_s$ mod 2 |
| TDD and FDD frame | 0 | (11, 4) | 0 | (11, 4) | 0 | (11, 4) | 0 |
| | 1 | (9, 4) | 0 | (9, 4) | 0 | (9, 4) | 0 |
| | 2 | (10, 4) | 1 | (10, 4) | 1 | (10, 4) | 1 |
| | 3 | (9, 4) | 1 | (9, 4) | 1 | (9, 4) | 1 |
| | 4 | (5, 4) | 0 | (5, 4) | 0 | | |
| | 5 | (3, 4) | 0 | (3, 4) | 0 | | |
| | 6 | (4, 4) | 1 | (4, 4) | 1 | | |
| | 7 | (3, 4) | 1 | (3, 4) | 1 | | |
| | 8 | (8, 4) | 0 | | | | |
| | 9 | (6, 4) | 0 | | | | |
| | 10 | (2, 4) | 0 | | | | |
| | 11 | (0, 4) | 0 | | | | |
| | 12 | (7, 4) | 1 | | | | |
| | 13 | (6, 4) | 1 | | | | |
| | 14 | (1, 4) | 1 | | | | |
| | 15 | (0, 4) | 1 | | | | |
| | 16 | (11, 1) | 1 | (11, 1) | 1 | (11, 1) | 1 |
| | 17 | (10, 1) | 1 | (10, 1) | 1 | (10, 1) | 1 |
| | 18 | (9, 1) | 1 | (9, 1) | 1 | (9, 1) | 1 |
| | 19 | (5, 1) | 1 | (5, 1) | 1 | | |
| | 20 | (4, 1) | 1 | (4, 1) | 1 | | |
| TDD frame | 21 | (3, 1) | 1 | (3, 1) | 1 | | |
| | 22 | (8, 1) | 1 | | | | |
| | 23 | (7, 1) | 1 | | | | |
| | 24 | (6, 1) | 1 | | | | |
| | 25 | (2, 1) | 1 | | | | |
| | 26 | (1, 1) | 1 | | | | |
| | 27 | (0, 1) | 1 | | | | |

The UE may transmit the CSI-RS only in a downlink slot satisfying the condition of $n_s$ mode 2 shown in the table above. Also, the UE does not transmit a CSI-RS for a special frame of the TDD frame and the subframe for which transmission of the CSI-RS collides with a synchronization signal, PBCH (Physical Broadcast Channel), and system information block type 1 (SystemInformationBLockType 1) or for the subframe to which a paging message is transmitted. Also, for a set S where S={15}, S={15, 16}, S={17, 18}, or S={21, 22}, the resource element to which the CSI-RS of one antenna port is transmitted is not used for transmission of the PDSCH or transmission of the CSI-RS of a different antenna port.

Meanwhile, FIG. 11 shows resource elements used for the CSI-RS when the CSI-RS configuration index is 0 in the case of a normal CP. Rp represents a resource element used for transmission of a CSI-RS on the antenna port p. Referring to the figure, the CSI-RS for the antenna port 15 and 16 is transmitted through the resource element corresponding to the third subcarrier (subcarrier index 2) of the sixth and the seventh OFDM symbol (OFDM symbol index 5 and 6) of the first slot. The CSI-RS for the antenna port 17 and 18 is transmitted through the resource element corresponding to the ninth subcarrier (subcarrier index 8) of the sixth and seventh OFDM symbol (OFDM symbol index 5 and 6) of the first slot. The CSI-RS for the antenna port 19 and 20 is transmitted through the same resource element through which the CSI-RS for the antenna port 15 and 16 is transmitted while the CSI-RS for the antenna port 21 and 22 is transmitted through the same resource element through which the CSI-RS for the antenna port 17 and 18 is transmitted.

If a CSI-RS is transmitted to the UE through 8 antenna ports, the UE will receive an RB to which R15 to R22 are mapped. In other words, the UE will receive the CSI-RS having a specific pattern.

Meanwhile, descriptions will be given with respect to small cells.

<Introduction of Small Cell>

Meanwhile, in the next-generation mobile communication system, small cells having small cell coverage are expected to be added into the existing cell coverage and to deal with much more traffic. Since the conventional cell provides coverage larger than that of the small cell, it is also called a macro cell. In what follows, descriptions will be given with reference to FIG. 7.

Figure 12:
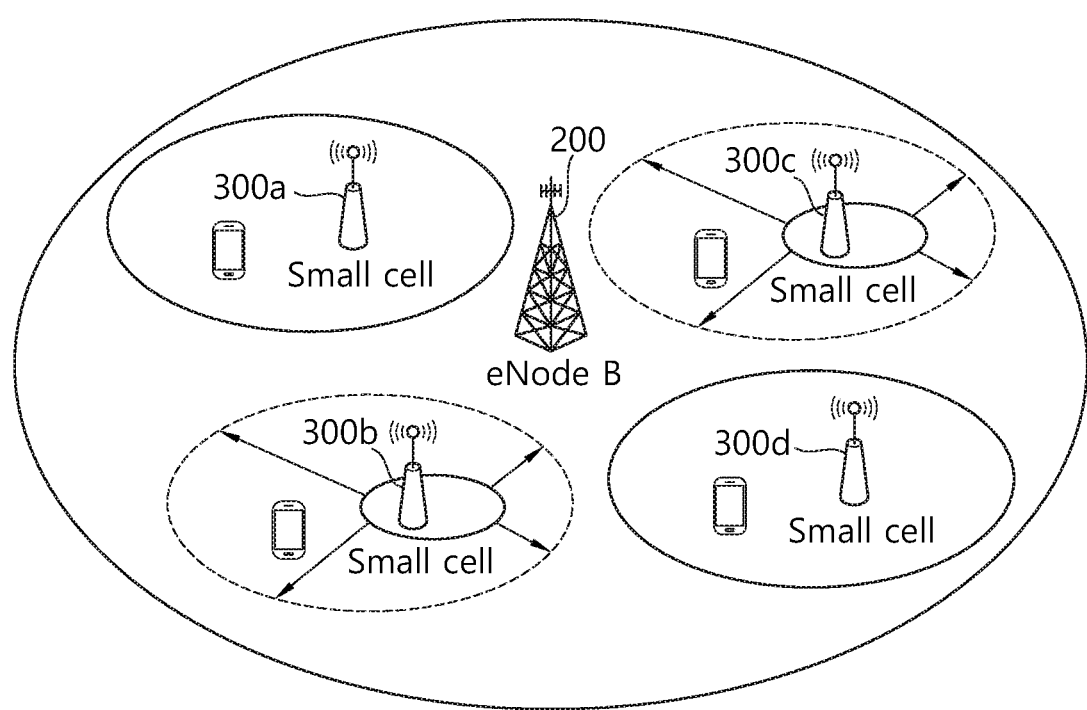
FIG. 12 illustrates a heterogeneous network in which a macro cell and small cells are mixed, which may evolve to the next-generation communication system.

FIG. 12 illustrates a heterogeneous network in which a macro cell and small cells are mixed, which may evolve to the next-generation communication system.

Referring to FIG. 12, a macro cell due to an existing eNB 200 forms a heterogeneous network being overlapped with small cells due to one or more small eNBs 300a, 300b, 300c, 300d. Since the existing eNB provides larger coverage than the small eNBs, it is also called a macro eNodeB (or MeNB). In this document, the term of macro cell and the term of macro eNodeB will be used interchangeably. A UE connected to the macro cell 200 may be called a macro UE. The macro UE receives a downlink signal from the MeNB and transmits an uplink signal to the MeNB.

In the heterogeneous network as described above designate the macro cell as the primary cell (Pcell) and the small cell as the secondary cell (Scell), thereby filling up the coverage gap inherent in the macro cell. Also, by designating the small cell as the Pcell and the macro cell as the secondary cell, the overall performance may be boosted.

On the other hand, according as small cells are disposed, inter-cell interference may become more severe. To solve this problem, as shown in the figure, the coverage of the small cell may be reduced depending on the situation. Or the small cell may be turned off or on again depending on the situation.

Figure 13:
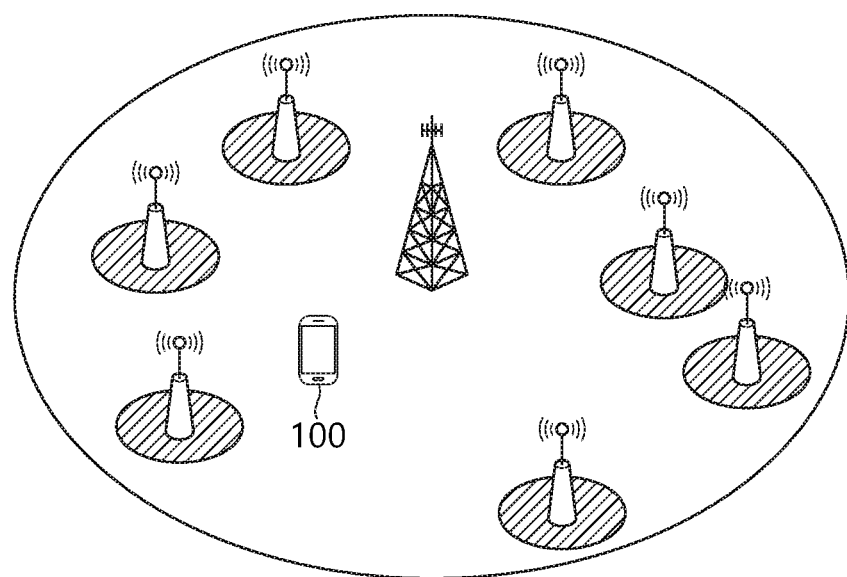
FIG. 13 illustrates a situation in which small cells are distributed densely.

FIG. 13 illustrates a situation in which small cells are distributed densely.

Referring to FIG. 13, small cells are distributed densely within the coverage of a macro cell. In this situation, the UE 100 may find it difficult to detect the small cells quickly. In particular, as described above, detection of a cell is performed through reception of PSS/SSS. However, if a plurality of small cells attempts to transmit the PSS/SSS at the same time, namely on the 0-th and fifth subframe, the UE 100 may have a difficulty in receiving the PSS/SSS simultaneously. Moreover, since interference is caused as small cells transmit the PSS/SSS simultaneously on the 0-th and the fifth subframe, the UE may not receive the PSS/SSS properly.

To solve the problem above, a small cell may transmit a new discovery signal (DS) in addition to the existing PSS/SSS. In what follows, descriptions will be given with reference to FIG. 14.

Figure 14:
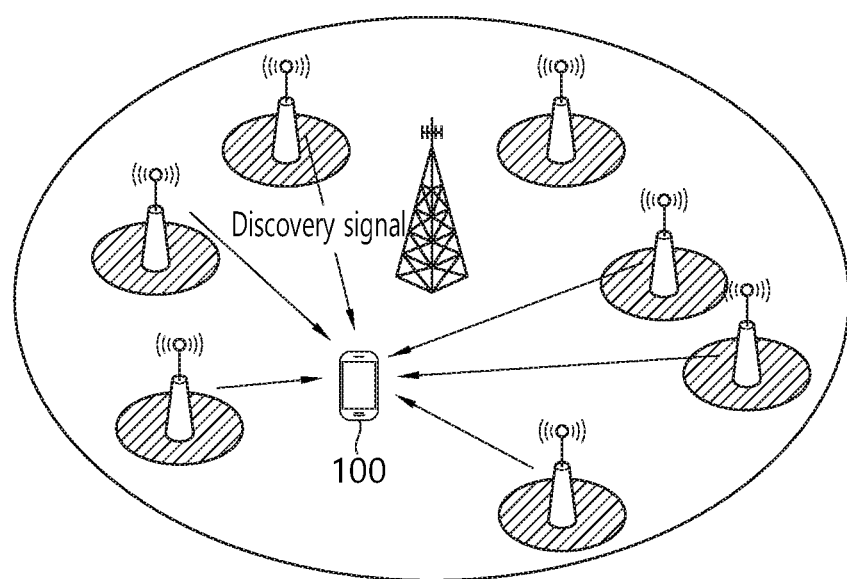
FIG. 14 illustrates an example in which small cells transmit a discovery signal.

FIG. 14 illustrates an example in which small cells transmit a discovery signal.

As shown in FIG. 14, in order to enable the UE to detect small cells efficiently, small cells may transmit a new discovery signal (DS) in addition to the existing PSS/SSS. A small cell which is in the turn-off state may also transmit the discovery signal periodically.

The DS may be called a discovery reference signal (DRS). Accordingly, the UE has to perform a cell search procedure or cell detection procedure using the DS in addition to the existing PSS/SSS.

Figure 15:
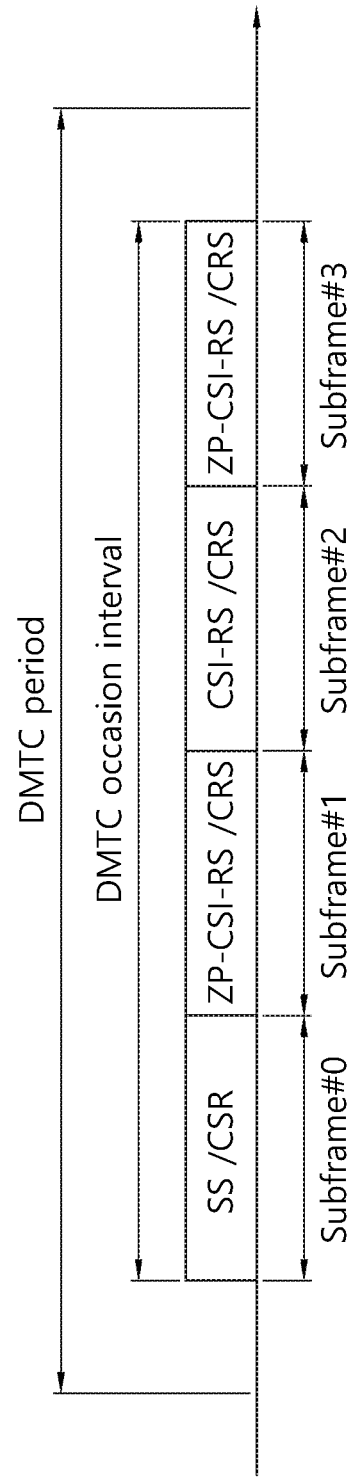
FIG. 15 illustrates a discovery signal.

FIG. 15 illustrates a discovery signal.

As shown in FIG. 15, a DS may be a combination of the following signals:
CRS of the antenna port 0 during DwPTS of all of downlink subframes and special subframe,
PSS on the first subframe within the period for the case of frame type 1 for the FDD or PSS on the second subframe within the period for the case of frame type 2 for the TDD,
SSS on the first subframe within the period, and
CSI-RS of non-zero power on zero or one or more subframes within the period.

In other words, the DS may be a combination of CRS, SS (namely PSS and SSS), and CSI-RS.

Meanwhile, as shown in FIG. 15, the occasion interval of a DS may be composed of by the following:
one to five consecutive subframes for the case of frame type 1 for the FDD, and
two to five consecutive subframes for the case of subframes for the TDD.

Meanwhile, the UE may receive Discovery Signal Measurement Timing Configuration (DMTC) which is the timing information for measurement based on the discovery signal from the eNB. The DMTC may be received in the form of MeasDS-Config field as shown in the table below. The MeasDS-Config may be received by being included in the measurement objects shown in Table 3. In other words, the MeasDS-Config field defining the DMTC may be received by being included in the measurement objects within the MeasConfig of Table 3.

The UE does not assume that a discovery signal is transmitted on the subframe not defined in the DMTC.

TABLE 6

Description of MeasDS-Config field csi-RS-IndividualOffset
Individual CSI-RS offset applicable to a specific CSI-RS resource
dmtc-PeriodOffset
dmtc-PeriodOffset represents DMTC periodicity (dmtc-periodicity) and DMTC offset (dmtc-Offset) for a given frequency. The DMTC period may be 40 ms, 80 ms, or 160 ms. The DMTC offset is expressed by the number of subframes. The DMTC occasion interval is 6 ms.
ds-OccasionDuration
ds-OccasionDuration represents the occasion interval of a discovery signal with respect to a given frequency. The occasion interval of a discovery signal is common to all the cells transmitting a discovery signal at the given frequency.
physCellId
phyCellId represents a physical cell ID. The UE assumes that CSI-RS corresponding to the physical cell ID and PSS/SSS/CRS correspond to average delay and quasi co-location with respect to Doppler shift.
resourceConfig
resourceConfig represents CSI-RS configuration.
subframeOffset
subframeOffset represents a subframe offset between SSS of a cell identified by the physical cell ID within the discovery signal occasion interval and the CSI-RS resource.

In the table above, the dmtc-Periodicity is a measurement period, indicating one of 40 ms, 80 ms, or 160 ms. For example, the UE may perform measurement based on the discovery signal (DS) every 160 ms. The ds-OccasionDuration is the occasion interval of the discovery signal; in the case of FDD, it indicates the number of appropriate subframes among 1 to 5 consecutive subframes, and in the case of TDD, it indicates the number of appropriate subframes among 2 to 5 consecutive subframes. The DMTC occasion interval is a measurement performance interval. For example, in case the dmtc-Periodicity is 160 ms, and the DMTC occasion interval is 6 ms, the UE measures the discovery signal from a small cell for the period of 6 ms every 160 ms.

Meanwhile, descriptions about the small cell given so far may be summarized as follows.

For identification and measurement of a small cell, a discovery signal and a measurement interval have been newly defined. To identify and measure a small cell, the UE uses DMTC (Discovery Signal Measurement Timing Configuration) information received from the serving cell. The occasion interval of the DMTC is 6 ms, and period of the DMTC is one of 40 ms, 80 ms, and 160 ms. In other words, the UE performs the operation of detecting and measuring a small cell within the interval of 6 ms, which is the DMTC occasion interval. According to the occasion interval of the discovery signal, in the case of FDD, the DS may be received on the 1 to 5 consecutive subframes while the DS may be received on the 2 to 5 consecutive subframes. Among the subframes, SSS and CRS are received on the first subframe, and for the case of FDD, PSS is additionally received. In the case of TDD, PSS is received on the second subframe among the subframes.

The small cell may be turned on/off; since the UE is unable to know beforehand as to whether the small cell is in the on-state or off-state, irrespective of the small cell's state (either on or off-state), the UE always performs the operation of detecting and measuring a cell by using the discovery signal.

The purpose of the discovery signal is acquisition of synchronization through PSS/SSS, RSRP measurement based on the CRS, acquisition of CSI-RS, and RSRP measurement based on the CSI-RS.

The occasion interval of the discovery signal includes 1 to 5 consecutive subframes in the case of FDD and includes 2 to 5 subframes in the case of TDD.

As described above, SSS/CRS in the occasion interval of the discovery signal is received on the first subframe, and the CSI-RS is received at the position separated by the subframeoffset value of Table 3 from the SSS subframe.

Figure 16:
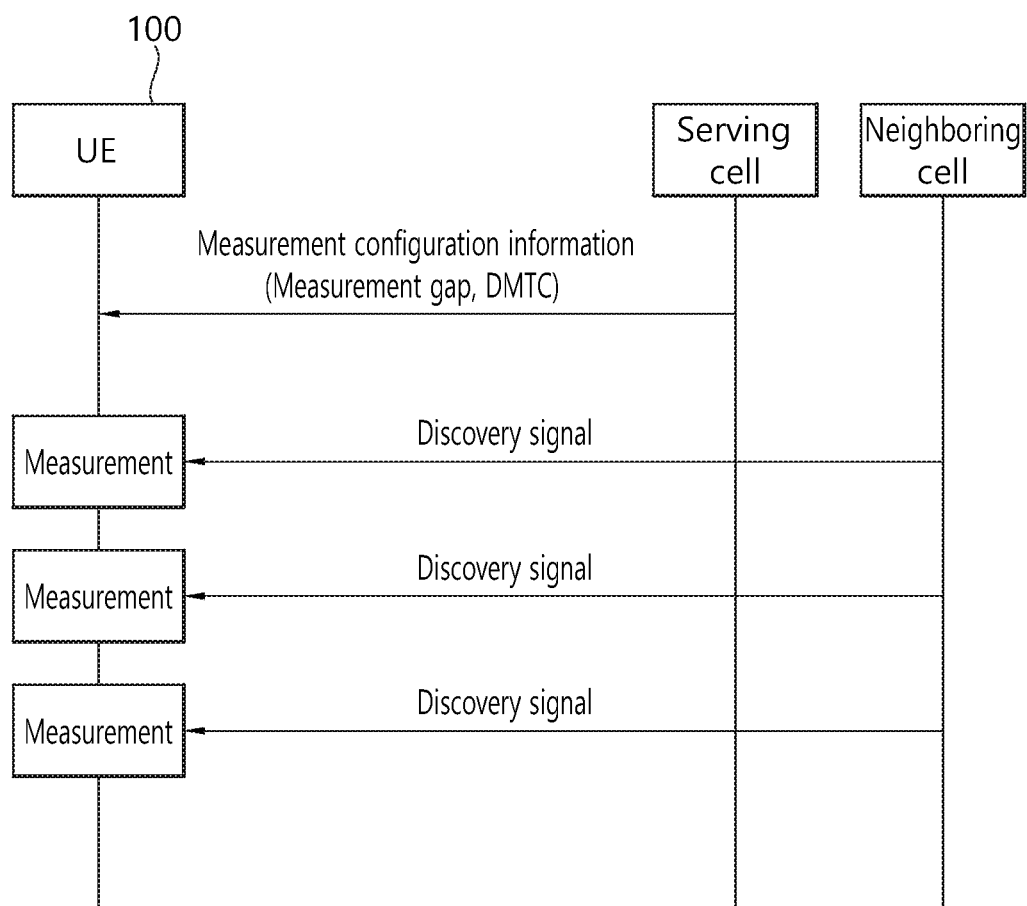
FIG. 16 illustrates a measurement process based on a discovery signal.

FIG. 16 illustrates a measurement process based on a discovery signal.

As shown in FIG. 16, the UE 100 receives measurement configuration information from a serving cell. The measurement configuration information may be the measconfig as shown in Table 3. The measurement configuration information, namely measurement object within the measconfig may include measurement timing configuration (DMTC) based on the discovery signal for a neighboring small cell, namely MeasDS-Config.

At this time, the DMTC, namely MeasDS-Config may include dmtc-Periodicity, DMTC occasion interval, and information about the occasion interval of the discovery signal, namely ds-OccasionDuration.

Afterwards, the UE 100 performs measurement of the discovery signal of the small cell during the DMTC occasion interval, namely for 6 ms every dmtc-Periodicity, namely 40 ms, 80 ms, or 160 ms.

It should be noted, however, that research on how many times the UE 100 has to perform measurement to obtain desired measurement accuracy has not been conducted yet. In other words, it is uncertain how many times during the total measurement period the UE has to perform measurement to obtain the desired measurement accuracy. For example, suppose dmtc-Periodicity is 160 ms and the UE 100 performs measurement every 160 ms. In this case it is unclear how many times (for example, i times) during the total period of measurement (i*160 ms) the UE has to perform measurement to obtain desired accuracy.

DISCLOSURE OF THE PRESENT INVENTION

Therefore, this document aims to provide a method for solving the problem above.

I. First Disclosure of the Present Invention

The first disclosure of the present invention specifies according to a simulation study as to how long (i*160 ms) the UE has to perform measurement based on the discovery signal with respect to a small cell.

I-1. Simulation Environment

I-1-1. Simulation Environment for RSRP Measurement Based on the CRS Out of Discovery Signal It is assumed that the UE is capable of performing based on the CRS out of the discovery signal during the occasion interval of the discovery signal for all of downlink subframes and DwPTS.

Also, the following are the simulation parameters.

1) Side conditions

The SNR condition as shown below may be re-used for the conventional CRS measurement.

SNR: {−10, −8, −6, −3, 0} dB

2) Occasion interval of discovery signal

It is assumed that the occasion interval of a discovery signal in an arbitrary small cell is 1, 3, or 5 subframes.

At this time, it is assumed that all of downlink subframes include a CRS.

If dmtc-Periodicity representing a measurement period is denoted by M ms, M is 160.

3) Measurement bandwidth: {6 RBs, 25 RBs, 50 RBs}

4) Total measurement interval: i*160 ms, i={1, 3, 5}

The table below summarizes the assumptions and conditions described above.

TABLE 7

| parameter | Value | Description |
| --- | --- | --- |
| SNR | {−10, −8, −6, −3, 0} dB | |
| Measurement bandwidth | {6 RBs, 25 RBs, 50 RBs} | |
| The number of transmitting (Tx) antennas | {1} | |
| The number of receiving (Rx) antenna | 2 | |
| Antenna correlation | Low | |
| DMTC period (M) | 160 | Measurement is performed every M ms |
| Occasion interval (N) of discovery signal | 1 | Discovery signal occurs at N subframes |
| Measurement interval | i * 160 ms, i = {1, 3, 5} | |
| L3 filtering | Disable | |
| DRX (discontinuous reception) | OFF | |
| Propagation condition | AWGN, EPA5, ETU30 | |
| CP length | Normal | |

AWGN stands for Additive White Gaussian Noise.
EPA5 denotes Doppler frequency of 5 MHz for the Extended Pdestrian A model.
ETU30 denotes Doppler frequency of 30 MHz for the Extended Typical Urban model.

I-1-2. Simulation Environment for RSRP Measurement Based on the CSI-RS Out of Discovery Signal It is assumed that the UE receives a CSI-RS in case the corresponding CSI-RS is included in the discovery signal (DS).

Also, the following are the simulation parameters.

1) Side conditions: SNR: {−4, −3, 0, 3} dB

2) Occasion interval of discovery signal 1, 3, or 5 subframes.

DMTC period is M ms, where M is 160.

3) Transmission of CSI-RS

It is assumed that during the occasion interval of discovery signal (DS), the UE receives a CSI-RS from at least one subframe.

4) Measurement bandwidth: {6 RBs, 25 RBs, 50 RBs}

5) Measurement interval: i*160 ms, i={1, 3, 5}

The table below summarizes the assumptions and conditions described above.

TABLE 8

| parameter | Value | Description |
|---|---|---|
| SNR | {−4, −3, 0, 3} dB | |
| Measurement bandwidth | {6 RBs, 25 RBs, 50 RBs} | |
| The number of transmitting (Tx) antennas | 1 | |
| The number of receiving (Rx) antenna | 2 | |
| Antenna correlation | Low | |
| CSI-RS | Antenna port {15} | |
| DMTC period (M) | 160 | Measurement is performed every M ms |
| Occasion interval (N) of discovery signal | 1, 3, or 5 subframes | |
| CSI-RS transmission | 1 subframe by default | |
| CSI-RS configuration | CSI-RS configuration index 1 | |
| Measurement interval | i * 160 ms, i = {1, 3, 5} | |
| L3 filtering | Disable | |
| DRX | OFF | |
| Propagation condition | AWGN, EPA5, ETU30 | |
| CP length | Normal | |

I-2. Simulation Result

The curvature of a cumulative distribution function (CDF) is used as a performance metric to specify the following.

CRS-based delta RSRP=(measure CRS-based RSRP−CRS-based ideal RSRP) [dB]

CSI-RS based delta RSRP=(measured CSI-RS based RSRP−CSI-RS based ideal RSRP) [dB]

The experimental result below is based on the condition that the occasion interval of the discovery signal ranges one subframe.

I-2-1. Simulation Result of RSRP Measurement Based on the CRS Out of Discovery Signal First, in case the measurement bandwidth comprises 6 RBs, simulation results of CRS-based delta RSRP for AGWN, ETA5, and ETU30 are as follows.

Figure 17A:
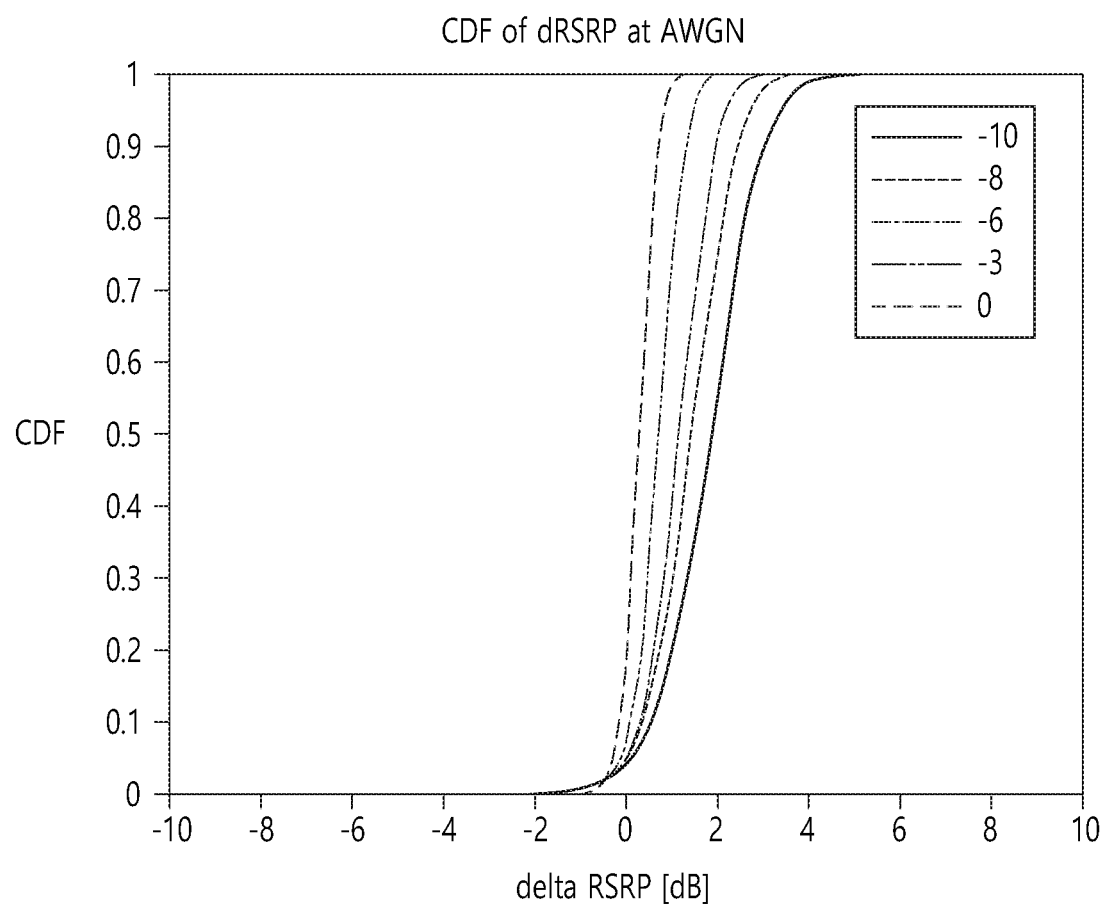
FIGS. 17a to 17c illustrate CRS-based delta RSRP at AGWN, ETA5, and ETU30 respectively when the measurement bandwidth comprises 6 RBs.
Figure 17B:
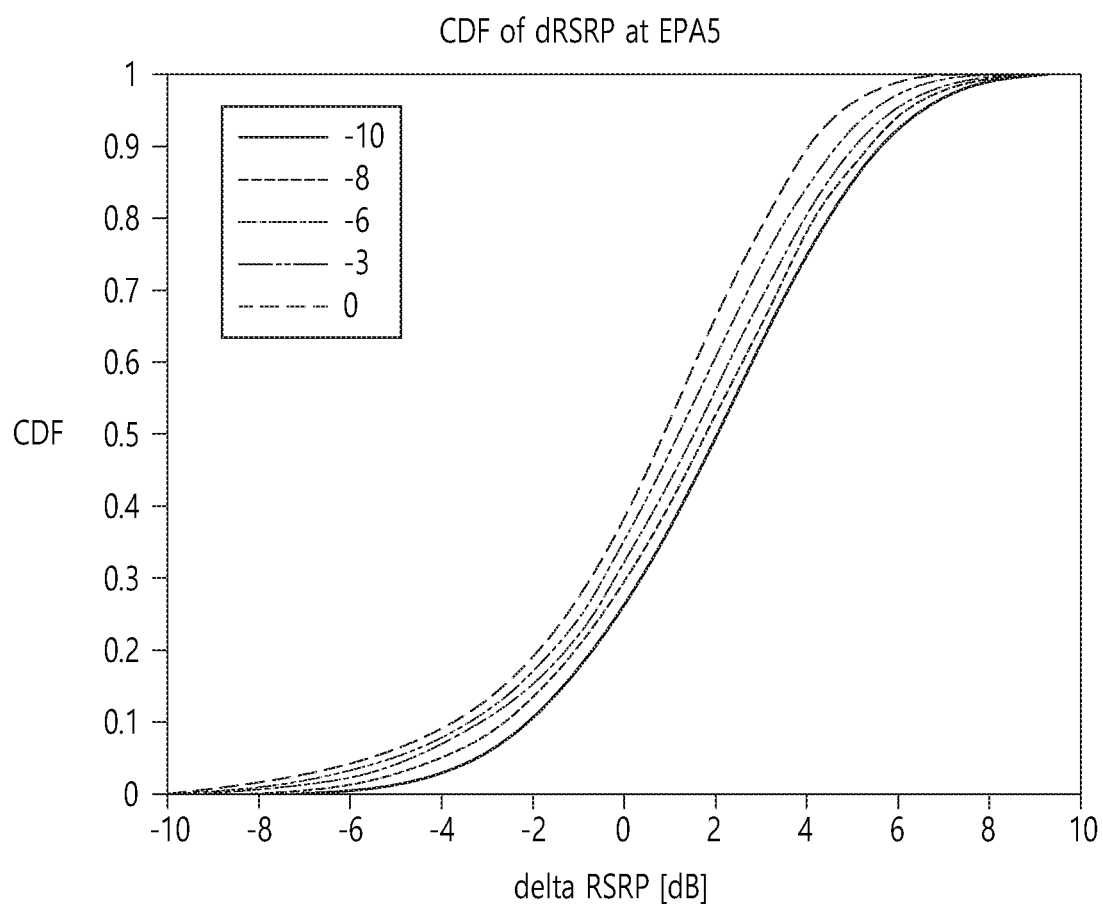
Figure 17C:
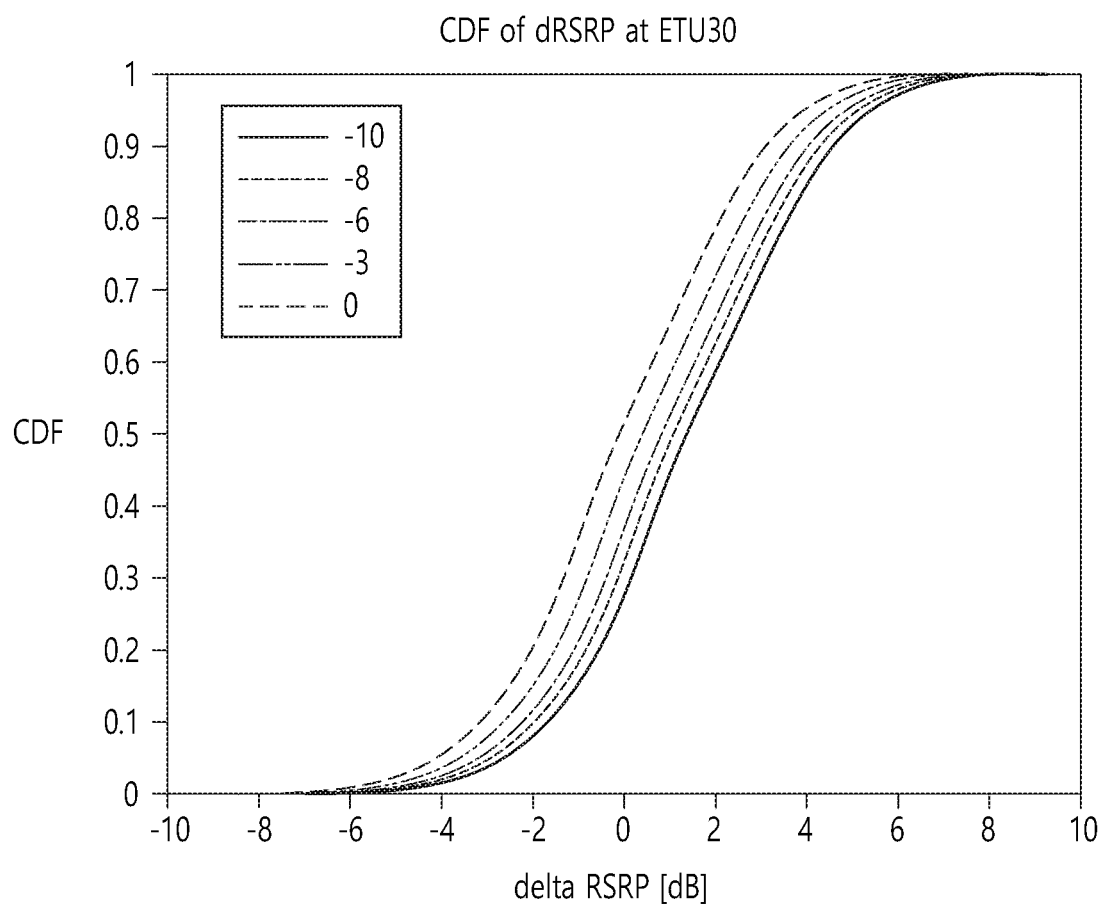

FIGS. 17a to 17c illustrate CRS-based delta RSRP at AGWN, ETA5, and ETU30 respectively when the measurement bandwidth comprises 6 RBs.

Each figure shows a CDF as the reference SNR varies from −10 dB to −8, −6, −3, and 0 dB.

As shown in FIGS. 17a to 17c, Table 9 summarizes the simulation result of CRS-based delta RSRP for AGWN, ETA5, and ETU30 when the measurement bandwidth comprises 6 RBs.

Even considering the RF defect of about 3 dB with respect to the absolute RSRP and the relative RSRP of 1 dB, the values not satisfying the current inter-frequency CRS-based requirements are shown being underlined in the table below.

TABLE 9

| Propagation condition | Reference SNR [dB] | Measurement interval (i * 160 ms), i | 50% | 5% | 95% | Relative accuracy [5%-50%, 95%-50%] | |
|---|---|---|---|---|---|---|---|
| AWGN | −10 | 1 | 1.82 | 0.15 | 3.37 | −1.67 | 1.55 |
| | | 3 | 1.60 | 0.67 | 2.55 | −0.94 | 0.95 |
| | | 5 | 1.52 | 0.81 | 2.28 | −0.71 | 0.76 |
| | −8 | 1 | 1.44 | 0.08 | 2.77 | −1.36 | 1.33 |
| | | 3 | 1.27 | 0.50 | 2.06 | −0.77 | 0.79 |
| | | 5 | 1.21 | 0.62 | 1.82 | −0.59 | 0.62 |
| | −6 | 1 | 1.16 | 0.07 | 2.21 | −1.10 | 1.05 |
| | | 3 | 1.02 | 0.38 | 1.64 | −0.64 | 0.62 |
| | | 5 | 0.96 | 0.48 | 1.46 | −0.48 | 0.49 |
| | −3 | 1 | 0.75 | −0.05 | 1.52 | −0.80 | 0.76 |
| | | 3 | 0.62 | 0.17 | 1.07 | −0.45 | 0.45 |
| | | 5 | 0.57 | 0.23 | 0.94 | −0.34 | 0.36 |
| | 0 | 1 | 0.33 | −0.27 | 0.83 | −0.60 | 0.50 |
| | | 3 | 0.22 | −0.11 | 0.54 | −0.33 | 0.32 |
| | | 5 | 0.19 | −0.07 | 0.44 | −0.26 | 0.26 |
| EPA5 | −10 | 1 | 2.08 | −3.16 | 6.48 | −5.23 | 4.40 |
| | | 3 | 2.09 | −0.95 | 4.78 | −3.03 | 2.70 |
| | | 5 | 1.99 | −0.29 | 4.15 | −2.28 | 2.16 |
| | −8 | 1 | 1.82 | −3.93 | 6.24 | −5.74 | 4.42 |
| | | 3 | 1.75 | −1.36 | 4.56 | −3.11 | 2.81 |
| | | 5 | 1.70 | −0.59 | 3.92 | −2.29 | 2.21 |
| | −6 | 1 | 1.58 | −4.58 | 5.95 | −6.16 | 4.36 |
| | | 3 | 1.47 | −1.69 | 4.26 | −3.17 | 2.79 |
| | | 5 | 1.41 | −0.90 | 3.67 | −2.31 | 2.26 |
| | −3 | 1 | 1.24 | −5.01 | 5.48 | −6.25 | 4.24 |
| | | 3 | 1.12 | −1.98 | 3.81 | −3.09 | 2.70 |
| | | 5 | 1.03 | −1.27 | 3.19 | −2.30 | 2.16 |
| | 0 | 1 | 0.86 | −5.39 | 4.87 | −6.25 | 4.01 |
| | | 3 | 0.66 | −2.37 | 3.25 | −3.03 | 2.58 |
| | | 5 | 0.59 | −1.65 | 2.65 | −2.24 | 2.06 |
| ETU30 | −10 | 1 | 1.47 | −2.49 | 5.41 | −3.95 | 3.94 |
| | | 3 | 1.40 | −0.90 | 3.76 | −2.30 | 2.36 |
| | | 5 | 1.32 | −0.46 | 3.23 | −1.77 | 1.92 |
| | −8 | 1 | 1.16 | −3.19 | 5.15 | −4.35 | 3.99 |
| | | 3 | 1.09 | −1.36 | 3.46 | −2.45 | 2.37 |
| | | 5 | 0.98 | −0.86 | 2.91 | −1.84 | 1.93 |
| | −6 | 1 | 0.86 | −3.63 | 4.86 | −4.49 | 4.00 |
| | | 3 | 0.81 | −1.75 | 3.17 | −2.56 | 2.36 |
| | | 5 | 0.69 | −1.27 | 2.62 | −1.97 | 1.92 |

TABLE 9-continued

| Propagation condition | Reference SNR [dB] | Measurement interval (i * 160 ms), i | 50% | 5% | 95% | Relative accuracy [5%-50%, 95%-50%] | |
|---|---|---|---|---|---|---|---|
| | −3 | 1 | 0.48 | −4.20 | 4.41 | −4.68 | 3.93 |
| | | 3 | 0.38 | −2.21 | 2.72 | −2.59 | 2.34 |
| | | 5 | 0.27 | −1.66 | 2.18 | −1.93 | 1.91 |
| | 0 | 1 | 0.10 | −4.70 | 3.86 | −4.80 | 3.76 |
| | | 3 | −0.05 | −2.53 | 2.20 | −2.48 | 2.25 |
| | | 5 | −0.16 | −2.09 | 1.67 | −1.92 | 1.83 |

Next, simulation results of CRS-based delta RSRP for AGWN, ETA5, and ETU30 when measurement bandwidth comprises 25 RBs are described below.

Figure 18A:
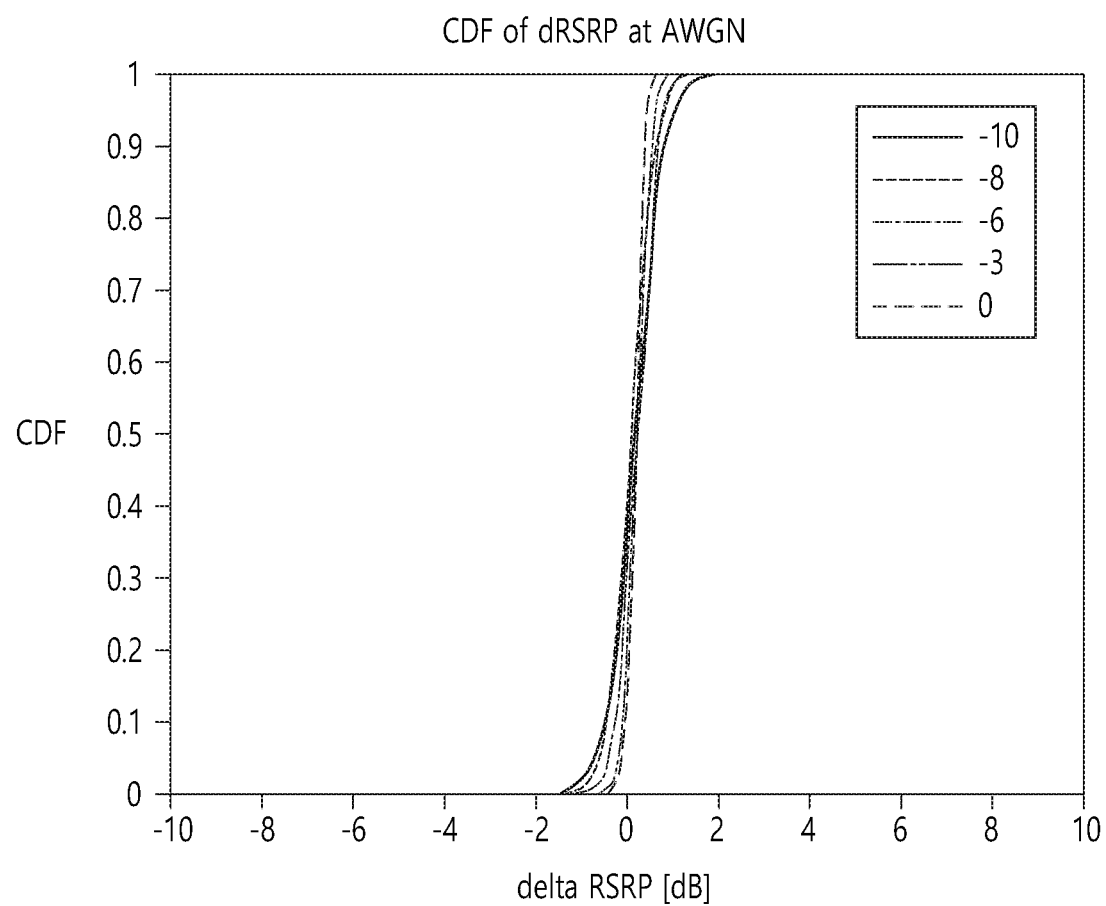
FIGS. 18a to 18c illustrate CRS-based delta RSRP at AGWN, ETA5, and ETU30 respectively when the measurement bandwidth comprises 25 RBs.
Figure 18B:
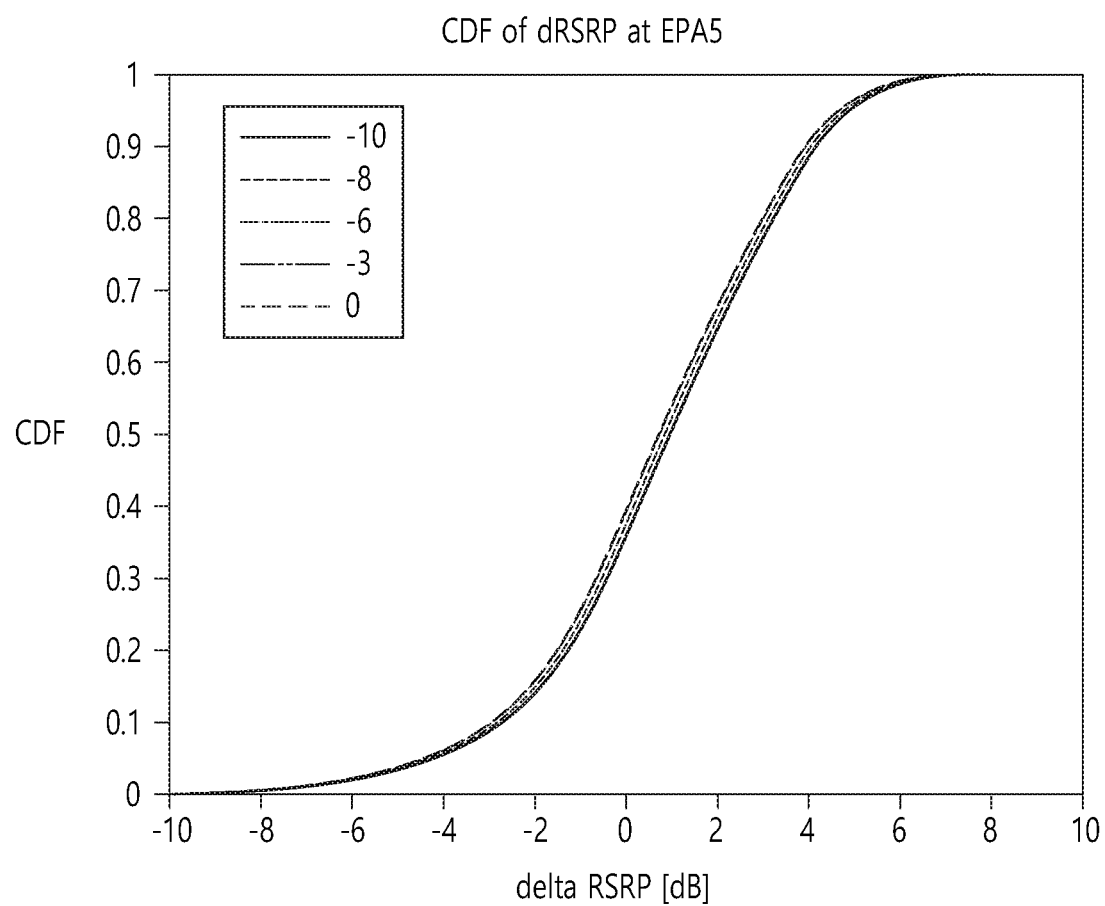
Figure 18C:
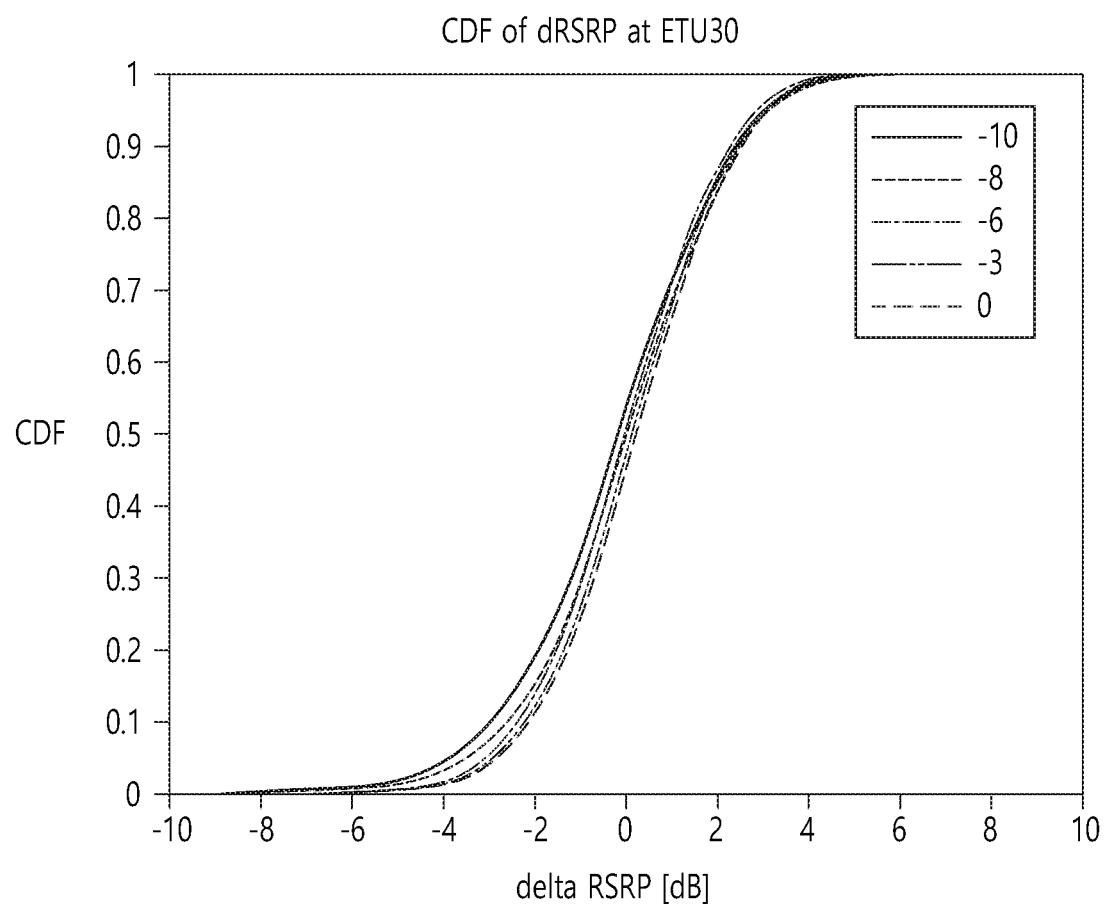

FIGS. 18a to 18c illustrate CRS-based delta RSRP at AGWN, ETA5, and ETU30 respectively when the measurement bandwidth comprises 25 RBs.

Each figure shows a CDF as the reference SNR varies from −10 dB to −8, −6, −3, and 0 dB.

As shown in FIGS. 18a to 18c, Table 10 summarizes the simulation result of CRS-based delta RSRP for AGWN, ETA5, and ETU30 when the measurement bandwidth comprises 6 RBs.

Even considering the RF defect of about 3 dB with respect to the absolute RSRP and the relative RSRP of 1 dB, the values not satisfying the current inter-frequency CRS-based requirements are shown being underlined in the table below. In the table below, the values closer to 0 indicate that more requirements are satisfied, and the values farther from 0 indicate that less requirements are satisfied.

TABLE 10

| Propagation condition | Reference SNR [dB] | Measurement interval (i*160 ms), i | 50% | 5% | 95% | Relative accuracy [5%-50%, 95%-50%] | |
|---|---|---|---|---|---|---|---|
| AWGN | −10 | 1 | 0.24 | −0.65 | 1.11 | −0.89 | 0.87 |
| | | 3 | 0.10 | −0.40 | 0.64 | −0.51 | 0.54 |
| | | 5 | 0.06 | −0.34 | 0.48 | −0.41 | 0.42 |
| | −8 | 1 | 0.13 | −0.56 | 0.84 | −0.69 | 0.71 |
| | | 3 | 0.03 | −0.38 | 0.44 | −0.41 | 0.41 |
| | | 5 | −0.01 | −0.32 | 0.31 | −0.31 | 0.33 |
| | −6 | 1 | 0.22 | −0.35 | 0.80 | −0.56 | 0.59 |
| | | 3 | 0.13 | −0.19 | 0.47 | −0.33 | 0.34 |
| | | 5 | 0.10 | −0.15 | 0.37 | −0.25 | 0.26 |
| | −3 | 1 | 0.27 | −0.13 | 0.68 | −0.40 | 0.41 |
| | | 3 | 0.21 | −0.02 | 0.45 | −0.23 | 0.24 |
| | | 5 | 0.19 | 0.00 | 0.38 | −0.19 | 0.19 |
| | 0 | 1 | 0.21 | −0.06 | 0.49 | −0.27 | 0.28 |
| | | 3 | 0.17 | 0.02 | 0.33 | −0.15 | 0.17 |
| | | 5 | 0.15 | 0.04 | 0.28 | −0.12 | 0.12 |
| EPA5 | −10 | 1 | 0.79 | −4.12 | 5.05 | −4.92 | 4.25 |
| | | 3 | 0.72 | −1.93 | 3.50 | −2.65 | 2.78 |
| | | 5 | 0.65 | −1.38 | 2.90 | −2.02 | 2.25 |
| | −8 | 1 | 0.82 | −4.09 | 5.06 | −4.91 | 4.24 |
| | | 3 | 0.74 | −1.90 | 3.50 | −2.64 | 2.76 |
| | | 5 | 0.67 | −1.33 | 2.92 | −2.00 | 2.26 |
| | −6 | 1 | 0.87 | −4.04 | 5.10 | −4.91 | 4.23 |
| | | 3 | 0.77 | −1.85 | 3.54 | −2.61 | 2.77 |
| | | 5 | 0.69 | −1.25 | 2.95 | −1.94 | 2.26 |
| | −3 | 1 | 0.92 | −3.97 | 5.10 | −4.89 | 4.18 |
| | | 3 | 0.81 | −1.75 | 3.56 | −2.57 | 2.75 |
| | | 5 | 0.74 | −1.20 | 2.97 | −1.94 | 2.23 |
| | 0 | 1 | 0.91 | −3.86 | 5.02 | −4.77 | 4.11 |
| | | 3 | 0.79 | −1.73 | 3.49 | −2.52 | 2.70 |
| | | 5 | 0.72 | −1.18 | 2.91 | −1.90 | 2.19 |
| ETU30 | −10 | 1 | −0.16 | −3.80 | 3.09 | −3.64 | 3.24 |
| | | 3 | −0.33 | −2.33 | 1.63 | −2.00 | 1.96 |
| | | 5 | −0.44 | −1.98 | 1.14 | −1.54 | 1.57 |
| | −8 | 1 | 0.07 | −3.44 | 3.18 | −3.51 | 3.11 |
| | | 3 | −0.13 | −2.06 | 1.74 | −1.93 | 1.88 |
| | | 5 | −0.22 | −1.73 | 1.28 | −1.51 | 1.50 |
| | −6 | 1 | 0.22 | −3.02 | 3.17 | −3.24 | 2.95 |
| | | 3 | 0.03 | −1.78 | 1.80 | −1.81 | 1.77 |
| | | 5 | −0.07 | −1.49 | 1.33 | −1.42 | 1.40 |
| | −3 | 1 | 0.14 | −2.96 | 3.05 | −3.10 | 2.90 |
| | | 3 | −0.05 | −1.78 | 1.68 | −1.74 | 1.72 |
| | | 5 | −0.13 | −1.49 | 1.23 | −1.36 | 1.36 |

TABLE 10-continued

| Propagation condition | Reference SNR [dB] | Measurement interval (i*160 ms), i | 50% | 5% | 95% | Relative accuracy [5%-50%, 95%-50%] | |
|---|---|---|---|---|---|---|---|
| | 0 | 1 | −0.01 | −3.03 | 2.84 | −3.02 | 2.85 |
| | | 3 | −0.20 | −1.91 | 1.49 | −1.71 | 1.69 |
| | | 5 | −0.29 | −1.63 | 1.03 | −1.34 | 1.32 |

Next, simulation results of CRS-based delta RSRP for AGWN, ETA5, and ETU30 when measurement bandwidth comprises 50 RBs are described below.

Figure 19A:
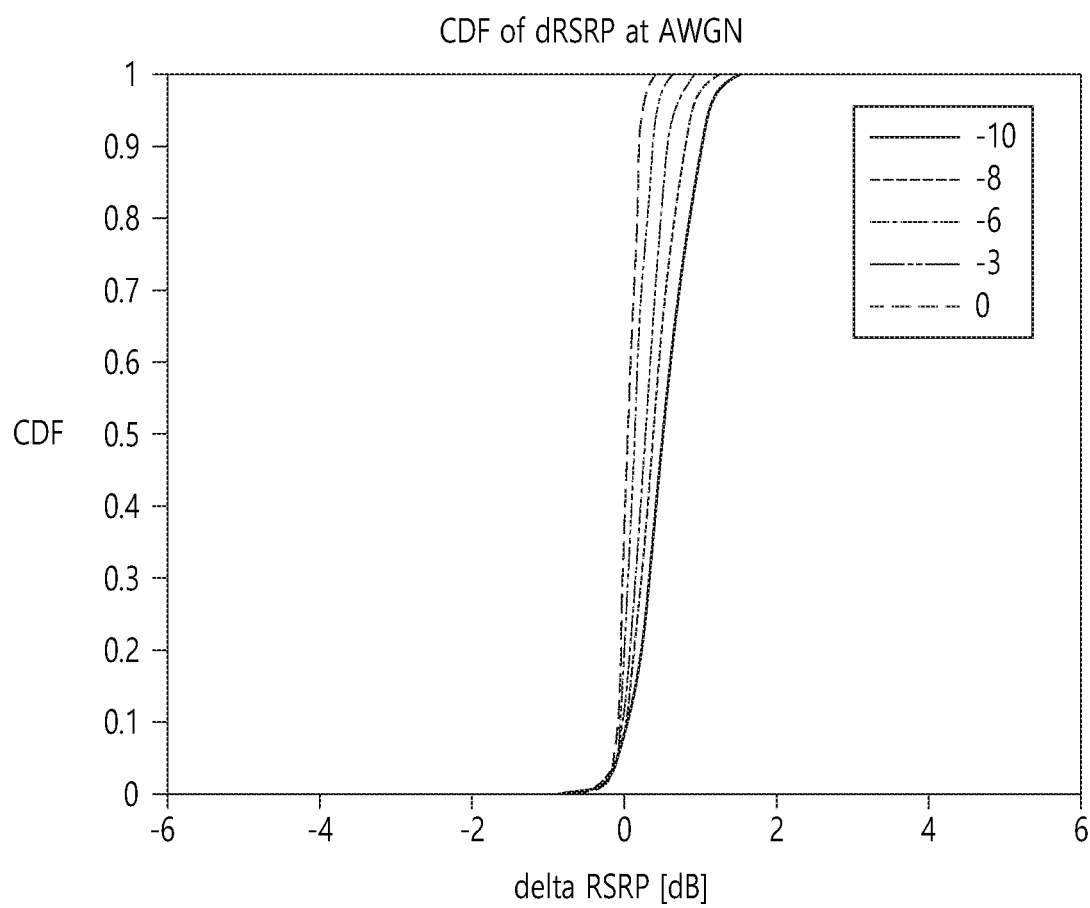
FIGS. 19a to 19c illustrate CRS-based delta RSRP at AGWN, ETA5, and ETU30 respectively when the measurement bandwidth comprises 50 RBs.
Figure 19B:
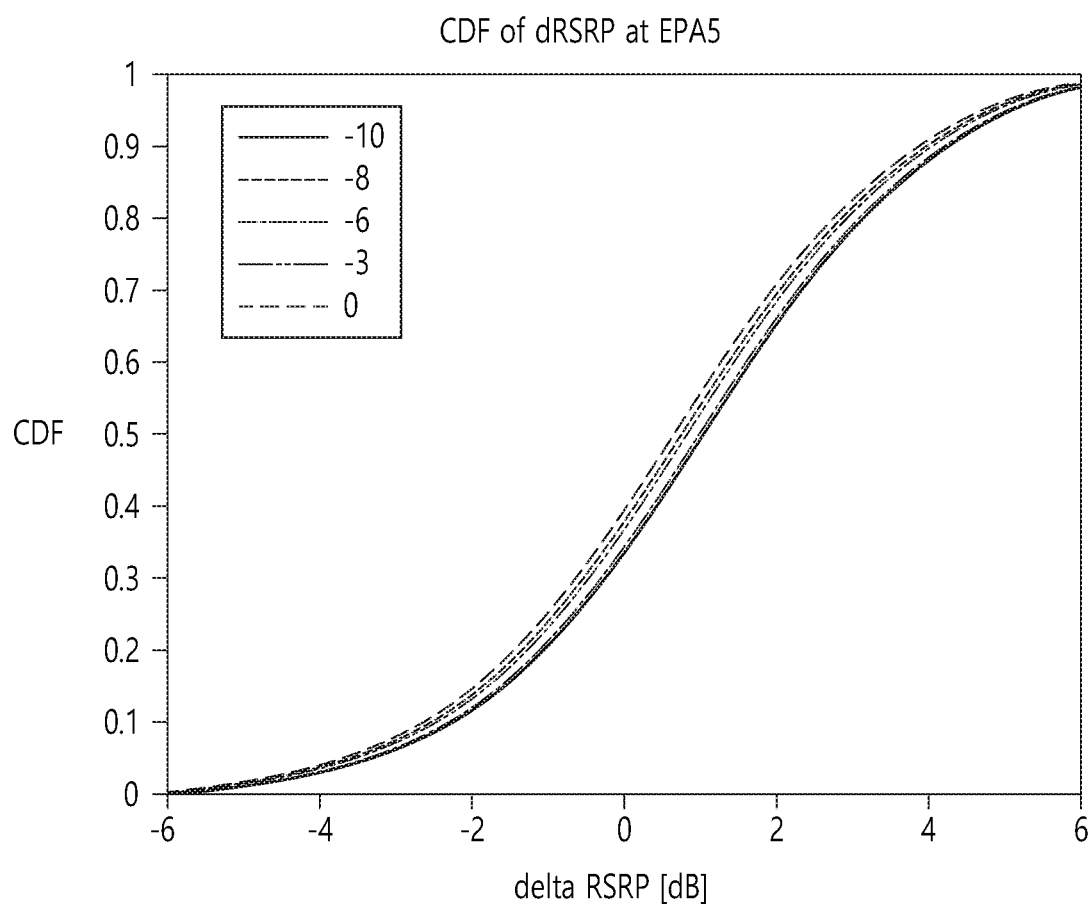
Figure 19C:
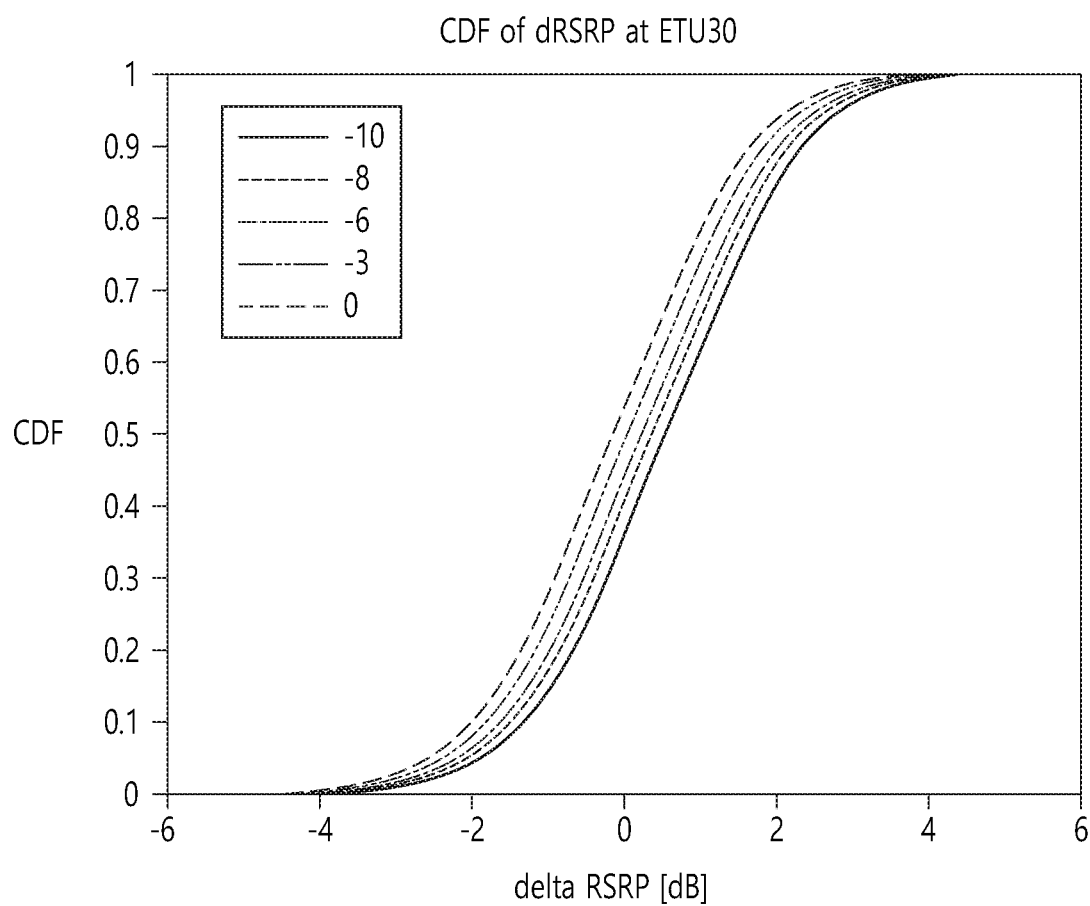

FIGS. 19a to 19c illustrate CRS-based delta RSRP at AGWN, ETA5, and ETU30 respectively when the measurement bandwidth comprises 50 RBs.

Each figure shows a CDF as the reference SNR varies from −10 dB to −8, −6, −3, and 0 dB.

As shown in FIGS. 19a to 19c, Table 11 summarizes the simulation result of CRS-based delta RSRP for AGWN, ETA5, and ETU30 when the measurement bandwidth comprises 6 RBs.

Even considering the RF defect of about 3 dB with respect to the absolute RSRP and the relative RSRP of 1 dB, the values not satisfying the current inter-frequency CRS-based requirements are shown being underlined in the table below.

TABLE 11

| Propagation condition | Reference SNR [dB] | Measurement interval (i*160 ms), i | 50% | 5% | 95% | Relative accuracy [5%-50%, 95%-50%] | |
|---|---|---|---|---|---|---|---|
| AWGN | −10 | 1 | 0.53 | −0.06 | 1.14 | −0.59 | 0.61 |
| | | 3 | 0.44 | 0.09 | 0.79 | −0.35 | 0.35 |
| | | 5 | 0.41 | 0.14 | 0.69 | −0.27 | 0.28 |
| | −8 | 1 | 0.39 | −0.08 | 0.90 | −0.47 | 0.51 |
| | | 3 | 0.33 | 0.04 | 0.62 | −0.29 | 0.30 |
| | | 5 | 0.30 | 0.08 | 0.53 | −0.22 | 0.23 |
| | −6 | 1 | 0.29 | −0.09 | 0.70 | −0.39 | 0.41 |
| | | 3 | 0.23 | 0.02 | 0.47 | −0.22 | 0.24 |
| | | 5 | 0.21 | 0.05 | 0.40 | −0.16 | 0.18 |
| | −3 | 1 | 0.16 | −0.11 | 0.45 | −0.27 | 0.29 |
| | | 3 | 0.12 | −0.04 | 0.29 | −0.16 | 0.17 |
| | | 5 | 0.11 | −0.02 | 0.23 | −0.12 | 0.13 |
| | 0 | 1 | 0.07 | −0.12 | 0.27 | −0.18 | 0.20 |
| | | 3 | 0.04 | −0.07 | 0.15 | −0.11 | 0.12 |
| | | 5 | 0.03 | −0.06 | 0.12 | −0.08 | 0.09 |
| EPA5 | −10 | 1 | 1.00 | −3.15 | <u>4.98</u> | −4.15 | 3.98 |
| | | 3 | 0.91 | −1.38 | <u>3.50</u> | −2.29 | 2.59 |
| | | 5 | 0.85 | −0.91 | 2.89 | −1.76 | 2.04 |
| | −8 | 1 | 0.93 | −3.28 | <u>4.91</u> | −4.22 | 3.97 |
| | | 3 | 0.84 | −1.51 | <u>3.44</u> | −2.35 | 2.60 |
| | | 5 | 0.77 | −1.04 | 2.84 | −1.81 | 2.07 |
| | −6 | 1 | 0.86 | −3.43 | <u>4.87</u> | −4.30 | 4.01 |
| | | 3 | 0.76 | −1.59 | <u>3.39</u> | −2.35 | 2.63 |
| | | 5 | 0.70 | −1.12 | 2.80 | −1.82 | 2.10 |
| | −3 | 1 | 0.78 | −3.58 | <u>4.80</u> | −4.35 | 4.02 |
| | | 3 | 0.67 | −1.72 | <u>3.32</u> | −2.38 | 2.65 |
| | | 5 | 0.61 | −1.22 | 2.72 | −1.83 | 2.11 |
| | 0 | 1 | 0.70 | −3.68 | <u>4.71</u> | −4.38 | 4.01 |
| | | 3 | 0.59 | −1.80 | <u>3.23</u> | −2.39 | 2.64 |
| | | 5 | 0.53 | −1.31 | 2.63 | −1.84 | 2.09 |
| ETU30 | −10 | 1 | 0.53 | −1.84 | 2.84 | −2.37 | 2.31 |
| | | 3 | 0.34 | −0.98 | 1.67 | −1.33 | 1.32 |
| | | 5 | 0.27 | −0.77 | 1.31 | −1.05 | 1.03 |
| | −8 | 1 | 0.41 | −1.95 | 2.73 | −2.36 | 2.32 |
| | | 3 | 0.21 | −1.10 | 1.55 | −1.31 | 1.34 |
| | | 5 | 0.13 | −0.92 | 1.18 | −1.05 | 1.05 |
| | −6 | 1 | 0.28 | −2.09 | 2.60 | −2.37 | 2.32 |
| | | 3 | 0.09 | −1.25 | 1.42 | −1.34 | 1.33 |
| | | 5 | 0.02 | −1.05 | 1.07 | −1.07 | 1.05 |
| | −3 | 1 | 0.10 | −2.31 | 2.43 | −2.41 | 2.33 |
| | | 3 | −0.10 | −1.45 | 1.26 | −1.36 | 1.36 |
| | | 5 | −0.17 | −1.25 | 0.90 | −1.08 | 1.06 |
| | 0 | 1 | −0.10 | −2.49 | 2.23 | −2.39 | 2.34 |
| | | 3 | −0.30 | −1.65 | 1.04 | −1.36 | 1.34 |
| | | 5 | −0.37 | −1.45 | 0.68 | −1.08 | 1.05 |

Meanwhile, absolute accuracy and relative accuracy required for RSRP measurement are shown in Table 12 below.

TABLE 12

| | Intra-frequency | | | | Inter-frequency | | | |
|---|---|---|---|---|---|---|---|---|
| | RSRP | | RSRQ | | RSRP | | RSRQ | |
| SNR | Absolute | Relative | Absolute | Relative | Absolute | Relative | Absolute | Relative |
| −6 | ±6 | ±3 | ±3.5 | N/A | ±6 | ±6 | ±3.5 | ±4 |
| −3 | | ±2 | ±2.5 | | | | ±2.5 | ±3 |

Considering from Table 12 that absolute accuracy and relative accuracy required for inter-frequency RSRP measurement is ±6 dB for SNR −6 dB and −3 dB, simulation results of Table 9 to Table 11 may be summarized as follows.

1) Summary 1: under AWGN when measurement bandwidth comprises 6 RBs, 25 RBs, and 50 RBs, for SNR −6 dB and −3 dB, CRS-based absolute measurement accuracy and relative measurement accuracy may satisfy the current requirement of ±6 dB from one measurement during 160 ms.

2) Summary 2: under EPA5 when measurement bandwidth comprises 25 RBs and 50 RBs, for SNR −6 dB and −3 dB, CRS-based absolute measurement accuracy may satisfy the current requirement of ±6 dB from 160 ms*5 measurements.

3) Summary 3: under EPA5 when measurement bandwidth comprises 6 RBs, for SNR −6 dB and −3 dB, CRS-based relative measurement accuracy may satisfy the current requirement of ±6 dB from 160 ms*3 measurements. And under EPA5 when measurement bandwidth comprises 25 RBs and 50 RBs, for SNR −6 dB and −3 dB, CRS-based relative measurement accuracy may satisfy the current requirement of ±6 dB from 160 ms*1 measurement.

4) Summary 4: under ETU30 when measurement bandwidth comprises 6 RBs, for SNR −6 dB and −3 dB, CRS-based absolute measurement accuracy may satisfy the current requirement of ±6 dB from 160 ms*3 or 160 ms*5 measurements.

5) Summary 5: under ETU30 when measurement bandwidth comprises 25 RBs, for SNR −6 dB and −3 dB, CRS-based absolute measurement accuracy may satisfy the current requirement of ±6 dB from 160 ms*3 measurements. And under ETU30 when measurement bandwidth comprises 50 RBs, for SNR −6 dB and −3 dB, CRS-based absolute measurement accuracy may satisfy the current requirement of ±6 dB from 160 ms*1 measurement.

6) Summary 6: under ETU30 when measurement bandwidth comprises 6 RBs, 25 RBs, and 50 RBs, for SNR −6 dB and −3 dB, CRS-based relative measurement accuracy may satisfy the current requirement of ±6 dB from 160 ms*1 measurement.

The summary above provides the minimum required measurement interval (160 ms*i times) for SNR −6 dB and −3 dB to satisfy the current requirements for CRS-based RSRP measurement.

The above result may be shown again in the table below.

TABLE 13

| SNR | i * 160 ms(i) | | |
|---|---|---|---|
| (−6 dB/−3 dB) | 6 RB | 25 RB | 50 RB |
| AWGN | 1 | 1 | 1 |
| EPA5 | >5 | 5 | 5 |
| ETU30 | 5 | 3 | 1 |

I-2-2. Simulation Result of RSRP Measurement Based on the CSI-RS Out of Discovery Signal First, the following show the simulation results of CSI-RS based delta RSRP for AGWN, ETA5, and ETU 30 when the measurement bandwidth comprises 6 RBs.

Figure 20A:
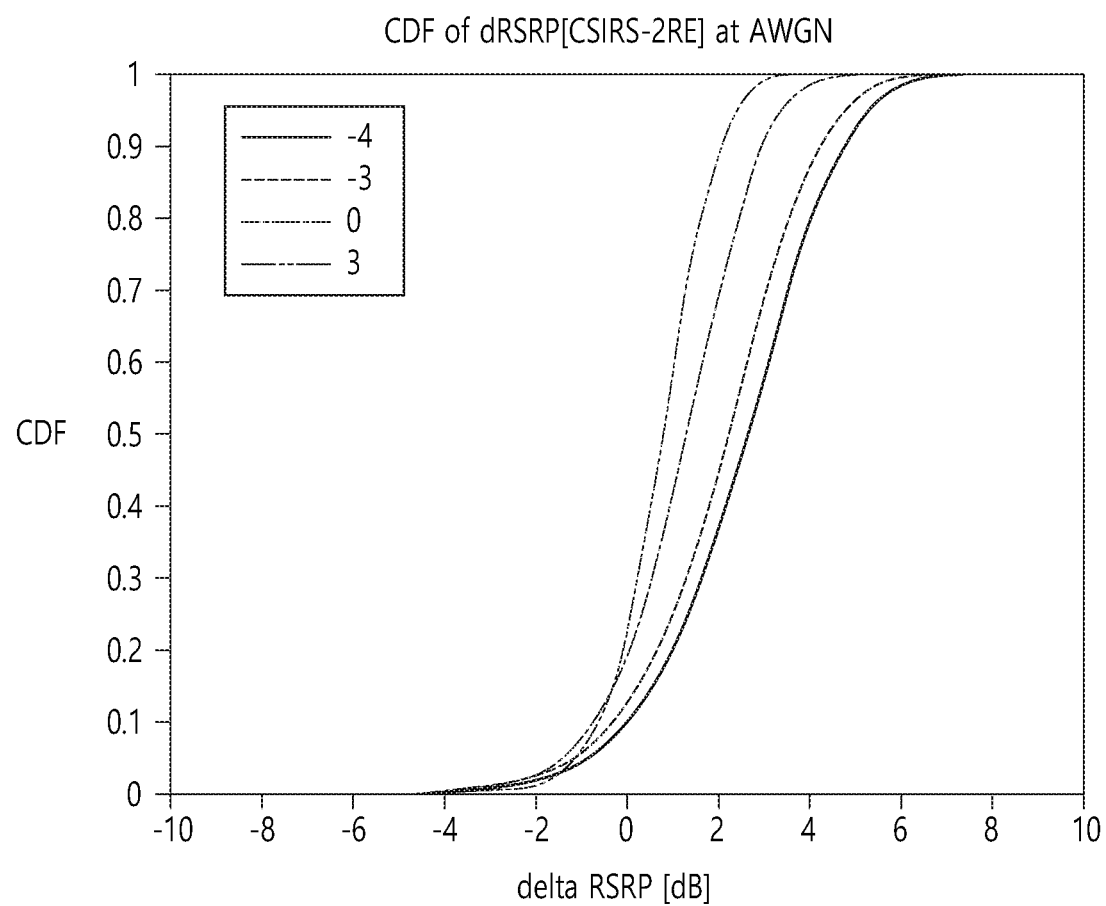
FIGS. 20a to 20c illustrate CSI-RS based delta RSRP at AGWN, ETA5, and ETU30 respectively when the measurement bandwidth comprises 6 RBs.
Figure 20B:
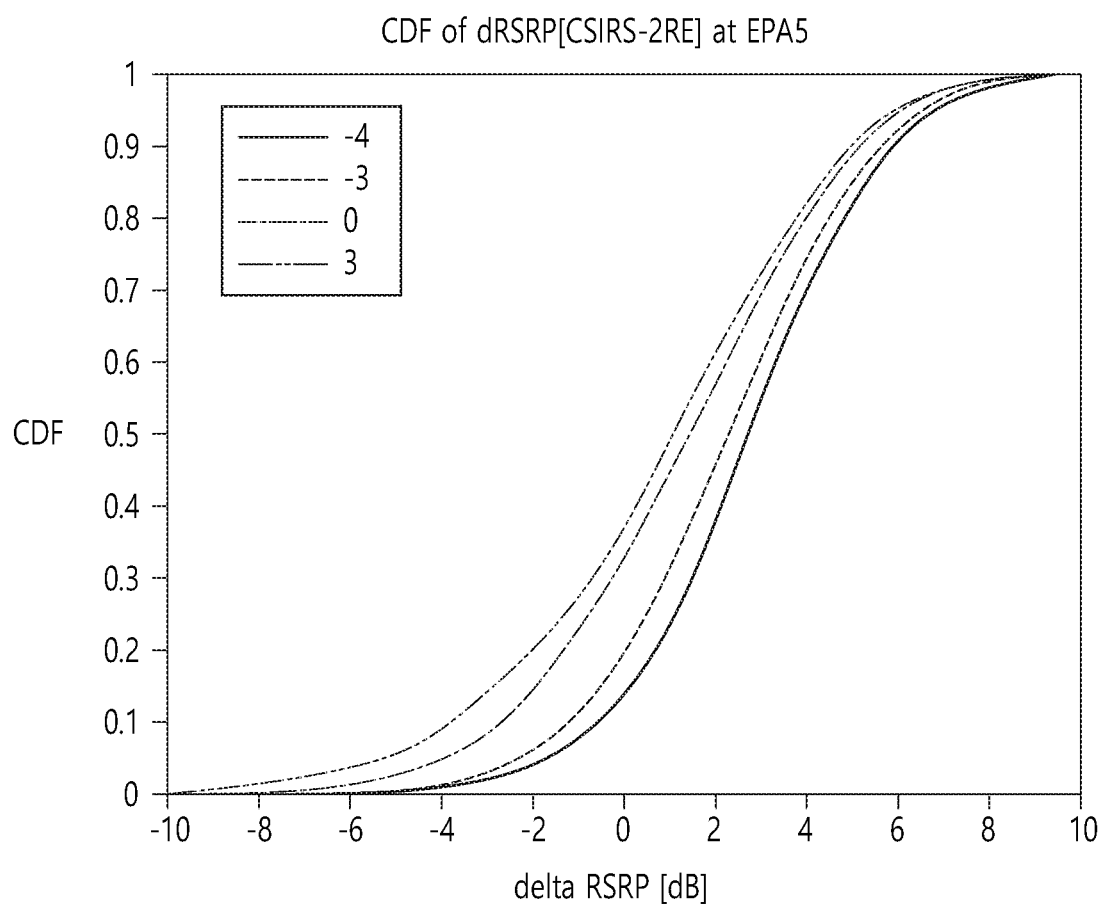
Figure 20C:
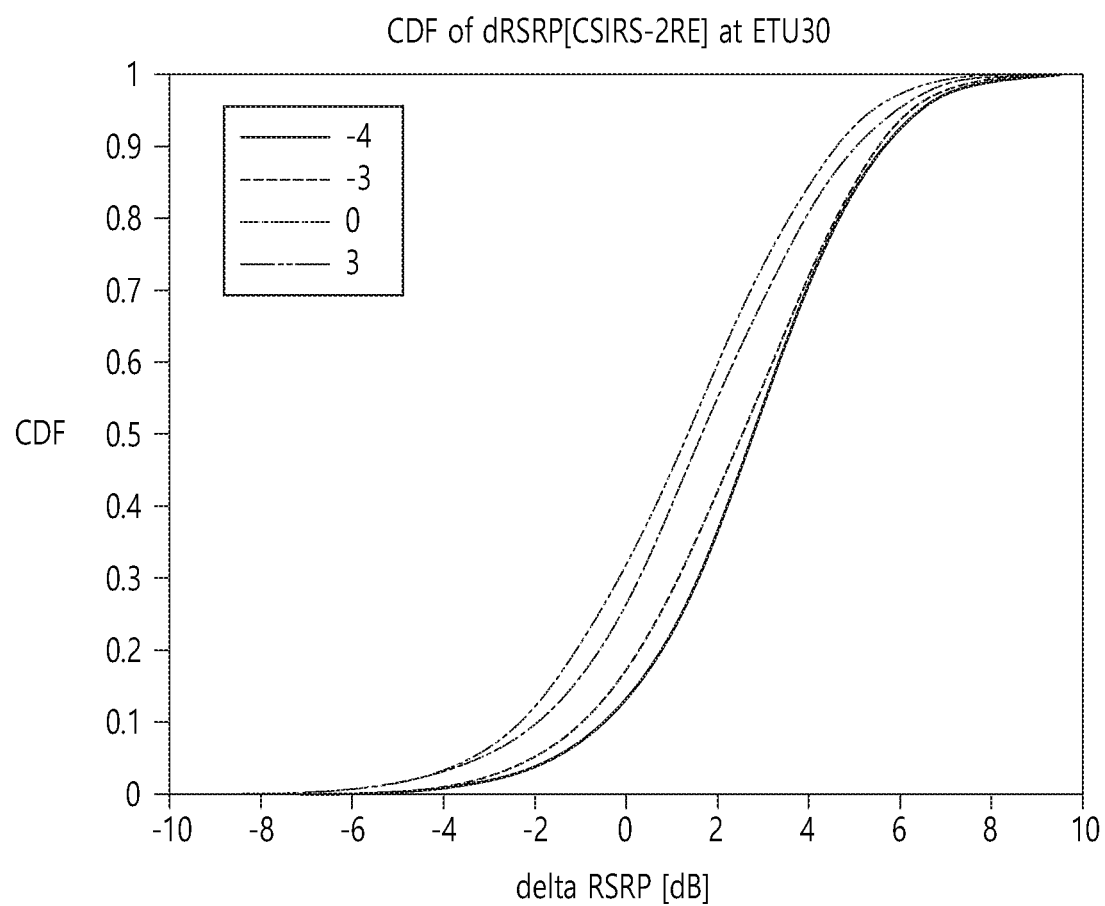

FIGS. 20a to 20c illustrate CSI-RS based delta RSRP at AGWN, ETA5, and ETU30 respectively when the measurement bandwidth comprises 6 RBs.

Each figure shows a CDF as the reference SNR varies from −10 dB to −8, −6, −3, and 0 dB.

As shown in FIGS. 20a to 20c, Table 14 summarizes the simulation result of CSI-RS based delta RSRP for AGWN, ETA5, and ETU30 when the measurement bandwidth comprises 6 RBs.

TABLE 14

| Propagation condition | SNR [dB] | Measurement interval (i*160 ms), i | 2RE | | | | |
|---|---|---|---|---|---|---|---|
| | | | 50% | 5% | 95% | [5-50%, | 95-50%] |
| AWGN | −4 | 1 | 2.67 | −0.82 | 5.33 | −3.49 | 2.66 |
| | | 3 | 2.35 | 0.46 | 4.07 | −1.89 | 1.72 |
| | | 5 | 2.22 | 0.78 | 3.60 | −1.44 | 1.38 |
| | −3 | 1 | 2.27 | −1.08 | 4.78 | −3.35 | 2.51 |
| | | 3 | 1.92 | 0.12 | 3.52 | −1.80 | 1.60 |
| | | 5 | 1.79 | 0.44 | 3.06 | −1.36 | 1.27 |
| | 0 | 1 | 1.37 | −1.33 | 3.44 | −2.69 | 2.07 |
| | | 3 | 1.05 | −0.41 | 2.38 | −1.46 | 1.33 |
| | | 5 | 0.96 | −0.19 | 2.00 | −1.15 | 1.04 |
| | 3 | 1 | 0.82 | −1.05 | 2.41 | −1.87 | 1.59 |
| | | 3 | 0.59 | −0.49 | 1.57 | −1.08 | 0.98 |
| | | 5 | 0.50 | −0.33 | 1.30 | −0.83 | 0.80 |
| EPA5 | −4 | 1 | 2.74 | −1.62 | 6.76 | −4.36 | 4.02 |
| | | 3 | 2.70 | 0.15 | 5.14 | −2.54 | 2.45 |
| | | 5 | 2.61 | 0.67 | 4.51 | −1.94 | 1.90 |
| | −3 | 1 | 2.28 | −2.16 | 6.59 | −4.44 | 4.31 |

TABLE 14-continued

| Propagation condition | SNR [dB] | Measurement interval (i*160 ms), i | 2RE | | | | |
|---|---|---|---|---|---|---|---|
| | | | 50% | 5% | 95% | [5-50%, | 95-50%] |
| | | 3 | 2.27 | −0.33 | 4.90 | −2.59 | 2.63 |
| | | 5 | 2.20 | 0.19 | 4.28 | −2.02 | 2.08 |
| | 0 | 1 | 1.43 | −3.91 | 6.09 | −5.34 | 4.66 |
| | | 3 | 1.46 | −1.65 | 4.43 | −3.11 | 2.98 |
| | | 5 | 1.41 | −0.95 | 3.79 | −2.36 | 2.37 |
| | 3 | 1 | 1.14 | −5.10 | 5.96 | −6.24 | 4.82 |
| | | 3 | 1.18 | −2.27 | 4.26 | −3.44 | 3.09 |
| | | 5 | 1.13 | −1.43 | 3.58 | −2.56 | 2.45 |
| ETU30 | −4 | 1 | 2.88 | −1.17 | 6.55 | −4.05 | 3.67 |
| | | 3 | 2.75 | 0.40 | 5.02 | −2.34 | 2.27 |
| | | 5 | 2.65 | 0.84 | 4.46 | −1.81 | 1.81 |
| | −3 | 1 | 2.48 | −1.88 | 6.22 | −4.36 | 3.74 |
| | | 3 | 2.37 | −0.11 | 4.61 | −2.48 | 2.23 |
| | | 5 | 2.27 | 0.33 | 4.06 | −1.94 | 1.79 |
| | 0 | 1 | 1.65 | −3.01 | 5.81 | −4.66 | 4.16 |
| | | 3 | 1.58 | −0.95 | 4.10 | −2.54 | 2.52 |
| | | 5 | 1.49 | −0.52 | 3.55 | −2.01 | 2.05 |
| | 3 | 1 | 1.34 | −3.33 | 5.45 | −4.67 | 4.11 |
| | | 3 | 1.27 | −1.36 | 3.79 | −2.63 | 2.52 |
| | | 5 | 1.18 | −0.90 | 3.22 | −2.07 | 2.05 |

Next, the following show the simulation results of CSI-RS based delta RSRP for AGWN, ETA5, and ETU 30 when the measurement bandwidth comprises 25 RBs.

Figure 21A:
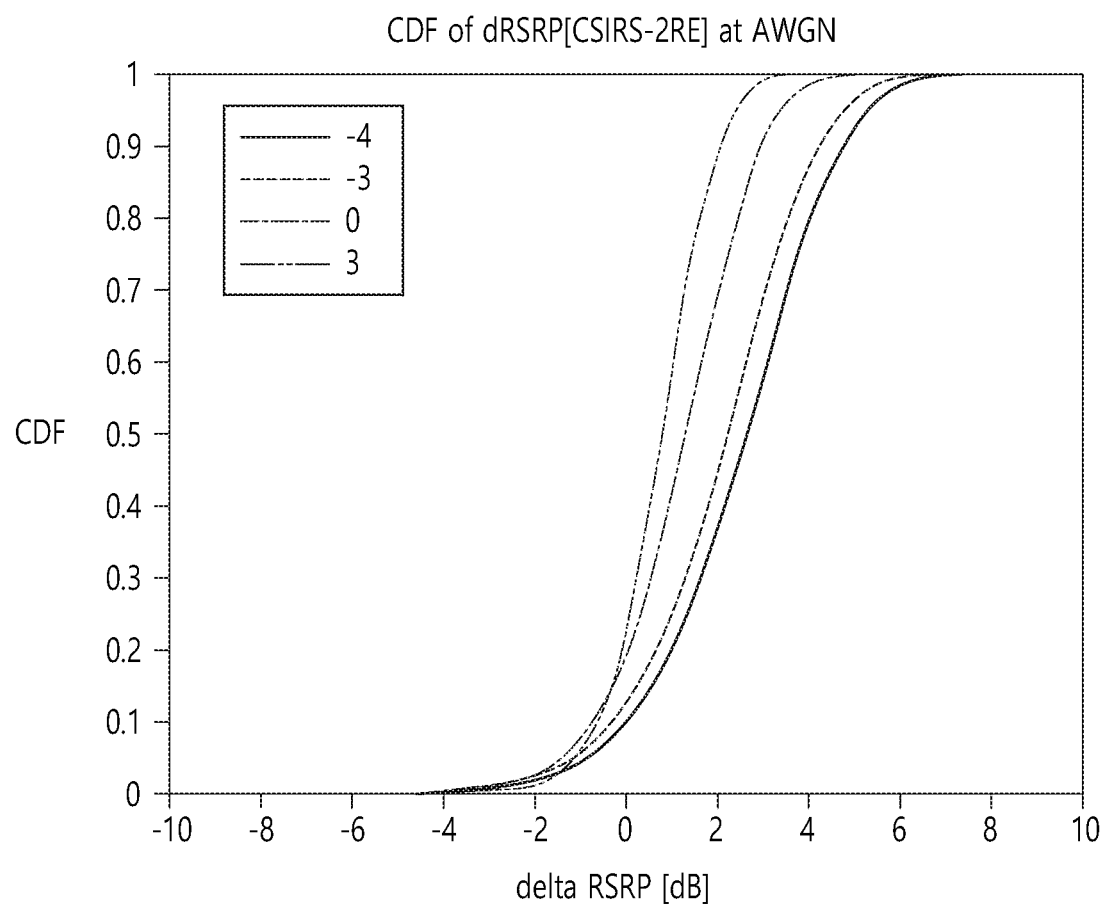
FIGS. 21a to 21c illustrate CSI-RS based delta RSRP at AGWN, ETA5, and ETU30 respectively when the measurement bandwidth comprises 25 RBs.
Figure 21B:
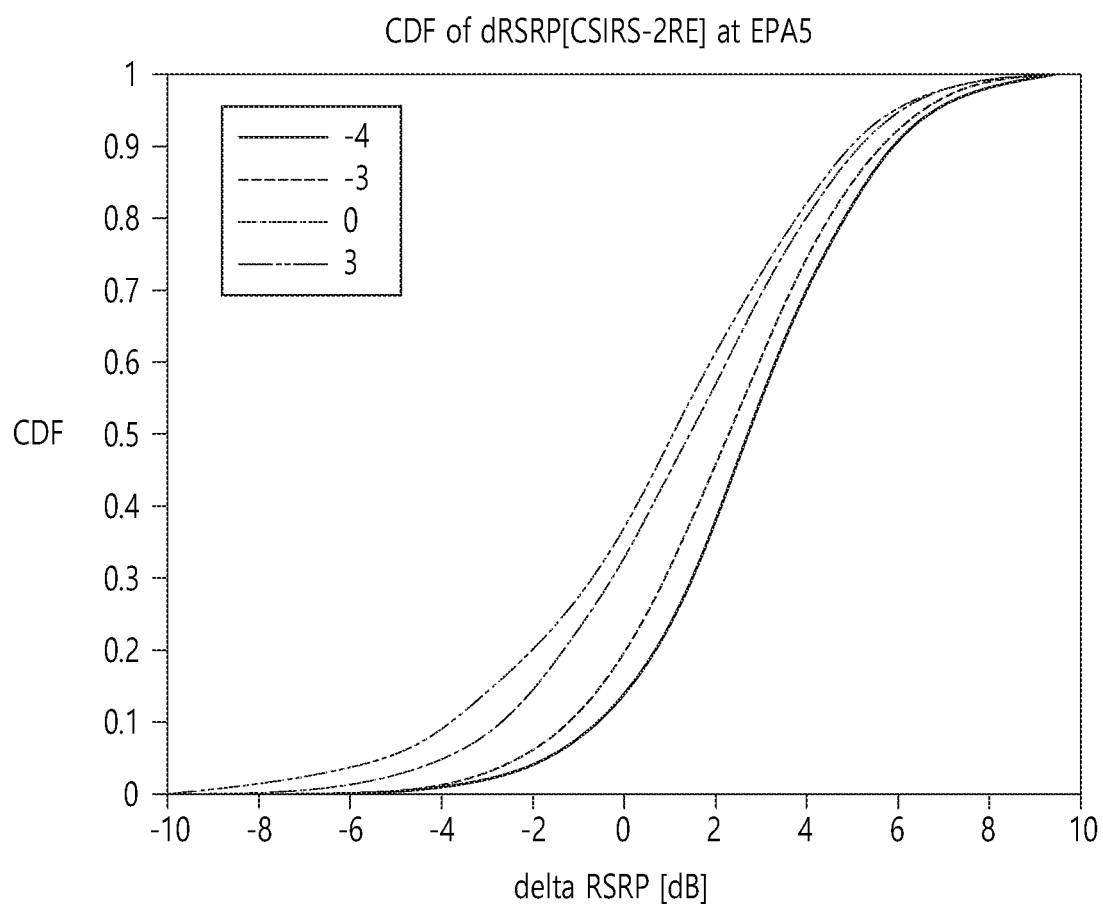
Figure 21C:
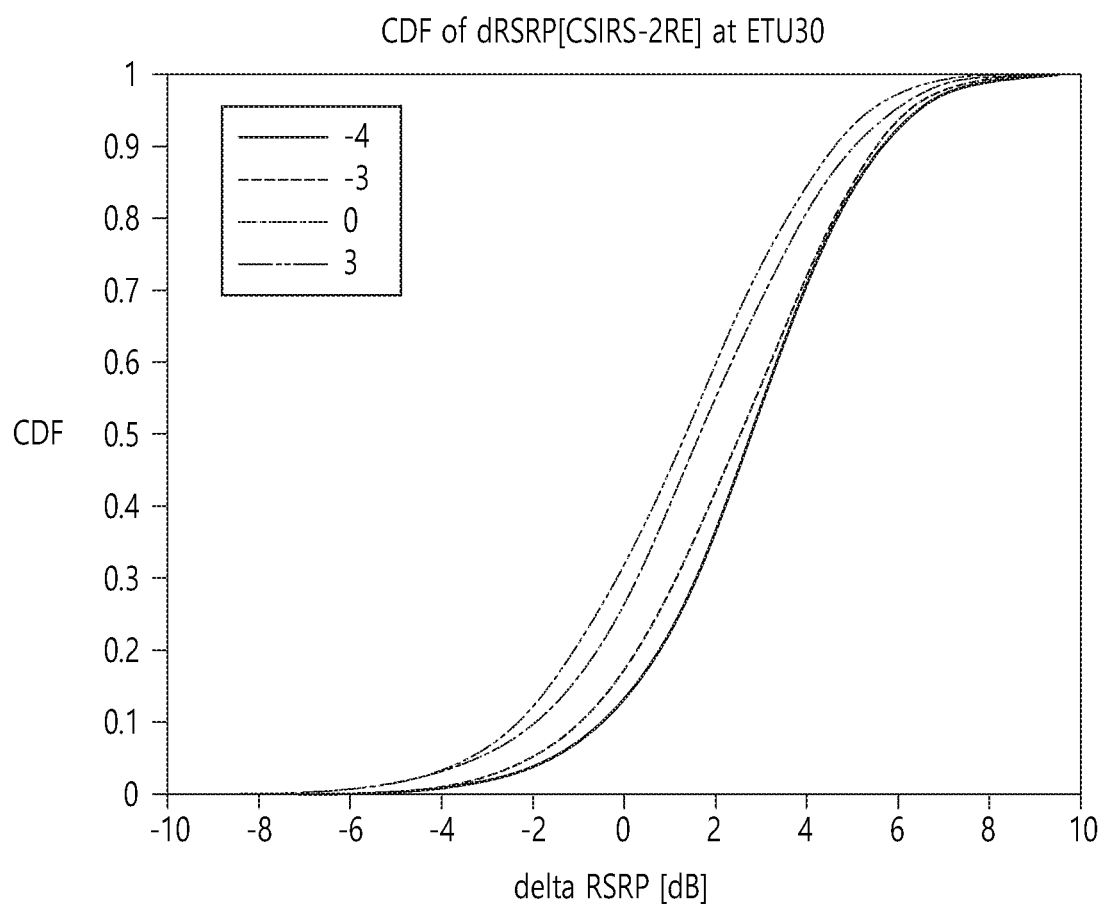

FIGS. 21a to 21c illustrate CSI-RS based delta RSRP at AGWN, ETA5, and ETU30 respectively when the measurement bandwidth comprises 25 RBs.

Each figure shows a CDF as the reference SNR varies from −10 dB to −8, −6, −3, and 0 dB.

As shown in FIGS. 21a to 21c, Table 15 summarizes the simulation result of CSI-RS based delta RSRP for AGWN, ETA5, and ETU30 when the measurement bandwidth comprises 25 RBs.

TABLE 15

| Propagation condition | SNR [dB] | Measurement interval (i*160 ms), i | 2RE | | | | |
|---|---|---|---|---|---|---|---|
| | | | 50% | 5% | 95% | [5-50%, | 95-50%] |
| AWGN | −4 | 1 | 1.26 | −1.20 | 3.20 | −2.47 | 1.93 |
| | | 3 | 0.99 | −0.37 | 2.21 | −1.37 | 1.21 |
| | | 5 | 0.89 | −0.16 | 1.83 | −1.05 | 0.94 |
| | −3 | 1 | 1.11 | −1.09 | 2.72 | −2.20 | 1.61 |
| | | 3 | 0.79 | −0.40 | 1.85 | −1.19 | 1.06 |
| | | 5 | 0.69 | −0.22 | 1.55 | −0.91 | 0.87 |
| | 0 | 1 | 0.63 | −0.73 | 1.86 | −1.36 | 1.23 |
| | | 3 | 0.43 | −0.34 | 1.18 | −0.77 | 0.75 |
| | | 5 | 0.36 | −0.22 | 0.96 | −0.58 | 0.59 |
| | 3 | 1 | 0.41 | −0.51 | 1.29 | −0.92 | 0.88 |
| | | 3 | 0.27 | −0.27 | 0.78 | −0.54 | 0.51 |
| | | 5 | 0.23 | −0.20 | 0.62 | −0.43 | 0.39 |
| EPA5 | −4 | 1 | 1.51 | −2.88 | 5.45 | −4.39 | 3.93 |
| | | 3 | 1.39 | −1.01 | 3.92 | −2.40 | 2.53 |
| | | 5 | 1.30 | −0.57 | 3.33 | −1.87 | 2.04 |
| | −3 | 1 | 1.34 | −3.07 | 5.35 | −4.41 | 4.02 |
| | | 3 | 1.23 | −1.28 | 3.80 | −2.51 | 2.57 |
| | | 5 | 1.15 | −0.77 | 3.19 | −1.92 | 2.04 |
| | 0 | 1 | 1.06 | −3.92 | 5.18 | −4.98 | 4.12 |
| | | 3 | 0.93 | −1.66 | 3.62 | −2.59 | 2.70 |
| | | 5 | 0.87 | −1.13 | 3.01 | −2.01 | 2.14 |
| | 3 | 1 | 0.92 | −4.00 | 5.12 | −4.93 | 4.20 |
| | | 3 | 0.82 | −1.77 | 3.61 | −2.58 | 2.79 |
| | | 5 | 0.74 | −1.21 | 3.00 | −1.94 | 2.26 |
| ETU30 | −4 | 1 | 1.45 | −2.04 | 4.37 | −3.49 | 2.93 |
| | | 3 | 1.23 | −0.70 | 2.98 | −1.93 | 1.74 |
| | | 5 | 1.12 | −0.36 | 2.52 | −1.48 | 1.40 |
| | −3 | 1 | 1.29 | −2.18 | 4.18 | −3.47 | 2.89 |
| | | 3 | 1.05 | −0.87 | 2.82 | −1.92 | 1.77 |
| | | 5 | 0.93 | −0.54 | 2.38 | −1.47 | 1.44 |
| | 0 | 1 | 0.96 | −2.31 | 3.80 | −3.27 | 2.84 |
| | | 3 | 0.75 | −1.06 | 2.48 | −1.82 | 1.73 |
| | | 5 | 0.65 | −0.72 | 2.04 | −1.37 | 1.39 |

TABLE 15-continued

| Propagation condition | SNR [dB] | Measurement interval (i*160 ms), i | 2RE | | | | |
|---|---|---|---|---|---|---|---|
| | | | 50% | 5% | 95% | [5-50%, 95-50%] | |
| | 3 | 1 | 0.84 | −2.31 | 3.76 | −3.15 | 2.92 |
| | | 3 | 0.65 | −1.14 | 2.42 | −1.79 | 1.77 |
| | | 5 | 0.54 | −0.81 | 1.94 | −1.36 | 1.39 |

Next, the following show the simulation results of CSI-RS based delta RSRP for AGWN, ETA5, and ETU 30 when the measurement bandwidth comprises 50 RBs.

Figure 22A:
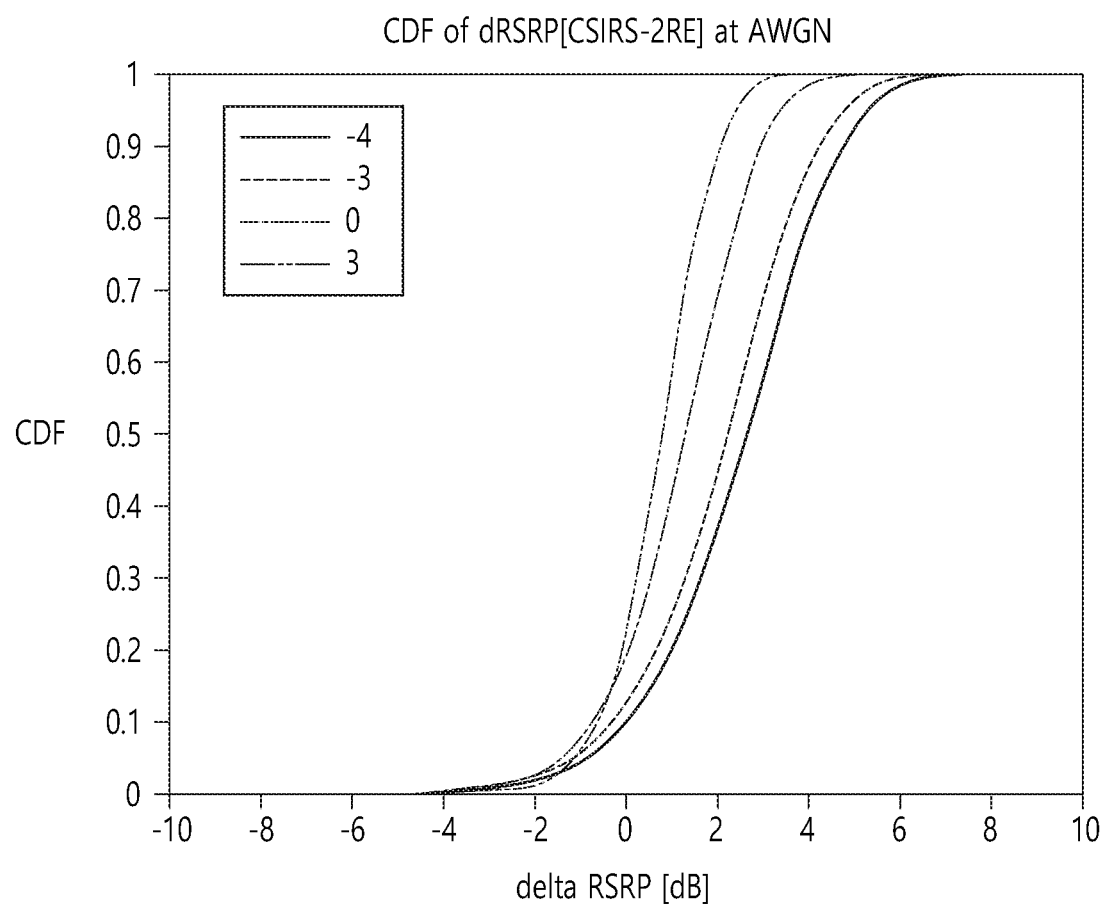
FIGS. 22a to 22c illustrate CSI-RS based delta RSRP at AGWN, ETA5, and ETU30 respectively when the measurement bandwidth comprises 50 RBs.
Figure 22B:
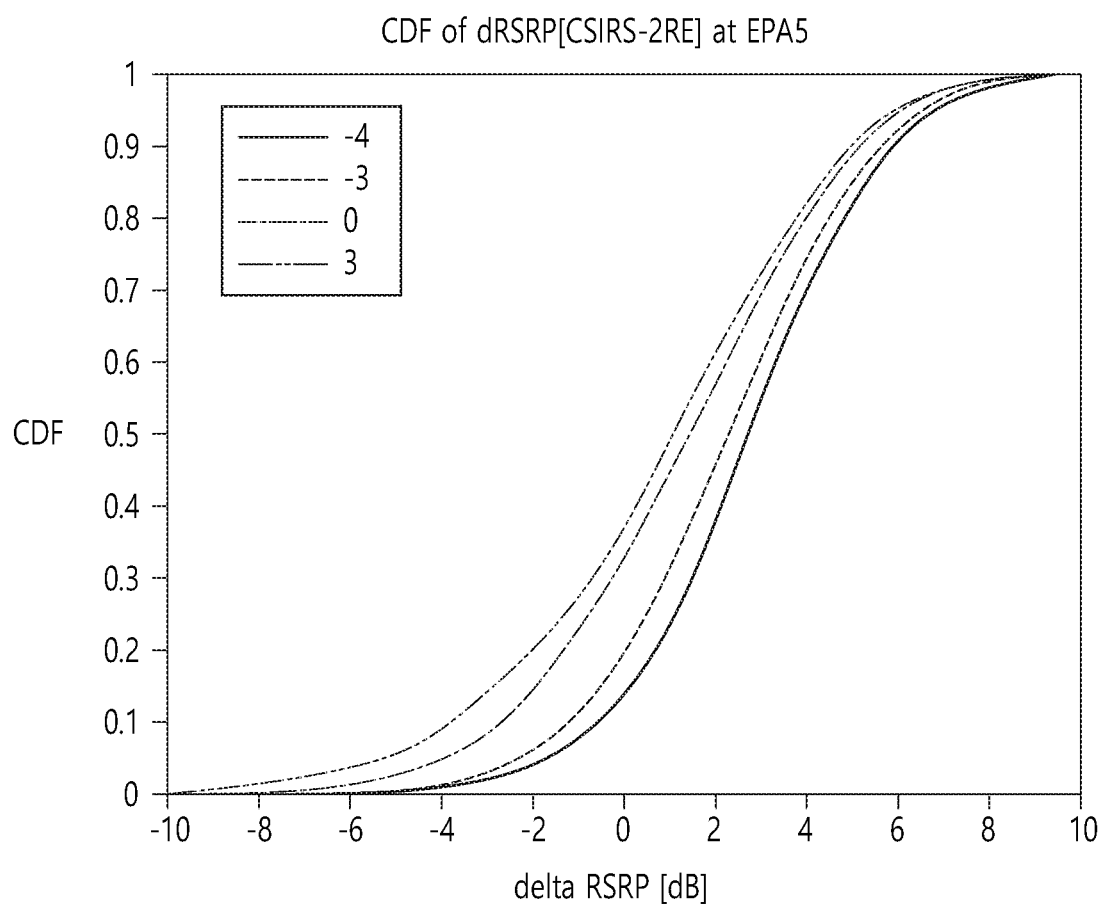
Figure 22C:
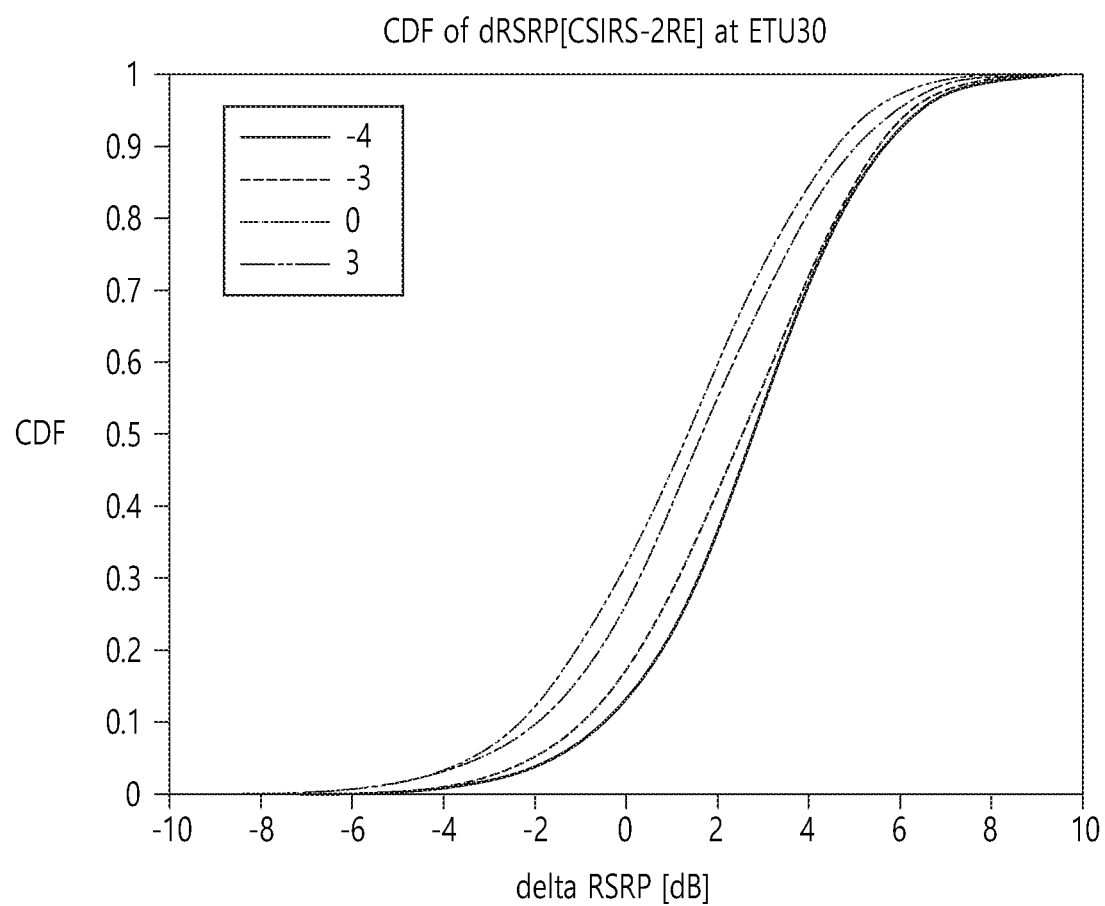

FIGS. 22a to 22c illustrate CSI-RS based delta RSRP at AGWN, ETA5, and ETU30 respectively when the measurement bandwidth comprises 50 RBs.

Each figure shows a CDF as the reference SNR varies from −10 dB to −8, −6, −3, and 0 dB.

As shown in FIGS. 22a to 22c, Table 16 summarizes the simulation result of CSI-RS based delta RSRP for AGWN, ETA5, and ETU30 when the measurement bandwidth comprises 50 RBs.

TABLE 16

| Propagation condition | SNR [dB] | Measurement interval (i*160 ms), i | 2RE | | | | |
|---|---|---|---|---|---|---|---|
| | | | 50% | 5% | 95% | [5-50%, 95-50%] | |
| AWGN | −4 | 1 | 0.91 | −0.94 | 2.44 | −1.85 | 1.53 |
| | | 3 | 0.63 | −0.40 | 1.62 | −1.04 | 0.99 |
| | | 5 | 0.55 | −0.25 | 1.35 | −0.81 | 0.80 |
| | −3 | 1 | 0.74 | −0.86 | 2.07 | −1.60 | 1.33 |
| | | 3 | 0.50 | −0.37 | 1.36 | −0.87 | 0.85 |
| | | 5 | 0.42 | −0.24 | 1.11 | −0.66 | 0.69 |
| | 0 | 1 | 0.45 | −0.56 | 1.37 | −1.01 | 0.92 |
| | | 3 | 0.30 | −0.30 | 0.87 | −0.59 | 0.57 |
| | | 5 | 0.25 | −0.21 | 0.71 | −0.46 | 0.46 |
| | 3 | 1 | 0.27 | −0.38 | 0.91 | −0.65 | 0.63 |
| | | 3 | 0.18 | −0.21 | 0.56 | −0.39 | 0.38 |
| | | 5 | 0.14 | −0.16 | 0.45 | −0.30 | 0.31 |
| EPA5 | −4 | 1 | 1.11 | −3.20 | 5.09 | −4.32 | 3.98 |
| | | 3 | 0.97 | −1.35 | 3.60 | −2.32 | 2.62 |
| | | 5 | 0.93 | −0.97 | 3.00 | −1.90 | 2.07 |
| | −3 | 1 | 1.04 | −3.28 | 5.04 | −4.32 | 4.00 |
| | | 3 | 0.94 | −1.46 | 3.55 | −2.39 | 2.61 |
| | | 5 | 0.86 | −1.03 | 2.93 | −1.89 | 2.07 |
| | 0 | 1 | 0.85 | −3.61 | 4.93 | −4.47 | 4.07 |
| | | 3 | 0.73 | −1.64 | 3.44 | −2.37 | 2.70 |
| | | 5 | 0.68 | −1.16 | 2.80 | −1.84 | 2.12 |
| | 3 | 1 | 0.78 | −3.62 | 4.88 | −4.40 | 4.09 |
| | | 3 | 0.69 | −1.79 | 3.39 | −2.47 | 2.70 |
| | | 5 | 0.61 | −1.29 | 2.78 | −1.90 | 2.17 |
| ETU30 | −4 | 1 | 1.14 | −1.82 | 3.59 | −2.96 | 2.45 |
| | | 3 | 0.89 | −0.81 | 2.37 | −1.69 | 1.48 |
| | | 5 | 0.77 | −0.54 | 1.95 | −1.31 | 1.18 |
| | −3 | 1 | 0.98 | −1.92 | 3.47 | −2.89 | 2.49 |
| | | 3 | 0.76 | −0.90 | 2.23 | −1.66 | 1.47 |
| | | 5 | 0.66 | −0.59 | 1.80 | −1.26 | 1.13 |
| | 0 | 1 | 0.81 | −1.80 | 3.24 | −2.61 | 2.43 |
| | | 3 | 0.60 | −0.86 | 2.01 | −1.46 | 1.41 |
| | | 5 | 0.52 | −0.61 | 1.62 | −1.13 | 1.10 |
| | 3 | 1 | 0.75 | −1.80 | 3.16 | −2.55 | 2.41 |
| | | 3 | 0.54 | −0.90 | 1.94 | −1.44 | 1.40 |
| | | 5 | 0.47 | −0.65 | 1.56 | −1.11 | 1.10 |

Considering RF defect of about 3 dB for absolute RSRP and 1 dB for relative RSRP, the present document proposes absolute and relative accuracy required for RSRP measurement for each SNR condition from the simulation results above. And based on the proposed absolute and relative accuracy, the minimum required measurement interval (160 ms*i times) is proposed as shown below.

TABLE 17

| | Measurement interval (i*160 ms), i Measurement bandwidth | | | | | | | | | | | |
|---|---|---|---|---|---|---|---|---|---|---|---|---|
| | 6RB | | | | 25RB | | | | 50RB | | | |
| | SNR | | | | | | | | | | | |
| | −4 dB | −3 dB | 0 dB | 3 dB | −4 dB | −3 dB | 0 dB | 3 dB | −4 dB | −3 dB | 0 dB | 3 dB |
| Proposed absolute accuracy of RSRP (dB) | 8 | 8 | 7 | 7 | 7 | 7 | 6 | 6 | 6 | 6 | 6 | 6 |
| Proposed relative accuracy of RSRP (dB) | 6 | 6 | 6 | 6 | 6 | 6 | 6 | 6 | 6 | 6 | 6 | 6 |
| AWGN | 3 | 1 | 1 | 1 | 1 | 1 | 1 | 1 | 1 | 1 | 1 | 1 |
| EPA5 | 5 | 3 | 5 | 5 | 3 | 3 | 5 | 5 | 5 | 5 | 5 | 5 |
| ETU30 | 5 | 3 | 5 | 3 | 3 | 3 | 3 | 3 | 3 | 3 | 3 | 3 |
| Max (AWGN, EPA5, ETU30) | 5 | 3 | 5 | 5 | 3 | 3 | 5 | 5 | 5 | 5 | 5 | 5 |

I-3. Summary of Simulation Results

Form the experimental results above, propositions may be summarized as follows.

Proposition 1: in case the measurement bandwidth according to the first disclosure of the present invention comprises 6, 25, and 50 RBs, Table 13 shows the minimum required measurement interval (160 ms*i times) for satisfying measurement accuracy of CRS-based RSRP.

Proposition 2: the first disclosure of the present invention proposes CSI-RS based RSRP measurement accuracy as the absolute RSRP measurement accuracy, and in case the measurement bandwidth comprises 6, 25, and 50 RBs, Table 17 shows the minimum required measurement interval (160 ms*i times) for satisfying CSI-RS based RSRP absolute measurement accuracy.

II. The Second Disclosure of the Present Invention

The second disclosure of the present invention proposes acquisition of PSS/SSS out of a discovery signal, simulation result of acquiring transmission point (TP), and simulation result of cell/TP identification (including cell detection and cell measurement) through PSS/SSS out of the discovery signal.

II-1. Simulation Environment

II-1-1. Simulation Environment for Acquisition of PSS/SSS Out of Discovery Signal Table 18 shows the parameters of a simulation environment for acquiring PSS/SSS out of the discovery signal and cell identification.

TABLE 18

| Parameter | Unit | Cell 1 | Cell 2 | Cell 3 |
|---|---|---|---|---|
| E-UTRA RF channel number | — | Channel 1 | Channel 1 | Channel 1 |
| PSD (Power Spectrum Density) of data and control channel with respect to the PSD of reference signal (RS) | dB | 0 | 0 | 0 |
| PSD of PSS and SSS with respect to PSD of RS | dB | 0 | 0 | 0 |
| Carrier frequency | GHz | 3.5 | 3.5 | 3.5 |
| Number of RBs | | 6 | 6 | 6 |
| RB utilization rate | % | 100 | 100 | 100 |
| Data modulation method | — | QPSK | QPSK | QPSK |
| Frame structure type | — | FDD | FDD | FDD |
| CP length | — | Normal | Normal | Normal |
| Frequency offset with respect to the UE frequency reference | Hz | 0 | 0 | 0 |
| Relative delay via first path (synchronous) | μs | 0 | 0 | CP/2 |
| Es/Noc | dB | 5.18 | 0.29 | Test 1: 1.25 Test 2: 0.25 Test 3: −0.75 |
| Number of transmitting antennas | — | 1 | 1 | 1 |
| PSS sequence ID | — | See Table 20 and 21 | See Table 20 and 21 | See Table 3, 4 |
| SSS sequence ID | — | See Table 20 and 21 | See Table 20 and 21 | See Table 3, 4 |
| Propagation condition | — | AWGN, EPA5, ETU30 | | |
| Noc model | — | AWGN | | |
| PSS/SSS period | ms | 40 ms, 80 ms, 160 ms | | |

Table 19 shows other parameters for simulation of cell identification.

TABLE 19

| Simulation parameter | Description |
|---|---|
| UE is aware of cell 1 and 2 in advance | Yes |
| Carrier frequency of cell 1, 2, and 3 | The same |
| Threshold for detection failure | Required as in an actual UE |
| Indication as to whether the UE is aware of the information about whether a system corresponds to a synchronous or asynchronous system | No |

TABLE 19-continued

| Simulation parameter | Description |
|---|---|
| Duty cycle | 100% (to represent non-DRX case) |
| Performance reference for comparison | Acquisition time to achieve 90% of accurate cell detection for a sequence ID of PSS and SSS |
| CP length detection | Both short and long CP (namely extended CP) exist, and the UE has to detect CP length. |
| The number of receiving antennas | 2 (uncorrelated) |

Table 20 shows combinations of cell IDs.

TABLE 20

| Case | Cell 3 (Target cell) | | Cell 1 (Interference source 1) | | Cell 2 (Interference source 2) | | Scenario |
|---|---|---|---|---|---|---|---|
| 1 | psc3 | ssc3a, ssc3b | psc1 | ssc1a, ssc1b | psc2 | ssc2a, ssc2b | Synchronization |
| 2 | psc1 | ssc3a, ssc3b | psc1 | ssc1a, ssc1b | psc2 | ssc2a, ssc2b | Synchronization |
| 3 | psc1 | ssc1a, ssc3b | psc1 | ssc1a, ssc1b | psc2 | ssc2a, ssc2b | Synchronization |
| 4 | psc3 | ssc1a, ssc1b | psc1 | ssc1a, ssc1b | psc2 | ssc2a, ssc2b | S Synchronization |

Meanwhile, PSC and SSC index for simulation are summarized as follows.

TABLE 21

| Level | Code index |
|---|---|
| psc1 | 29 |
| psc2 | 25 |
| psc3 | 34 |

TABLE 22

| Level | Code index | Cell group index |
|---|---|---|
| (ssc1a, ssc1b) | (6, 8) | 36 |
| (ssc2a, ssc2b) | (10, 12) | 40 |
| (ssc3a, ssc3b) | (7, 9) | 37 |
| (ssc1a, ssc3b) | (6, 9) | 65 |

II-1-2. Simulation Environment for Acquisition of CSI-RS Out of Discovery Signal It is assumed that the UE is aware of all of information (subframe, RE configuration, and scrambling initialization information) about CSI-RS transmitted from three TPs.

Table 23 shows simulation parameters for acquiring a CSI-RS.

TABLE 23

| Parameter | Unit | TP1 | TP2 | TP3 (Desired TP) |
|---|---|---|---|---|
| E-UTRA RF channel number | — | Channel 1 | Channel 1 | Channel 1 |
| PSD of data and control channel with respect to the PSD of RS | dB | 0 | 0 | 0 |
| PSD of PSS and SSS with respect to the PSD of RS | dB | 0 | 0 | 0 |
| Carrier frequency | GHz | 3.5 | 3.5 | 3.5 |
| Number of RBs | | | 6 RB, 50 RB | |
| RB utilization ratio | % | 100 | 100 | 100 |
| Data modulation method | — | QPSK | QPSK | QPSK |
| Frame structure type | — | FDD | FDD | FDD |
| CP length | — | Normal | Normal | Normal |
| Frequency offset with respect to UE frequency reference | Hz | 0 | 0 | 0 |
| Relative delay via first path (synchronous) | μs | 0 | 0 | CP/2 |
| Es/Noc | dB | 10 | 5 | Test 1: −2 dB Test 2: 0 dB |

TABLE 23-continued

| Parameter | Unit | TP1 | TP2 | TP3 (Desired TP) |
|---|---|---|---|---|
| $N^{cell}_{ID}$ ($N^{CSI}_{ID}$ is the same as $N^{cell}_{ID}$) | — | 3 | 3 | 3 |
| The number of transmitting antennas | — | 1 | 1 | 1 |
| Antenna port | — | 15 | 15 | 15 |
| CSI-RS configuration index | — | 10 | 5 | 0 |
| CSI-RS period and subframe offset ($T_{CSI-RS}/I_{CSI-RS}$) | — | 40/3, 80/3, 160/3 | | |
| Muting for CSI-RS | | Yes | | |
| Propagation condition | — | AWGN, EPA5, ETU30 | | |
| Noc model | — | AWGN | | |
| CSI-RS period | — | 40 ms, 80 ms, 160 ms | | |

Table 24 shows other parameters for simulation of cell identification.

TABLE 24

| Simulation parameter | Description |
|---|---|
| UE is aware of TP 1 and 2 in advance | Yes |
| Carrier frequency of TP 1, 2, and 3 | The same |
| Threshold for detection failure | Required as in an actual UE |
| Duty cycle | 100% (non-DRX case) |
| Performance reference for comparison | Acquisition time to achieve 90% of accurate TP ID of the CSI-RS |
| CP length detection | Both short and long CP (namely extended CP) exist, and the UE has to detect CP length. |

TABLE 24-continued

| Simulation parameter | Description |
|---|---|
| The number of receiving antennas | 2 (uncorrelated) |
| Failure alarm rate | 1% |

Also, performance metrics are as follows.
1) Acquisition of PSS/SSS
Criterion for successful event: acquisition of accurate PSS/SSS
Required success rate: 90%
Expected result from simulation: delay in acquiring PSS/SSS
2) Acquisition of CSI-RS
Criterion for successful event: acquisition of accurate CSI-RS
Required success rate: 90%
Expected result from simulation: delay in acquiring CSI-RS II-2. Simulation Result
II-2-1. Simulation Result for Acquiring PSS/SSS
FIGS. 23a to 23c illustrate Pd with respect to acquisition time (AcqTime) when Es/Noc=−0.75 dB, and propagation condition corresponds to AGWN, EPA5, and ETU30 respectively.

Figure 23A:
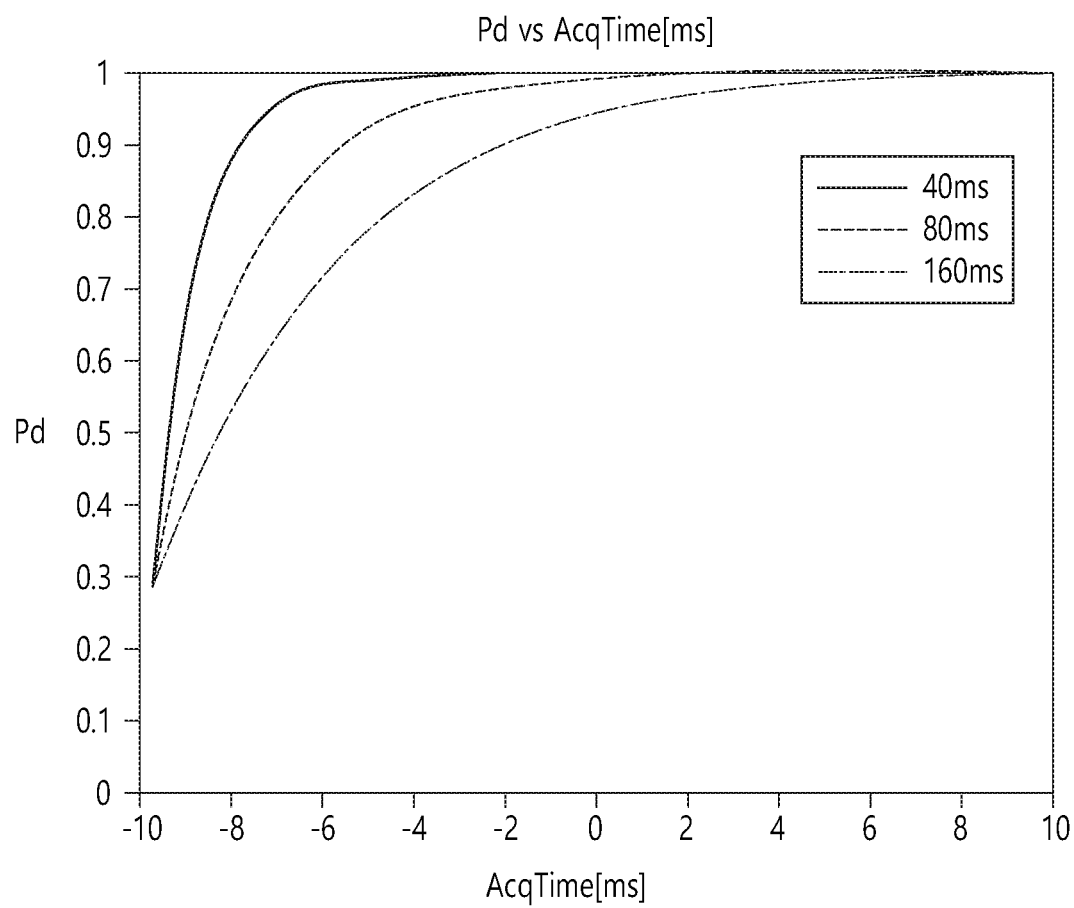
FIGS. 23a to 23c illustrate Pd with respect to acquisition time (AcqTime) when Es/Noc=−0.75 dB, and propagation condition corresponds to AGWN, EPA5, and ETU30 respectively.
Figure 23B:
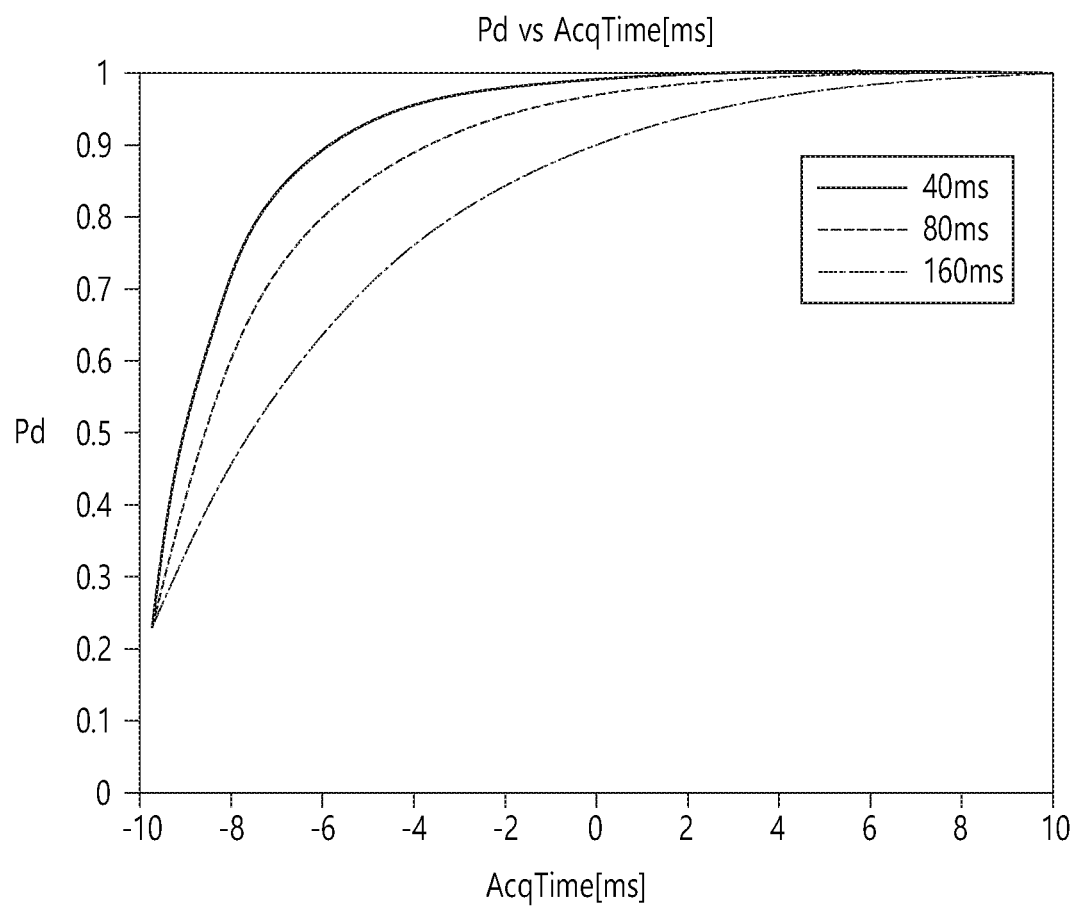
Figure 23C:
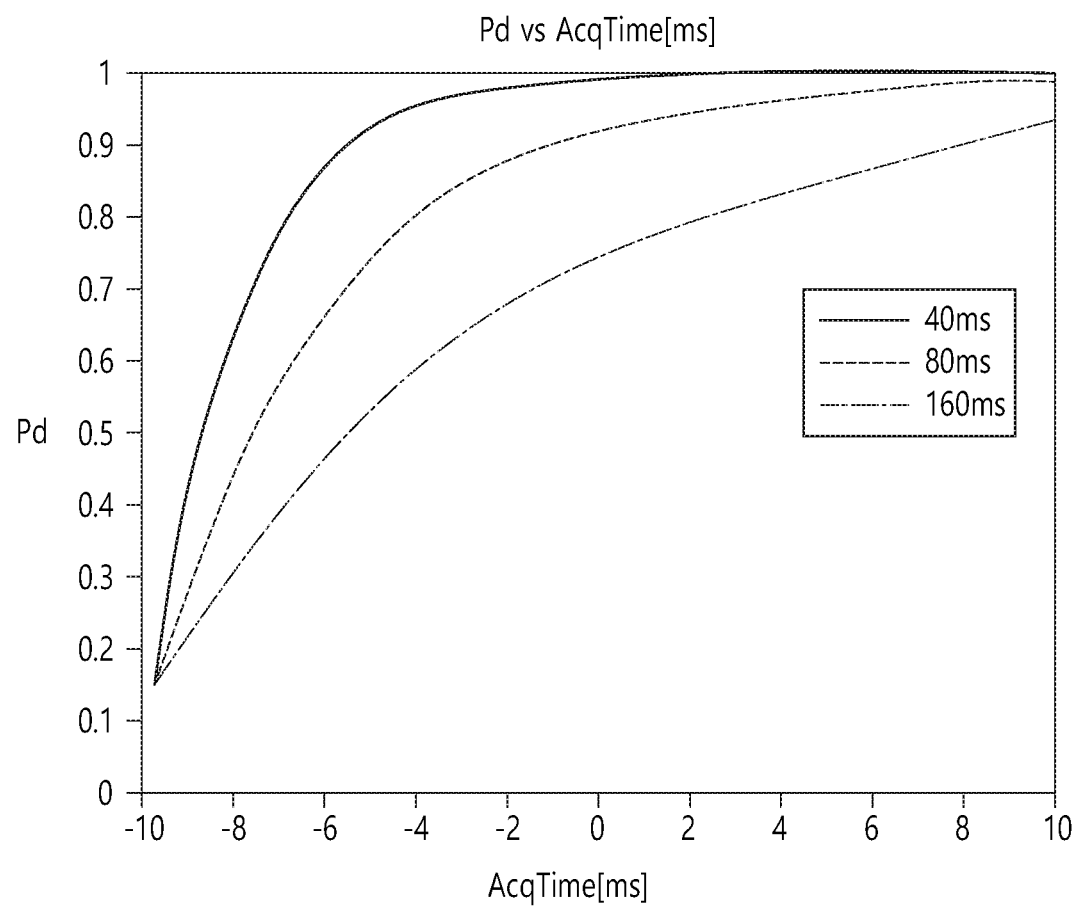

FIGS. 23a to 23c show Pd with respect to acquition time (AcqTime) when the DMTC measurement period changes to 40, 80, and 160 ms, respectively.

Meanwhile, Table 25 shows PSS/SSS acquisition time (x: times of DRS periodicity) to achieve 90% success rate when the DMTC measurement period changes to 40, 80, and 160 ms.

TABLE 25

| | | AWGN | | | EPA5 | | | ETU30 | | |
|---|---|---|---|---|---|---|---|---|---|---|
| | | | | | Es/Noc(dB) | | | | | |
| DRS_Periodicity*x | | −0.75 | 0.25 | 1.25 | −0.75 | 0.25 | 1.25 | −0.75 | 0.25 | 1.25 |
| Case1 | 40 ms | 7 | 4 | 2 | 13 | 8 | 6 | __14__ | __8__ | __6__ |
| | 80 ms | 8 | 4 | 2 | 10 | 7 | 4 | __14__ | __9__ | __6__ |
| | 160 ms | 7 | 4 | 2 | 9 | 6 | 4 | __15__ | __9__ | __6__ |
| Case2 | 40 ms | 14 | 4 | 2 | 16 | 9 | 6 | __19__ | __10__ | __7__ |
| | 80 ms | 13 | 4 | 2 | 12 | 7 | 5 | __21__ | __10__ | __6__ |
| | 160 ms | 14 | 4 | 2 | 11 | 6 | 4 | __15__ | __10__ | __6__ |
| Case3 | 40 ms | 12 | 4 | 2 | 18 | 9 | __7__ | __20__ | __10__ | 6 |
| | 80 ms | 11 | 4 | 2 | 12 | 7 | 5 | __21__ | __10__ | __6__ |
| | 160 ms | 11 | 4 | 2 | 11 | 7 | 5 | __15__ | __10__ | __6__ |
| Case4 | 40 ms | 6 | 3 | 2 | 13 | 8 | 6 | __13__ | __9__ | __6__ |
| | 80 ms | 6 | 3 | 2 | 10 | 6 | 4 | __14__ | __8__ | __6__ |
| | 160 ms | 6 | 4 | 2 | 9 | 6 | 4 | __15__ | __8__ | __6__ |

Table 25 above indicates the values not satisfying the criterion by underlining them.

From the results shown in Table 25, Table 26 shows the number of DS periods for each case.

TABLE 26

| DRS_Periodicity * x | | Max (AWGN, EPA5, ETU30) | | |
|---|---|---|---|---|
| | Es/Noc(dB) | −0.75 | 0.25 | 1.25 |
| Case1 | 40 ms | 14 | 8 | 6 |
| | 80 ms | 14 | 9 | 6 |
| | 160 ms | 15 | 9 | 6 |
| Case2 | 40 ms | 19 | 10 | 7 |
| | 80 ms | 21 | 10 | 6 |
| | 160 ms | 15 | 10 | 6 |

TABLE 26-continued

| DRS_Periodicity * x | | Max (AWGN, EPA5, ETU30) | | |
|---|---|---|---|---|
| | Es/Noc(dB) | −0.75 | 0.25 | 1.25 |
| Case3 | 40 ms | 20 | 10 | 7 |
| | 80 ms | 21 | 10 | 6 |
| | 160 ms | 15 | 10 | 6 |
| Case4 | 40 ms | 13 | 9 | 6 |
| | 80 ms | 14 | 8 | 6 |
| | 160 ms | 15 | 8 | 6 |
| Max(case1, case2, case3, case4) | 40 ms | 20 | 10 | 7 |
| | 80 ms | 21 | 10 | 6 |
| | 160 ms | 15 | 10 | 6 |

II-2-2. Simulation Result for Acquiring CSI-RS

Table 27 shows CSI-RS acquisition time (x: times of DRS periodicity) to achieve 90% success rate when the DMTC measurement period changes to 40, 80, and 160 ms.

TABLE 27

| | | AWGN | | EPA5 | | ETU30 | |
|---|---|---|---|---|---|---|---|
| | | | | Es/Noc(dB) | | | |
| DRS_Periodicity*x | | −2 | 0 | −2 | 0 | −2 | 0 |
| 6RB | 40 ms | <u>15</u> | 5 | 14 | <u>7</u> | 9 | 5 |
| | 80 ms | <u>16</u> | 5 | 11 | <u>6</u> | 9 | 5 |
| | 160 ms | <u>17</u> | 5 | 9 | <u>5</u> | 10 | 5 |
| 15RB | 40 ms | 4 | 1 | <u>7</u> | <u>4</u> | 5 | 2 |
| | 80 ms | 4 | 1 | <u>5</u> | <u>3</u> | 5 | 2 |
| | 160 ms | 5 | 1 | <u>5</u> | <u>3</u> | 5 | 2 |
| 25RB | 40 ms | 2 | 1 | <u>4</u> | <u>2</u> | 3 | 2 |
| | 80 ms | 2 | 1 | <u>3</u> | <u>2</u> | 3 | 2 |
| | 160 ms | 2 | 1 | <u>3</u> | <u>2</u> | 3 | 2 |
| 50RB | 40 ms | 1 | <u>1</u> | <u>2</u> | 1 | 1 | 1 |
| | 80 ms | 1 | <u>1</u> | <u>2</u> | 1 | 1 | 1 |
| | 160 ms | 1 | <u>1</u> | <u>2</u> | 1 | 1 | 1 |

Table 27 above indicates the values not satisfying the criterion by underlining them.

From the results shown in Table 27, Table 28 shows the number of DS periods for each case.

TABLE 28

| DRS_Periodicity * x | | Max (AWGN, EPA5, ETU30) | |
|---|---|---|---|
| | Es/Noc (dB) | −2 | 0 |
| 6 RB | 40 ms | 15 | 7 |
| | 80 ms | 16 | 6 |
| | 160 ms | 17 | 5 |
| 15 RB | 40 ms | 7 | 4 |
| | 80 ms | 5 | 3 |
| | 160 ms | 5 | 3 |
| 25 RB | 40 ms | 4 | 2 |
| | 80 ms | 3 | 2 |
| | 160 ms | 3 | 2 |
| 50 RB | 40 ms | 2 | 1 |
| | 80 ms | 2 | 1 |
| | 160 ms | 2 | 1 |

II-3. Summary of Simulation Results

Form the simulation results above, propositions may be summarized as follows.

Proposition 1: the number of periods for a discovery signal with respect to acquisition of PSS/SSS is shown in Table 26.

Proposition 2: the number of periods for a discovery signal with respect to acquisition of CSI-RS is shown in Table 28.

The embodiments of the present invention described above may be implemented by using various means. For example, the embodiments according to the present invention may be realized through hardware, firmware, software, or a combination thereof. More specifically, the implementation will be described with reference to appended drawings.

Figure 24:
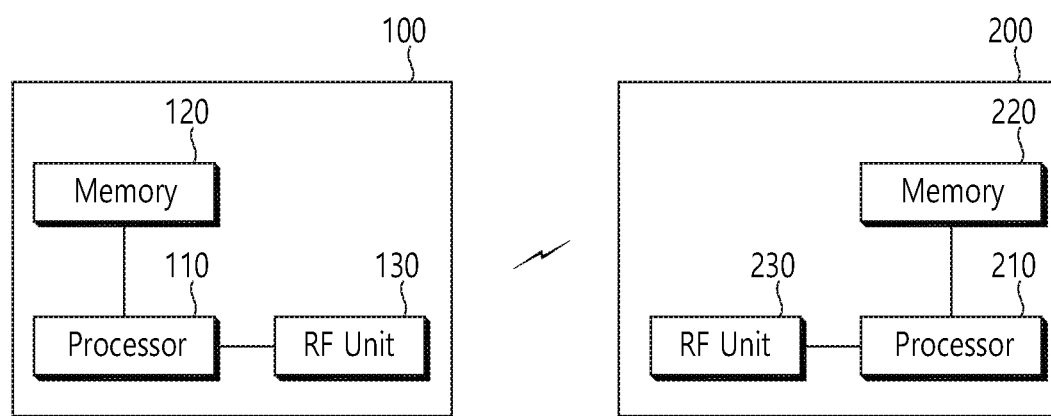
FIG. 24 illustrates a block diagram of a wireless communication system in which the present invention is implemented.

FIG. 24 illustrates a block diagram of a wireless communication system in which the present invention is implemented.

An eNB 200 includes a processor 201, memory 202, and RF (Radio Frequency) unit 203. The memory 202, being connected to the processor 201, stores various kinds of information for operating the processor 201. The RF unit 203, being connected to the processor 201, transmits and/or receives a radio signal. The processor 201 implements a proposed function, process and/or method. In the embodiments described above, operation of the eNB may be realized by the processor 201.

A UE 100 includes a processor 101, memory 102, and RF (Radio Frequency) unit 103. The memory 102, being connected to the processor 101, stores various kinds of information for operating the processor 101. The RF unit 103, being connected to the processor 101, transmits and/or receives a radio signal. The processor 101 implements a proposed function, process and/or method.

The processor may comprise Application-Specific Integrated Circuit (ASIC), other chipsets, logical circuit, and/or data processing device. The memory may include Read-Only Memory (ROM), Random Access Memory (RAM), flash memory, memory card, storage medium and/or other storage devices. The RF unit may include a baseband circuit for processing a radio signal. If an embodiment is implemented by software, the techniques described above may be implemented in the form of a module (process or function) which performs the function described above. A module may be stored in the memory and may be executed by the processor. The memory may be located inside or outside the processor and may be connected to the processor through a well-known means.

The embodiments of the present invention above are described by using flow diagrams comprising steps or blocks, but the present invention is not limited to the specific order of steps; some steps may be performed in a different order with other steps or may be performed simultaneously with other steps. Also it should be understood by those skilled in the art that the steps introduced in the diagrams are not exclusive to each other, other steps may be added, or one or more steps may be deleted without affecting the technical scope of the present invention.

What is claimed is:

1. A method for performing measurements based on a cell-specific reference signal (CRS) based discovery signal, the method comprising:
   receiving, from a cell, the CRS based discovery signal; and
   performing the measurements based on the CRS based discovery signal during a predetermined measurement period;
   wherein the predetermined measurement period is based on (i) a number of resource blocks (RBs) for a measurement bandwidth and (ii) a discovery signal measurement occasion periodicity, wherein the predetermined measurement period is further based on (iii) that a layer 3 filtering is not used, wherein, if the measurement bandwidth includes at least 6 RBs, the predetermined measurement period is equal to 5 times the discovery signal measurement occasion periodicity for measuring the CRS based discovery signal, and wherein, if the measurement bandwidth includes at least 25 RBs, the predetermined measurement period is equal to 3 times the discovery signal measurement occasion periodicity for measuring the CRS based discovery signal.

2. The method of claim 1, wherein the discovery signal measurement occasion periodicity for measuring the CRS based discovery signal corresponds to one of 40 ms, 80 ms, and 160 ms.

3. The method of claim 1,
wherein the CRS based discovery signal is received during an occasion duration defined as N consecutive subframes, and
wherein a value of the N is equal to or more than one.

4. The method of claim 1, wherein in the performing of the measurement, a discontinuous reception (DRX) is not used.

5. The method of claim 1, wherein the CRS based discovery signal includes one or more of a primary synchronization signal (PSS), a secondary synchronization signal (SSS), a cell-specific reference Signal (CRS) and a channel state information reference signal (CSI-RS).

6. A terminal for performing measurements based on a cell-specific reference signal (CRS) based discovery signal, the terminal comprising:
a transceiver configured to receive, from a cell, the CRS based discovery signal; and
a processor configured to perform the measurements based on the CRS based discovery signal during a predetermined measurement period,
wherein the predetermined measurement period is based on (i) a number of resource blocks (RBs) for a measurement bandwidth and (ii) a discovery signal measurement occasion periodicity,
wherein the predetermined measurement period is further based on (iii) that a layer 3 filtering is not used,
wherein, if the measurement bandwidth includes at least 6 RBs, the predetermined measurement period is equal to 5 times the discovery signal measurement occasion periodicity for measuring the CRS based discovery signal, and
wherein, if the measurement bandwidth includes at least 25 RBs, the predetermined measurement period is equal to 3 times the discovery signal measurement occasion periodicity for measuring the CRS based discovery signal.

7. The terminal of claim 6, wherein the discovery signal measurement occasion periodicity for measuring the CRS based discovery signal corresponds to one of 40 ms, 80 ms, and 160 ms.

8. The terminal of claim 6,
wherein the CRS based discovery signal is received during an occasion duration defined as N consecutive subframes, and
wherein a value of the N is equal to or more than one.

9. The terminal of claim 6, wherein in the performing of the measurement, a discontinuous reception (DRX) is not used.

10. The terminal of claim 6, wherein the CRS based discovery signal includes one or more of a primary synchronization signal (PSS), a secondary synchronization signal (SSS), a cell-specific reference Signal (CRS) and a channel state information reference signal (CSI-RS).

11. A method for performing measurements based on a cell-specific reference signal (CRS) based discovery signal, the method comprising:
receiving, from a cell, the CRS based discovery signal; and
performing the measurements based on the CRS based discovery signal during a predetermined measurement period,
wherein the predetermined measurement period is based on (i) a number of resource blocks (RBs) for a measurement bandwidth and (ii) a discovery signal measurement occasion periodicity,
wherein the predetermined measurement period is further based on (iii) that a layer 3 filtering is not used,
wherein if the measurement bandwidth includes RBs that equal to or greater than 6 RBs and less than 25 RBs, the predetermined measurement period is equal to 5 times the discovery signal measurement occasion periodicity for measuring the CRS based discovery signal, and
wherein if the measurement bandwidth includes RBs that equal to or greater than 25 RBs, the predetermined measurement period is equal to 3 times the discovery signal measurement occasion periodicity for measuring the CRS based discovery signal.

12. The method of claim 11, wherein if the measurement bandwidth includes RBs that equal to or greater than 50 RBs, the predetermined measurement period is equal to 1 times the discovery signal measurement occasion periodicity for measuring the CRS based discovery signal.

13. The method of claim 11, wherein the discovery signal measurement occasion periodicity for measuring the CRS based discovery signal corresponds to one of 40 ms, 80 ms, and 160 ms.

14. The method of claim 11,
wherein the CRS based discovery signal is received during an occasion duration defined as N consecutive subframes, and
wherein a value of the N is equal to or more than one.

15. The method of claim 11, wherein in the performing of the measurement, a discontinuous reception (DRX) is not used.

16. The method of claim 11, wherein the CRS based discovery signal includes one or more of a primary synchronization signal (PSS), a secondary synchronization signal (SSS), a cell-specific reference Signal (CRS) and a channel state information reference signal (CSI-RS).

* * * * *